United States Patent
Babaei et al.

(10) Patent No.: US 11,856,446 B2
(45) Date of Patent: *Dec. 26, 2023

(54) SCHEDULING REQUEST FOR TRANSMISSION OF A BUFFER STATUS REPORT

(71) Applicant: ResMed Inc., San Diego, CA (US)

(72) Inventors: Alireza Babaei, Fairfax, VA (US); Esmael Dinan, McLean, VA (US); Hyoungsuk Jeon, Centreville, VA (US); Kyungmin Park, Herndon, VA (US)

(73) Assignee: ResMed Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/074,059

(22) Filed: Oct. 19, 2020

(65) Prior Publication Data

US 2021/0037413 A1     Feb. 4, 2021

Related U.S. Application Data

(63) Continuation of application No. 15/971,307, filed on May 4, 2018, now Pat. No. 10,841,830.

(Continued)

(51) Int. Cl.
*H04W 28/02*     (2009.01)
*H04W 24/10*     (2009.01)
(Continued)

(52) U.S. Cl.
CPC ....... *H04W 28/0278* (2013.01); *H04W 24/10* (2013.01); *H04W 72/21* (2023.01);
(Continued)

(58) Field of Classification Search
CPC ......... H04W 28/0278; H04W 72/1284; H04W 74/0891; H04W 72/042; H04W 24/10; H04W 74/006
See application file for complete search history.

(56) References Cited

U.S. PATENT DOCUMENTS

2013/0058315 A1*    3/2013   Feuersanger ....... H04W 52/346
                                                                                      370/336
2014/0126399 A1*    5/2014   Damnjanovic ....... H04W 76/15
                                                                                     370/252

(Continued)

FOREIGN PATENT DOCUMENTS

CN          104105212 A     10/2014
CN          105557014 A      5/2016
(Continued)

OTHER PUBLICATIONS

3rd Generation Partnership Project;Technical Specification Group Radio Access Network; Evolved Universal Terrestrial Radio Access (E-UTRA); Medium Access Control (MAC) protocol specification, Mar. 2017, 3GPP TS36.321 V14.2.1 (Mar. 2017) (pp. 38-42) (Year: 2017).*

(Continued)

*Primary Examiner* — Shailendra Kumar
(74) *Attorney, Agent, or Firm* — Patterson + Sheridan, LLP

(57) ABSTRACT

A wireless device receives indications of: a first scheduling request (SR) resource corresponding to first logical channel(s) having a first logical channel prioritization (LCP) mapping to first radio resources; and a second SR resource corresponding to second logical channel(s) having a second LCP mapping to second radio resources. A buffer status report (BSR) is triggered in response to data becoming available for the second logical channel(s). First uplink grant(s) indicating a first radio resource of the first radio resources is received. An SR for transmission of the BSR is triggered in response to the first radio resource not meeting the second LCP mapping configured for the second logical channel(s) that triggered the BSR. The SR is transmitted via the second SR resource selected based on the second logical (Continued)

channel(s) triggering the BSR. The BSR is transmitted via a second radio resource of the second radio resources.

20 Claims, 36 Drawing Sheets

Related U.S. Application Data

(60) Provisional application No. 62/501,556, filed on May 4, 2017, provisional application No. 62/514,292, filed on Jun. 2, 2017.

(51) Int. Cl.
    *H04W 72/04*     (2009.01)
    *H04W 72/12*     (2009.01)
    *H04W 74/00*     (2009.01)
    *H04W 74/08*     (2009.01)
    *H04W 72/21*     (2023.01)
    *H04W 72/23*     (2023.01)

(52) U.S. Cl.
    CPC ......... *H04W 72/23* (2023.01); *H04W 74/006* (2013.01); *H04W 74/0891* (2013.01)

(56) References Cited

U.S. PATENT DOCUMENTS

| | | | |
|---|---|---|---|
| 2015/0117342 A1* | 4/2015 | Loehr .................. | H04W 72/21 370/329 |
| 2016/0021646 A1 | 1/2016 | Hu | |
| 2016/0128094 A1 | 5/2016 | Lee | |
| 2016/0157256 A1 | 6/2016 | Tseng | |
| 2016/0295442 A1 | 10/2016 | Virtej et al. | |
| 2016/0365959 A1* | 12/2016 | Dinan .................. | H04L 5/0055 |
| 2017/0078058 A1 | 3/2017 | Marinier | |
| 2017/0289908 A1 | 10/2017 | Lee et al. | |
| 2017/0295590 A1* | 10/2017 | Loehr .................. | H04W 72/21 |
| 2017/0310531 A1 | 10/2017 | Dinan et al. | |
| 2017/0311290 A1 | 10/2017 | Adjakple | |
| 2017/0311317 A1 | 10/2017 | Dinan et al. | |
| 2018/0014322 A1* | 1/2018 | Loehr ............... | H04W 28/0278 |
| 2018/0049227 A1* | 2/2018 | Moon ............... | H04W 72/0446 |
| 2018/0063869 A1* | 3/2018 | Zhang ................. | H04W 74/004 |
| 2018/0070378 A1* | 3/2018 | Quan ..................... | H04W 72/12 |
| 2018/0115985 A1* | 4/2018 | Lee ........................ | H04L 1/1874 |
| 2019/0124674 A1* | 4/2019 | Lee ........................ | H04W 72/02 |
| 2019/0380153 A1* | 12/2019 | Damnjanovic ....... | H04L 5/0094 |
| 2020/0037345 A1* | 1/2020 | Ryoo ................. | H04W 72/1268 |
| 2020/0059345 A1* | 2/2020 | Pelletier ................ | H04L 5/0064 |
| 2021/0274539 A1 | 9/2021 | Babaei | |

FOREIGN PATENT DOCUMENTS

| | | |
|---|---|---|
| EP | 3285534 | 4/2018 |
| JP | 2015-519821 A | 7/2015 |
| JP | 2016-536875 A | 11/2016 |
| KR | 20200012884 A | 2/2020 |
| WO | 2013/164105 A1 | 11/2013 |
| WO | 2016183728 | 11/2016 |
| WO | 2016183728 A1 | 11/2016 |
| WO | 2017150828 A1 | 9/2017 |
| WO | 2018031638 A1 | 2/2018 |
| WO | 2018232307 A1 | 12/2018 |

OTHER PUBLICATIONS

R2-134381; 3GPP TSG-RAN WG2 Meeting #84; San Francisco, USA, Nov. 11-15, 2013; Agenda Item: 7.2.4; Source: Alcatel-Lucent Shanghai Bell, Alcatel-Lucent; Title: BSR and SR for dual connectivity; Document for Discussion and Decision.
Office Action dated Oct. 27, 2020 in Chinese Patent Application No. 201880043081.X (and English translation).
3GPP TS 36.211 V14.2.0 (Mar. 2017); 3rd Generation Partnership Project; Technical Specification Group Radio Access Network; Evolved Universal Terrestrial Radio Access (E-UTRA); Physical channels and modulation (Release 14).
3GPP TS 36.212 V14.2.0 (Mar. 2017); 3rd Generation Partnership Project; Technical Specification Group Radio Access Network; Evolved Universal Terrestrial Radio Access (E-UTRA); Multiplexing and channel coding (Release 14).
3GPP TS 36.213 V14.2.0 (Mar. 2017); 3rd Generation Partnership Project; Technical Specification Group Radio Access Network; Evolved Universal Terrestrial Radio Access (E-UTRA); Physical layer procedures (Release 14).
3GPP TS 36.300 V14.2.0 (Mar. 2017); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14).
3GPP TS 36.321 V14.2.1 (Mar. 2017); 3rd Generation Partnership Project; Technical Specification Group Radio Access Network; Evolved Universal Terrestrial Radio Access (E-UTRA); Medium Access Control (MAC) protocol specification (Release 14).
R2-1703030; 3GPP TSG RAN WG2 Meeting #97bis; Spokane, USA Apr. 3-7, 2017; Agenda Item: 10.3.1.5; Source: Lenovo, Motorola Mobility; Title: Enhanced SR for URLLC; Document for: Discussion and decision.
R2-1700039; 3GPP TSG-RAN WG2 NR Ad Hoc; Spokane, USA, Jan. 17-19, 2017; Source: vivo; Title: Discussion on mapping between MAC and multiple TTI lengths; Agenda Item: 3.2.1.2; Document for: Discussion and Decision.
R2-1700049; 3GPP TSG-RAN WG2 NR Ad Hoc; Spokane, USA, Jan. 17-19, 2017; Agenda Item: 3.2.1.2; Source: OPPO; Title: Logical channel multiplexing and prioritization in NR; Document for: Discussion and Decision.
R2-1700083; 3GPP TSG-RAN2 Meeting #Ad hoc; Spokane, Washington, USA, Jan. 17-19, 2017; Agenda item: 3.2.1.2; Source: Huawei, HiSilicon; Title: MAC Support of Multiple Numerologies; Document for: Discussion and Decision.
R2-1700115; 3GPP TSG-RAN WG2 NR Ad Hoc R2-1700115; (Update of R2-168232) Spokane, Washington, USA, Jan. 17-19, 2017; Agenda Item: 3.2.1.3 (QoS); Source: Fujitsu; Title: MAC function for URLLC support; Document for: Decision.
R2-1700229; 3GPP TSG-RAN WG2 NR; Spokane, USA, Jan. 17-19, 2017; Agenda Item: 3.2.1.2; Source: MediaTek Inc; Title: Design of NR MAC layer to support multiple numerologies; Document for: Discussion and decision.
R2-1700236; 3GPP TSG-RAN WG2 NR Ad Hoc; Spokane, Washington Jan. 17-19, 2017; Agenda Item: 3.2.1.2; Source: InterDigital Communications; Title: LCP and Scheduling Aspects for Multiple Numerologies; Document for: Discussion, Decision.
R2-1700296; 3GPP TSG-RAN WG2 NR AdHoc; Spokane, USA, Jan. 17-19, 2017; Agenda item: 3.2.1.2; Source: Samsung; Title: MAC Aspects to Support Multiple Service Verticals; Document for: Discussion and Decision.
R2-1700408; 3GPP TSG-RAN WG2 NR Ad Hoc; Spokane, USA, Jan. 17-19, 2017; Agenda Item: 3.2.1.2; Source: Ericsson; Title: Modelling of MAC with multiple numerologies; Document for: Discussion, Decision.
R2-1700421; 3GPP TSG-RAN WG2 NR Ad Hoc; Spokane, USA, Jan. 17-19, 2017; Agenda Item : 3.2.1.4 (FS_ NR_newRAT); Source: LG Electronics Inc.; Title: SR enhancement for New RAT; Document for: Discussion and Decision.
R2-1700426; 3GPP TSG-RAN WG2 NR Ad Hoc; Spokane, USA, Jan. 17-19, 2017; Agenda Item : 3.2.1.2 (FS_ NR_newRAT); Source: LG Electronics Inc.; Title: Numerology aspect in MAC; Document for: Discussion and Decision.
R2-1700562; 3GPP TSG-RAN WG2 Meeting NR ad-hoc; Spokane, USA, Jan. 17-19, 2017; Agenda item: 3.2.1.2; Source: Qualcomm Incorporated; Title: Multiple numerologies—MAC aspects; WID/SID: FS_ NR_newRAT—Release 14; Document for: Discussion and Decision.
R2-1700602; 3GPP TSG RAN WG2 NR Ad-hoc; Spokane, USA, Jan. 17-19, 2016; Agenda Item: 3.2.1.2; Souce: Samsung; Title:

(56) References Cited

OTHER PUBLICATIONS

Mapping between Logical Channels and Numerologies and/or TTIs; Document for: Discussion/Decision.
R2-1700838; 3GPP TSG-RAN WG2 #97; Athens, Greece, Feb. 13-17, 2017; Update of R2-1700430; Agenda Item: 10.2.1.4; Source: Ericsson; Title: Uplink dynamic scheduling in NR; Document for: Discussion, Decision.
R2-1700960; 3GPP TSG-RAN2 #97; Athens, Greece, Feb. 13-17, 2017; Agenda Item: 10.2.1.4; Source: OPPO; Title: Discussion on scheduling enhancement; Document for: Discussion, Decision.
R2-1701207; 3GPP TSG-RAN WG2 #97; Athens, Greece, Feb. 13-17, 2017; Revision of R2-1700175; Agenda item: 10.2.1.4; Source: Huawei, HiSilicon; Title: UL Scheduling Enhancement in NR; Document for: Discussion and decision.
R2-1701332; 3GPP TSG-RAN WG2 #97; Athens, Greece, Feb. 13-17, 2017; Resubmission of R2-1700252; Agenda item: 10.2.1.2; Source: Nokia, Alcatel-Lucent Shanghai Bell; Title: Logical channel to numerologies/TTI length mapping; WID/SID: FS_NR_newRAT—Release 14; Document for: Discussion and Decision.
R2-1701448; 3GPP TSG-RAN WG2 Meeting #97; Athens, Greece, Feb. 13-17, 2017; (resubmission of R2-1700354); Agenda Item: 10.2.1.4; Source: ASUSTeK; Title: Discussion on SR and BSR in NR; Document for: Discussion and Decision.
R2-1701470; 3GPP TSG-RAN WG2 NR #97 Meeting; Athens, Greece Feb. 13-17, 2017; (Revision of R2-1700614); Agenda item: 10.2.1.2; Source: Samsung ; Title: Layer 2 functions for multiple numerologies; Document for: Discussion & Decision.
R2-1701535; 3GPP TSG-RAN WG2 Meeting #97; Athens, Greece, Feb. 13-17, 2017; Resubmission of R2-1700420; Agenda Item: 10.2.1.4 (FS_ NR_newRAT); Source: LG Electronics Inc.; Title: BSR enhancement for New RAT; Document for: Discussion and Decision.
R2-1701536; 3GPP TSG-RAN WG2 Meeting #97; Athens, Greece, Feb. 13-17, 2017; Agenda Item: 10.2.1.4 (FS_ NR_newRAT); Source: LG Electronics Inc.; Title: SR enhancement for New RAT; Document for: Discussion and Decision.
R2-1701550; 3GPP TSG-RAN WG2 NR#97; Athens, Greece, Feb. 13-17, 2017; (Revision of R2-1700296); Agenda item: 10.2.1.2; Source: Samsung; Title: MAC to Support Multiple Service Verticals and Numerologies; Document for: Discussion and Decision.
R2-1701619; 3GPP TSG-RAN WG2 #97; Athens, Greece, Feb. 13-17, 2017; Agenda item: 10.2.1.4; Source: Samsung Electronics R&D Institute UK; Title: Multiple numerology considerations for SR; Document for: Discussion and Decision.
R2-1701682; 3GPP TSG-RAN WG2 #97; Athens, Greece, Feb. 13-17, 2017; Agenda Item: 10.2.1.2 ; Source: MediaTek Inc., ASUSTek; Title: MAC layer abstraction for multiple numerologies; Document for: Discussion and Decision.
R2-1701723; 3GPP TSG RAN WG2 Meeting #97; Athens, Greece, Feb. 13-17, 2017; Agenda item: 10.2.1.4; Source: Intel Corporation; Title: Enhancements of SR/BSR in NR; Document for: Discussion and decision.
R2-1702545; 3GPP TSG-RAN2 #97bis; Spokane, USA, Apr. 3-7, 2017; Agenda Item: 10.3.1.5; Source: OPPO; Title: Discussion on scheduling enhancement; Document for: Discussion, Decision.
R2-1702565; 3GPP TSG-RAN WG2 #97-bis; Spokane, USA, Apr. 3-7, 2017; Agenda item: 10.3.1.5; Source: Samsung Electronics R&D Institute UK; Title: Considerations on Scheduling Request design options in NR; Document for: Discussion.
R2-1702603; 3GPP TSG-RAN WG2 #97bis; Spokane, US, Apr. 3-7, 2017; Agenda item: 10.3.1.5; Source: Huawei, HiSilicon; Title: Enhancements for SR and BSR; Document for: Discussion and decision.
R2-1702667; 3GPP TSG-RAN WG2 #97bis; Spokane, USA, Apr. 3-7, 2017; Agenda Item: 10.3.1.5; Source: Ericsson (Rapporteur); Title: E-mail discussion report [97#62] SR/BSR Enhancements; Document for: Discussion, Decision.
R2-1702745; 3GPP TSG-RAN WG2 #97bis; Spokane, USA, Apr. 3-7, 2017; Agenda Item: 10.3.1.5; Source: Ericsson; Title: SR and BSR signalling content in NR; Document for: Discussion, Decision.

R2-1702746; 3GPP TSG-RAN WG2 #97bis; Spokane, USA, Apr. 3-7, 2017; Agenda Item: 10.3.1.5; Source: Ericsson; Title: SR and BSR triggering aspects; Document for: Discussion, Decision.
R2-1702748; 3GPP TSG-RAN WG2 #97bis; Spokane, USA, Apr. 3-7, 2017; Title: [Draft] LS on extended SR; Release: Rel-15; Work Item: FS_NR_newRAT; Source: Ericsson (to be RAN2); To: RAN1.
R2-1702901; 3GPP TSG-RAN WG2 #97bis; Spokane, USA, Apr. 3-7, 2017; Update of R2-1701332; Agenda item: 10.3.1.5; Source: Nokia, Alcatel-Lucent Shanghai Bell; Title: Logical channel and SR to numerologies/TTI length mapping; WID/SID: NR_newRAT—Release 15; Document for: Discussion and Decision.
R2-1703121; 3GPP TSG-RAN WG2 Meeting #97bis; Spokane, USA, Apr. 3-7, 2017; Source: CATT; Title: Discussion on SR/BSR; Agenda Item: 10.3.1.5; Document for: Discussion and Decision.
R2-1703152; 3GPP TSG-RAN WG2 Meeting #97bis; Spokane, USA, Apr. 3-7, 2017; Agenda Item: 10.3.1.5; Source: ETRI; Title: Uplink scheduling for multiple numerologies; Document for: Discussion and Decision.
R2-1703172; 3GPP TSG-RAN WG2 #97bis; Spokane, USA, Apr. 3-7, 2017; Agenda Item: 10.3.1.5; Source: III; Title: SR/BSR enhancements support of URLLC service in NR; Document for: Discussion, Decision.
R2-1703422; 3GPP TSG RAN WG2 Meeting #97bis; Spokane, US, Mar. 3-7, 2017; Agenda item: 10.3.1.5; Source: Intel Corporation; Title: Enhancements of SR/BSR in NR; Document for: Discussion and decision.
R2-1703491; 3GPP TSG-RAN WG2 Meeting #97bis; Spokane, USA, Apr. 3-7, 2017; Revision of R2-1701536; Agenda Item: 10.3.1.5 (NR_newRAT-Core); Source: LG Electronics Inc.; Title: SR enhancement for New RAT; Document for : Discussion and Decision.
R2-1703633; 3GPP TSG RAN WG2 Meeting #97bis; Spokane, USA, Apr. 3-7, 2017; Source: ITL; Title: Considerations on SR and BSR enhancement for NR; Agenda Item: 10.3.1.5; Document for: Discussion/Decision.
R2-1703692; 3GPP TSG-RAN WG2 Meeting #97bis; Spokane, USA, Apr. 3-7, 2017; Agenda item: 10.3.1.5; Source: Convida Wireless; Title: Convida Views on SR/BSR Enhancements; Document for: Discussion & Decision.
R2-1704054; 3GPP TSG-RAN2 Meeting #98; Hangzhou, China, May 15-19, 2017; Agenda Item: 10.3.1.5; Source: OPPO; Title: Discussion on SR and BSR enhancements; Document for: Discussion, Decision.
R2-1705074; 3GPP TSG-RAN WG2 Meeting #98; Hangzhou, China, May 15-19, 2017; Agenda item: 10.3.1.5; Source: Nokia, Alcatel-Lucent Shanghai Bell; Title: SR for NR; WID/SID: NR_newRAT—Release 15; Document for: Discussion and Decision.
R2-1705625; 3GPP TSG-RAN2 Meeting #98; Hangzhou, China, May 15-19, 2017; Agenda Item: 10.3.1.5; Source: Huawei, HiSilicon; Title: SR enhancements with multiple numerologies; Document for: Discussion and decision.
R2-170xxxx; 3GPP TSG-RAN WG2 Meeting #97bis; Spoken, USA, Apr. 3-7, 2017; Agenda item: 10.3.1.5; Source: Qualcomm Incorporated; Title: Enhanced SR and BSR; WID/SID: NR_newRAT-Core-Release 15; Document for: Discussion and Decision.
R2-17xxxxx; 3GPP TSG-RAN WG2 NR Adhoc Meeting; Agenda Item: 3.2.1.2; Source: III; Title: LCP procedure support of URLLC traffic in different numerologies; Document for: Discussion, Decision.
Office Action dated Aug. 11, 2020 in Japanese Patent Application No. 2019-560149 (and English translation).
KR Notice of Preliminary Rejection and English translation thereof dated Dec. 9, 2021 in corresponding KR application 2019-7035913.
Office Action for U.S. Appl. No. 17/089,661 dated Mar. 3, 2022.
Final Office Action for U.S. Appl. No. 17/089,661 dated Jul. 26, 2022.
Amendment filed Jun. 3, 2022 in U.S. Appl. No. 17/089,661.
Office Action dated Dec. 9, 2021for Korean application 2019-7035913.
English translation of Office Action dated Dec. 9, 2022 for Korean application 2019-7035913.

(56) References Cited

OTHER PUBLICATIONS

Korean Patent Office, The Notice of Preliminary Rejection for Korean Patent Application No. 2023-7002009 dated Apr. 12, 2023.
European Patent Office, Communication pursuant to Article 94(3) EPC for Application 22 150 026.7-1215 dated Mar. 15, 2023.

* cited by examiner

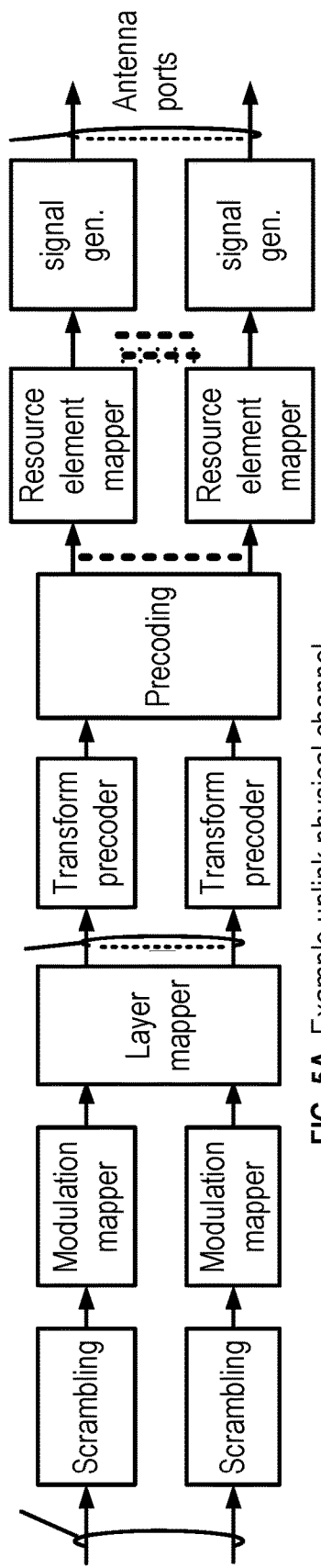
FIG. 5A Example uplink physical channel
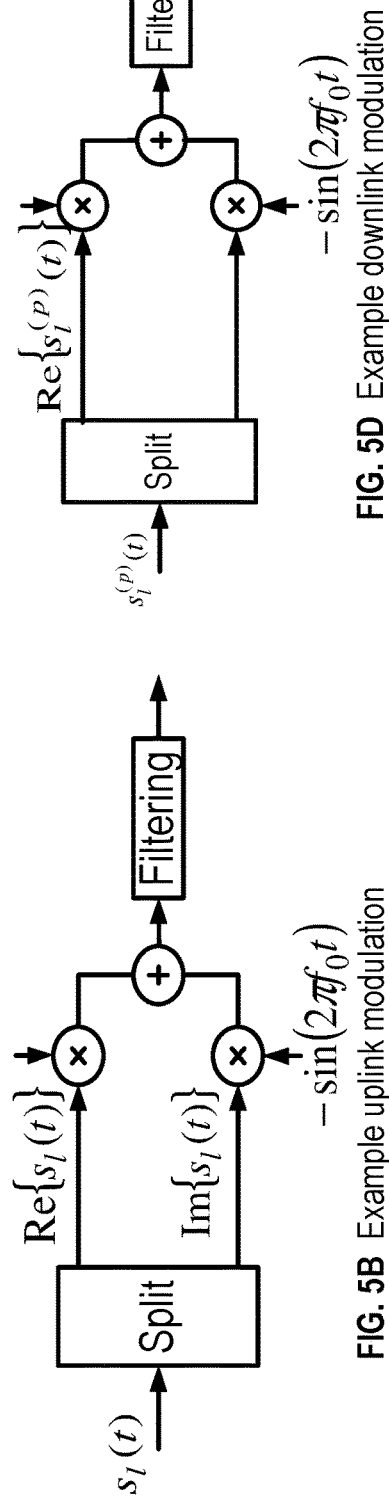
FIG. 5B Example uplink modulation
FIG. 5D Example downlink modulation
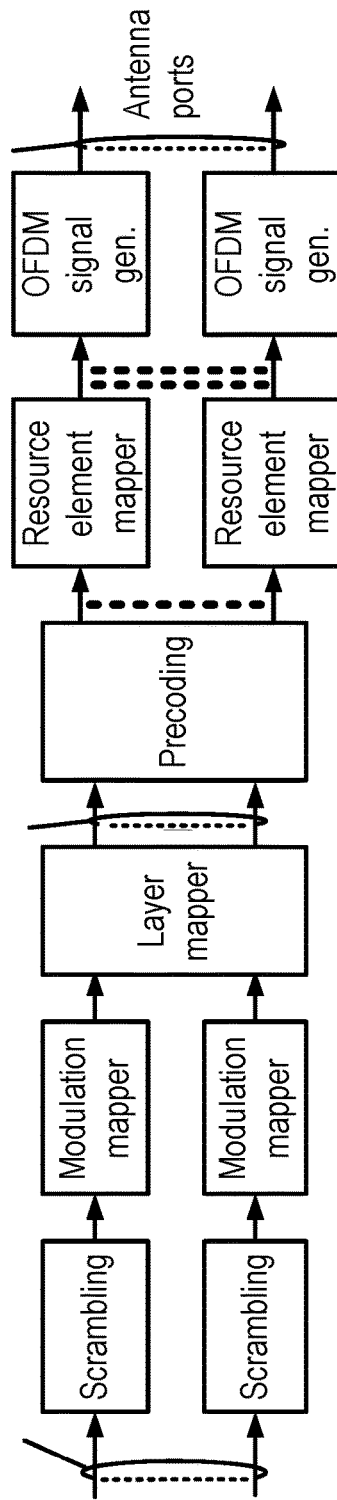
FIG. 5C Example downlink physical channel FIG. 7 Dual-Connectivity- two MAC entities at UE side

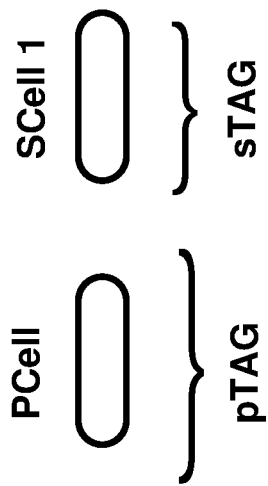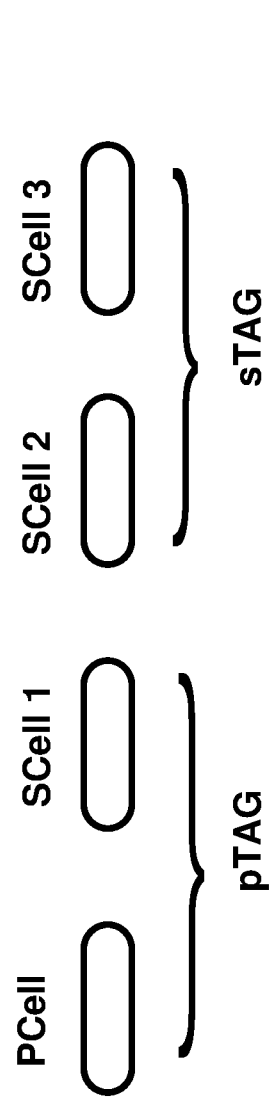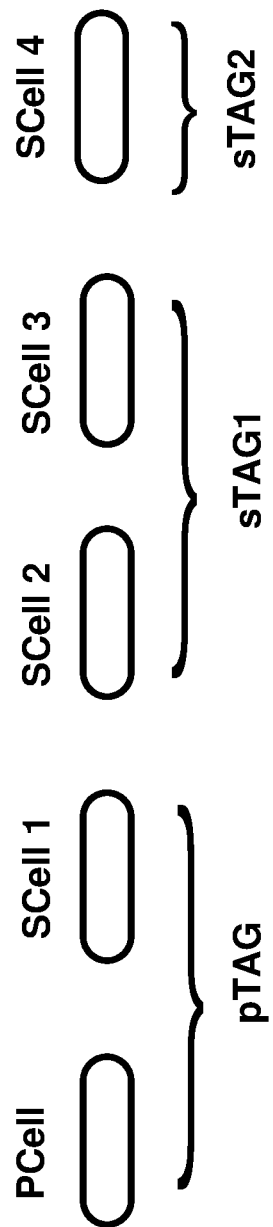
FIG. 8

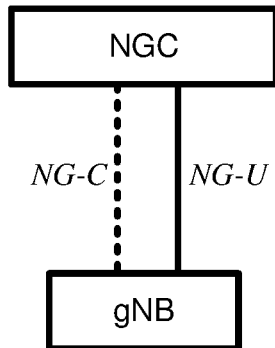
FIG. 10A gNB connected to NGC
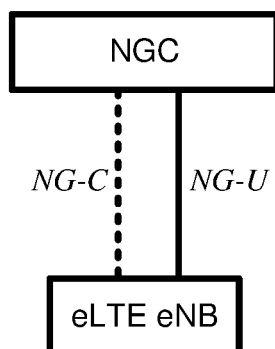
FIG. 10B eLTE eNB connected to NGC

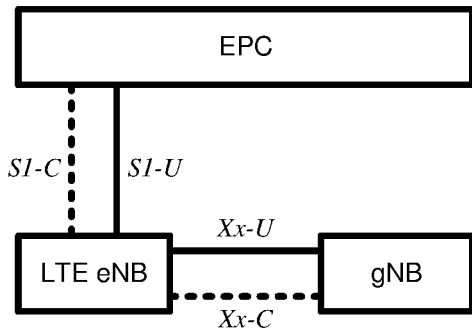

FIG. 11A  LTE eNB connected to EPC with non-standalone gNB.
gNB user plane connected to EPC via LTE eNB.

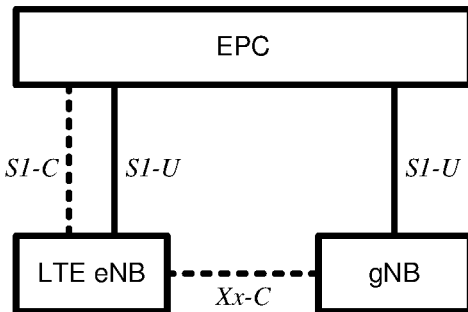

FIG. 11B  LTE eNB connected to EPC with non-standalone gNB.
gNB user plane connected to EPC directly.

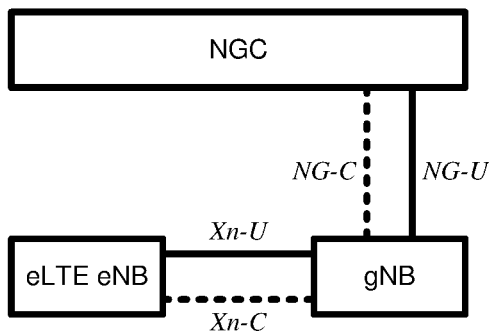

FIG. 11C  gNB connected to NGC with non-standalone eLTE eNB.
eLTE eNB user plane connected to NGC via gNB.

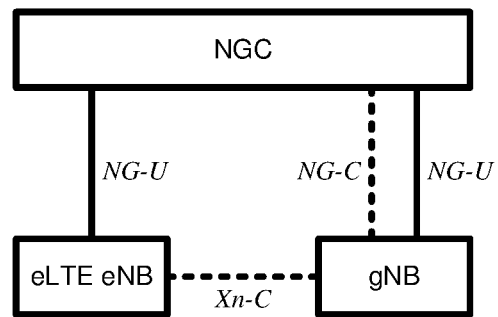

FIG. 11D  gNB connected to NGC with non-standalone eLTE eNB.
eLTE eNB user plane connected to NGC directly.

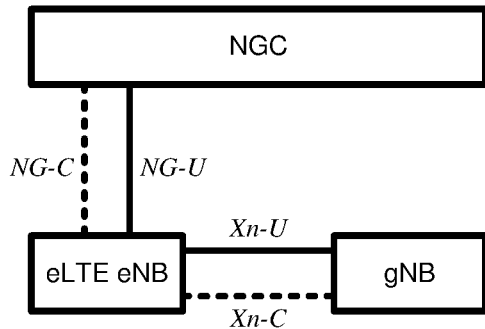

FIG. 11E  eLTE eNB connected to NGC with non-standalone gNB.
gNB user plane connected to NGC via eLTE eNB.

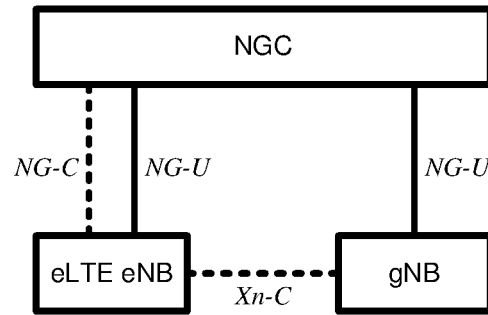

FIG. 11F  eLTE eNB connected to NGC with non-standalone gNB.
gNB user plane connected to NGC directly.

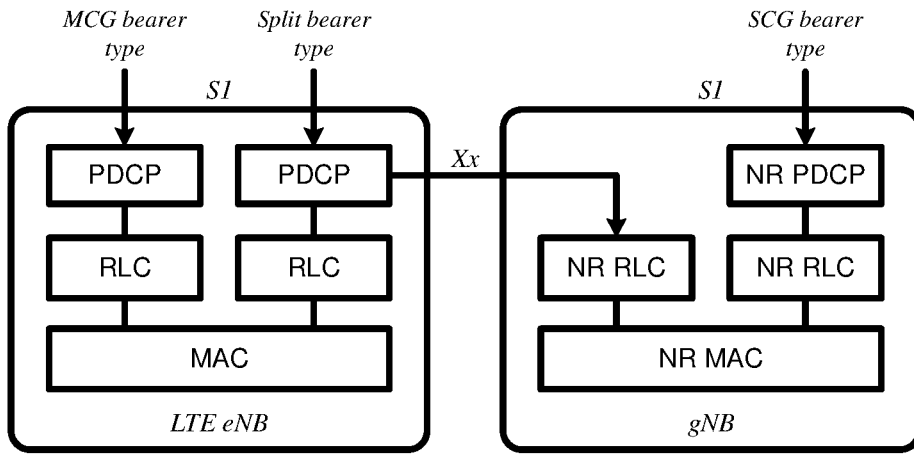
FIG. 12A Radio protocol architecture for split bearer and SCG bearer. LTE eNB connected to EPC with non-standalone gNB.
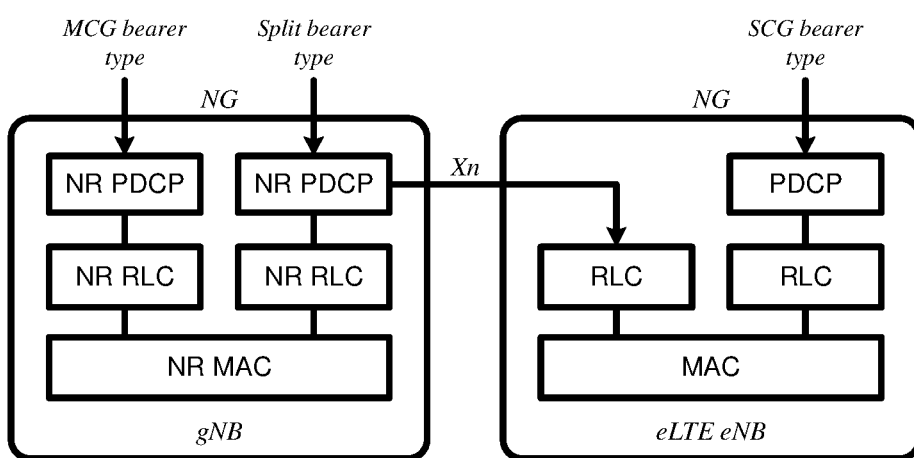
FIG. 12B Radio protocol architecture for split bearer and SCG bearer. gNB connected to NGC with non-standalone eLTE eNB.
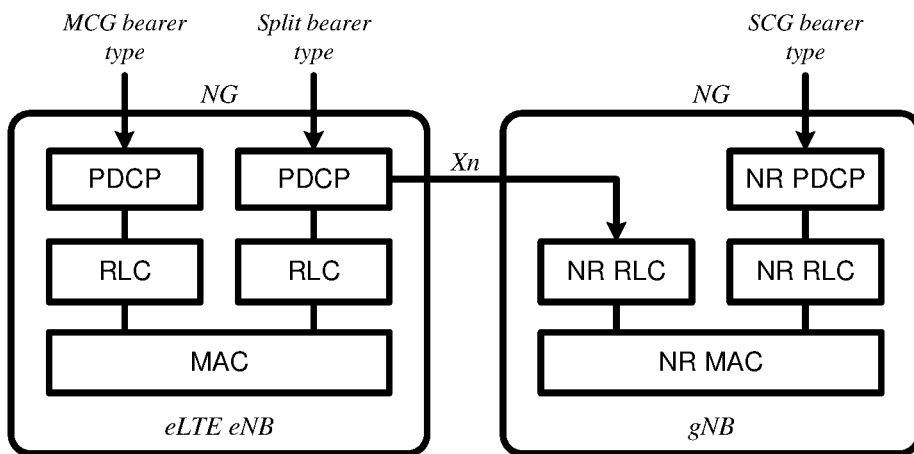
FIG. 12C Radio protocol architecture for split bearer and SCG bearer. eLTE eNB connected to NGC with non-standalone gNB.

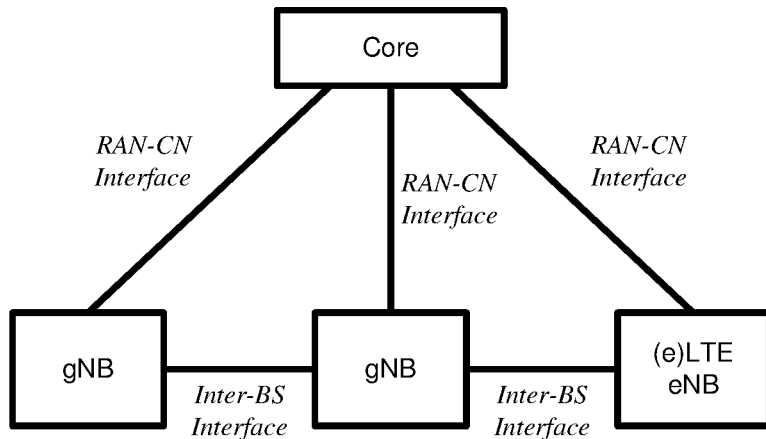
FIG. 13A Non-centralized deployment
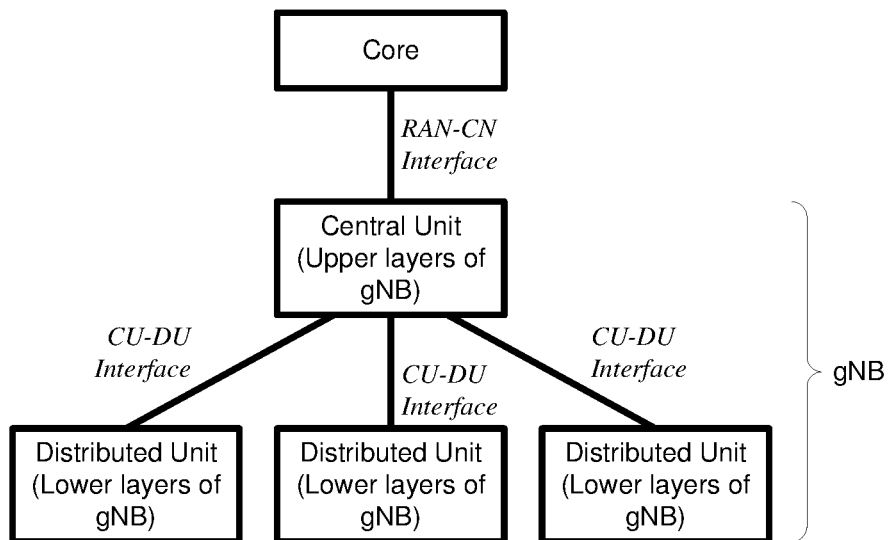
FIG. 13B Centralized deployment

Receive, by a wireless device from a base station, message(s) indicating: a 1st SR resource, of the base station, corresponding to a 1st logical channel corresponding to 1st transmission duration(s) up to a 1st value; and a 2nd SR resource, of the base station, corresponding to a 2nd logical channel corresponding to 2nd transmission duration(s) up to a 2nd value
3010

Trigger an SR in response to uplink resources not being available for transmission of a triggered BSR, where the triggered BSR is in response to uplink data becoming available for one of the 1st logical channel or the 2nd logical channel
3020

Transmit, to the base station, the SR via an SR resource that corresponds to a logical channel that triggered the BSR, the SR resource being one of: the 1st SR resource that corresponds to the 1st logical channel; or the 2nd SR resource that corresponds to the 2nd logical channel
3030

Receive, from the base station in response to the transmisssion of the SR, an uplink grant for transmission of transport block(s) in a transmission duration that corresponds to the one of the 1st logical channel or the 2nd logical channel
3040

FIG. 30

Receive, by a wireless device from a base station, message(s) indicating: a 1st SR resource, of the base station, corresponding to a 1st logical channel; and a 2nd SR resource, of the base station, corresponding to a 2nd logical channel
3110

Trigger an SR in response to uplink resources not being available for transmission of a triggered BSR, where the triggered BSR is in response to uplink data becoming available for one of the 1st logical channel or the 2nd logical channel
3120

Transmit, to the base station, the SR via an SR resource that corresponds to a logical channel that triggered the BSR, the SR resource being one of: the 1st SR resource that corresponds to the 1st logical channel; or the 2nd SR resource that corresponds to the 2nd logical channel
3130

Receive, from the base station in response to the transmisssion of the SR, an uplink grant for transmission of transport block(s)
3140

FIG. 31

```
┌─────────────────────────────────────────────────────┐
│ Receive, by a wireless device, message(s) comprising: 1st SR
│ configuration parameters indicating a 1st timer value for a 1st
│ timer; 2nd SR configuration parameters indicating a 2nd timer
│ value for a 2nd timer; and logical channel configuration
│ parameters for logical channel(s) corresponding to transmission
│                      duration(s)
│                         3210
└─────────────────────────────────────────────────────┘
                            │
                            ▼
┌─────────────────────────────────────────────────────┐
│ Receive downlink control information indicating uplink grant(s)
│        associated with the transmission duration(s)
│                         3220
└─────────────────────────────────────────────────────┘
                            │
                            ▼
       ⟨ Logical channel(s) comprise
         1st logical channel(s) with available data for transmission?
                         3230 ⟩
                            │ Yes
                            ▼
       ⟨ 1st size of the uplink grant(s) > 2nd size of the 2st logical
                  channel(s) with available data?
                         3240 ⟩
                            │ Yes
                            ▼
┌─────────────────────────────────────────────────────┐
│ Cancel a 1 SR corresponding to the 1st SR configuration and a
│    2nd SR corresponding to the 2nd SR configuration
│                         3250
└─────────────────────────────────────────────────────┘
                            │
                            ▼
┌─────────────────────────────────────────────────────┐
│            Stop the 1st timer and the 2nd timer
│                         3260
└─────────────────────────────────────────────────────┘
```

FIG. 32

Receive, by a wireless device, configuration parameters comprising: a 1st parameter for a logical channel in 1st logical channel(s) or 2nd logical channel(s); a 1st timer value for a 1st timer corresponding to the 1st logical channel(s); and a 2nd timer value for a 2nd timer corresponding to the 2nd logical channel
3610

Trigger a a buffer status report in response to data becoming available to the logical channel
3620

Start 1st timer(s) or the 2nd timer based on whether the 1st logical channel(s) comprise the logical channel or 2nd logical channel(s) comprise the logical channel
3630

Transmit a scheduling request in response to: uplink resources not being available for transmitting the buffer status report; and the 1st timer(s) or the second timer not running
3640

FIG. 36

SCHEDULING REQUEST FOR TRANSMISSION OF A BUFFER STATUS REPORT

CROSS-REFERENCE TO RELATED APPLICATION

This application is a continuation of U.S. patent application Ser. No. 15/971,307, filed May 4, 2018, which claims the benefit of U.S. Provisional Application No. 62/501,556, filed May 4, 2017, and U.S. Provisional Application No. 62/514,292, filed Jun. 2, 2017, which are hereby incorporated by reference in their entirety.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present invention.

FIG. 8 shows example TAG configurations as per an aspect of an embodiment of the present invention.

FIG. 10A and FIG. 10B are example diagrams for interfaces between a 5G core network (e.g. NGC) and base stations (e.g. gNB and eLTE eNB) as per an aspect of an embodiment of the present invention.

FIG. 11A, FIG. 11B, FIG. 11C, FIG. 11D, FIG. 11E, and FIG. 11F are example diagrams for architectures of tight interworking between 5G RAN (e.g. gNB) and LTE RAN (e.g. (e) LTE eNB) as per an aspect of an embodiment of the present invention.

FIG. 12A, FIG. 12B, and FIG. 12C are example diagrams for radio protocol structures of tight interworking bearers as per an aspect of an embodiment of the present invention.

FIG. 13A and FIG. 13B are example diagrams for gNB deployment scenarios as per an aspect of an embodiment of the present invention.

FIG. 30 is an example flow diagram as per an aspect of an embodiment of the present disclosure.

FIG. 31 is an example flow diagram as per an aspect of an embodiment of the present disclosure.

FIG. 32 is an example flow diagram as per an aspect of an embodiment of the present disclosure.

FIG. 36 is an example flow diagram as per an aspect of an embodiment of the present disclosure.

DETAILED DESCRIPTION OF EMBODIMENTS

Figure 1:
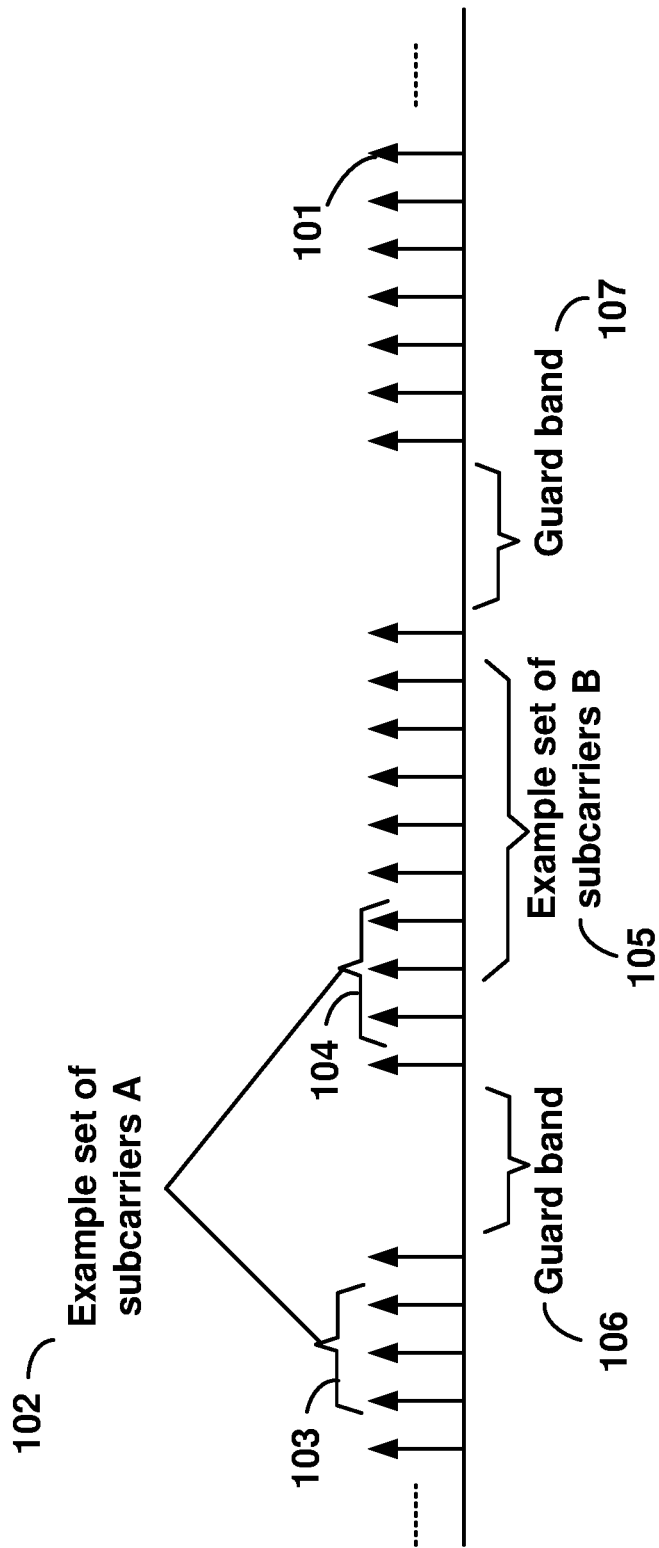
FIG. 1 is a diagram depicting example sets of OFDM subcarriers as per an aspect of an embodiment of the present invention.

Example embodiments of the present invention enable operation of carrier aggregation. Embodiments of the technology disclosed herein may be employed in the technical field of multicarrier communication systems. More particularly, the embodiments of the technology disclosed herein may relate to scheduling request in multicarrier communication systems.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
CP cyclic prefix
DL downlink
DCI downlink control information
DC dual connectivity
eMBB enhanced mobile broadband
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LTE long term evolution
MCG master cell group
MeNB master evolved node B
MIB master information block
MAC media access control
MAC media access control
MME mobility management entity
mMTC massive machine type communications
NAS non-access stratum
NR new radio
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG resource block groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TTI transmission time interval
TB transport block
UL uplink
UE user equipment
URLLC ultra-reliable low-latency communications
VHDL VHSIC hardware description language
CU central unit
Fs-C Fs-control plane
Fs-U Fs-user plane
gNB next generation node B
NGC next generation core
NG CP next generation control plane core
NG-C NG-control plane
NG-U NG-user plane
NR new radio
NR MAC new radio MAC
NR PHY new radio physical
NR PDCP new radio PDCP
NR RLC new radio RLC
NR RRC new radio RRC
NSSAI network slice selection assistance information
PLMN public land mobile network
UPGW user plane gateway
Xn-C Xn-control plane
Xn-U Xn-user plane
Xx-C Xx-control plane
Xx-U Xx-user plane Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
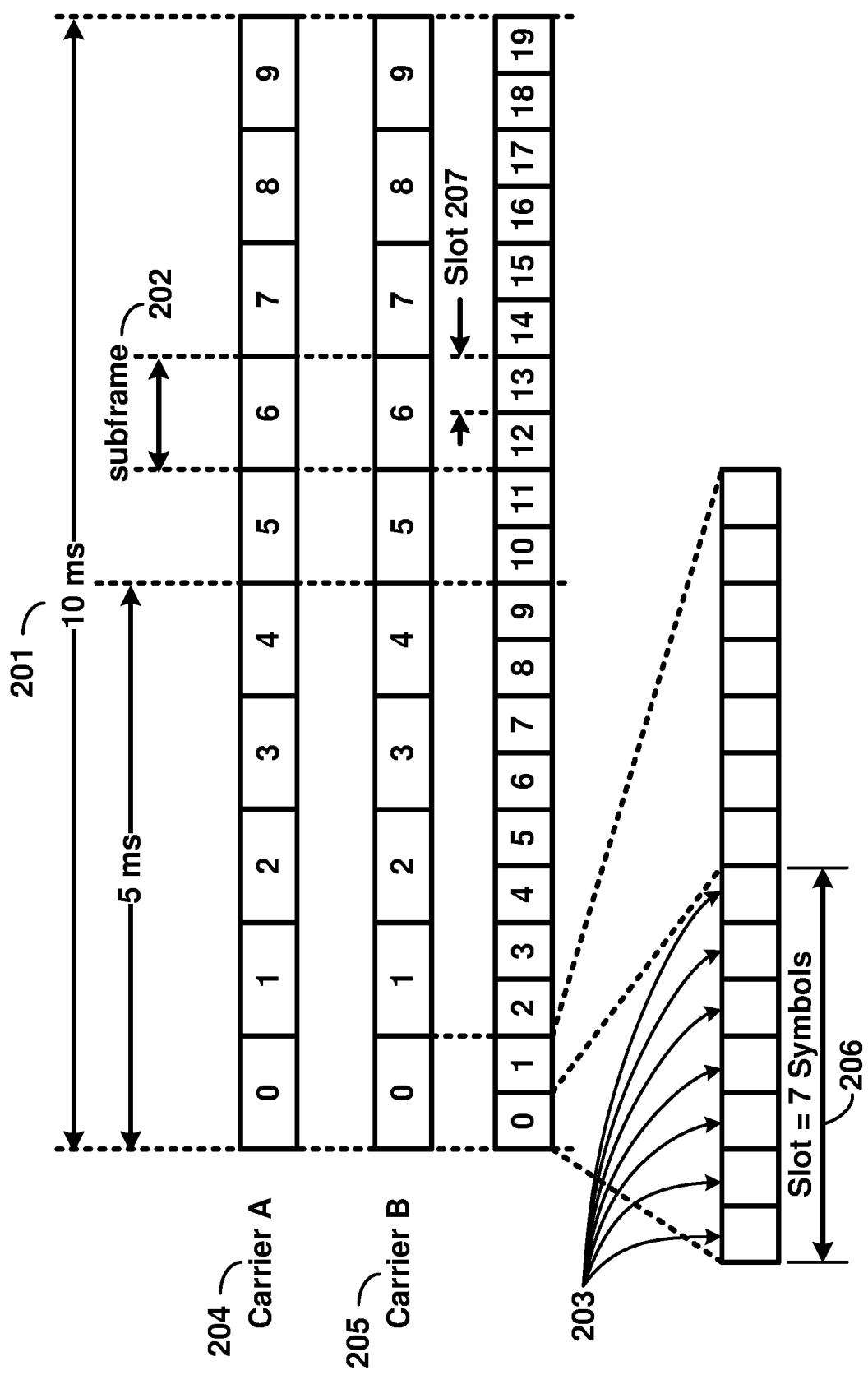
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may contain all downlink, all uplink, or a downlink part and an uplink part and/or alike. Slot aggregation may be supported, e.g., data transmission may be scheduled to span one or multiple slots. In an example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
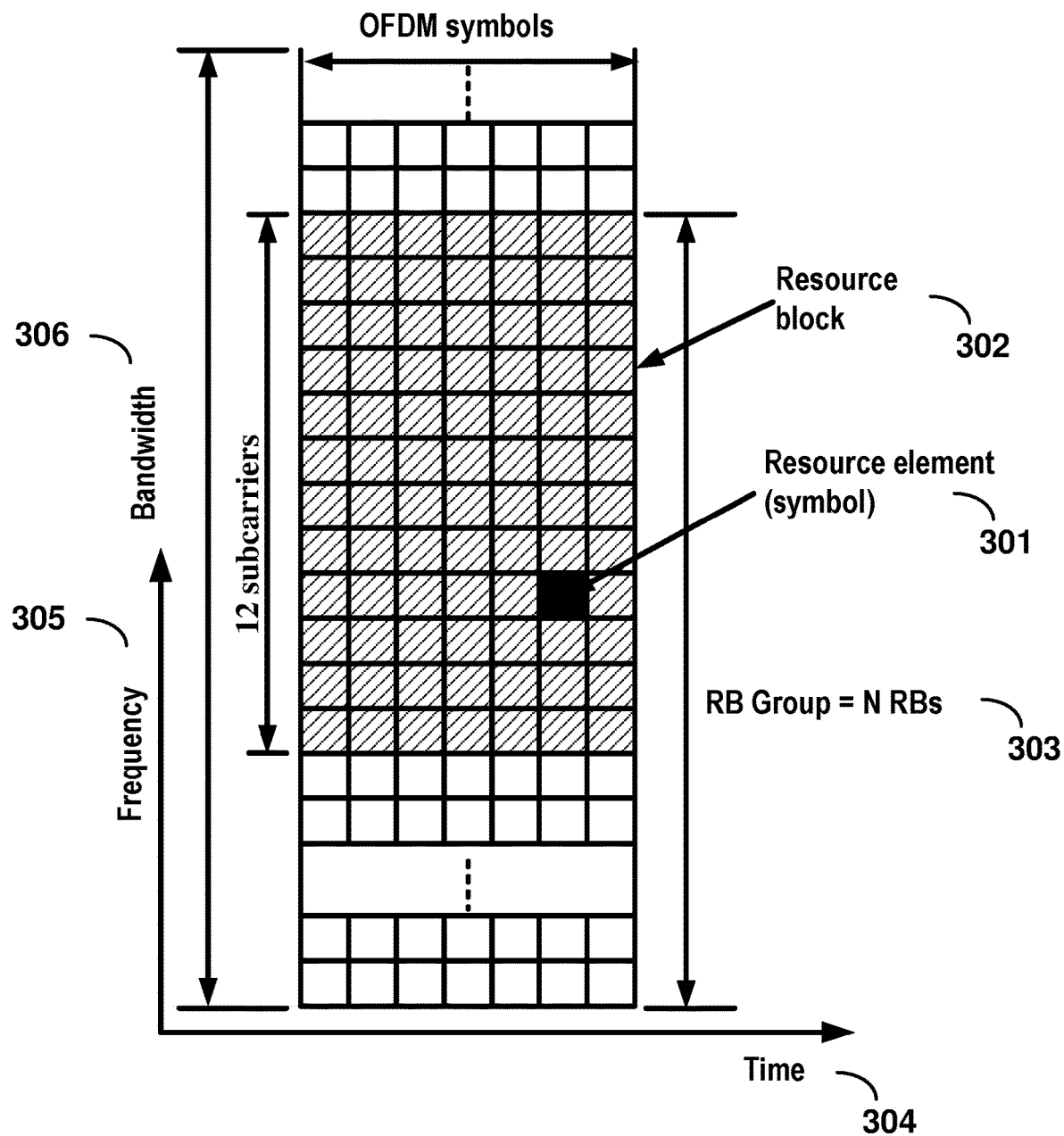
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

In an example embodiment, multiple numerologies may be supported. In an example, a numerology may be derived by scaling a basic subcarrier spacing by an integer N. In an example, scalable numerology may allow at least from 15 kHz to 480 kHz subcarrier spacing. The numerology with 15 kHz and scaled numerology with different subcarrier spacing with the same CP overhead may align at a symbol boundary every 1 ms in a NR carrier.

FIG. 5A, FIG. 5B, FIG. 5C and FIG. 5D are example diagrams for uplink and downlink signal transmission as per an aspect of an embodiment of the present invention. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
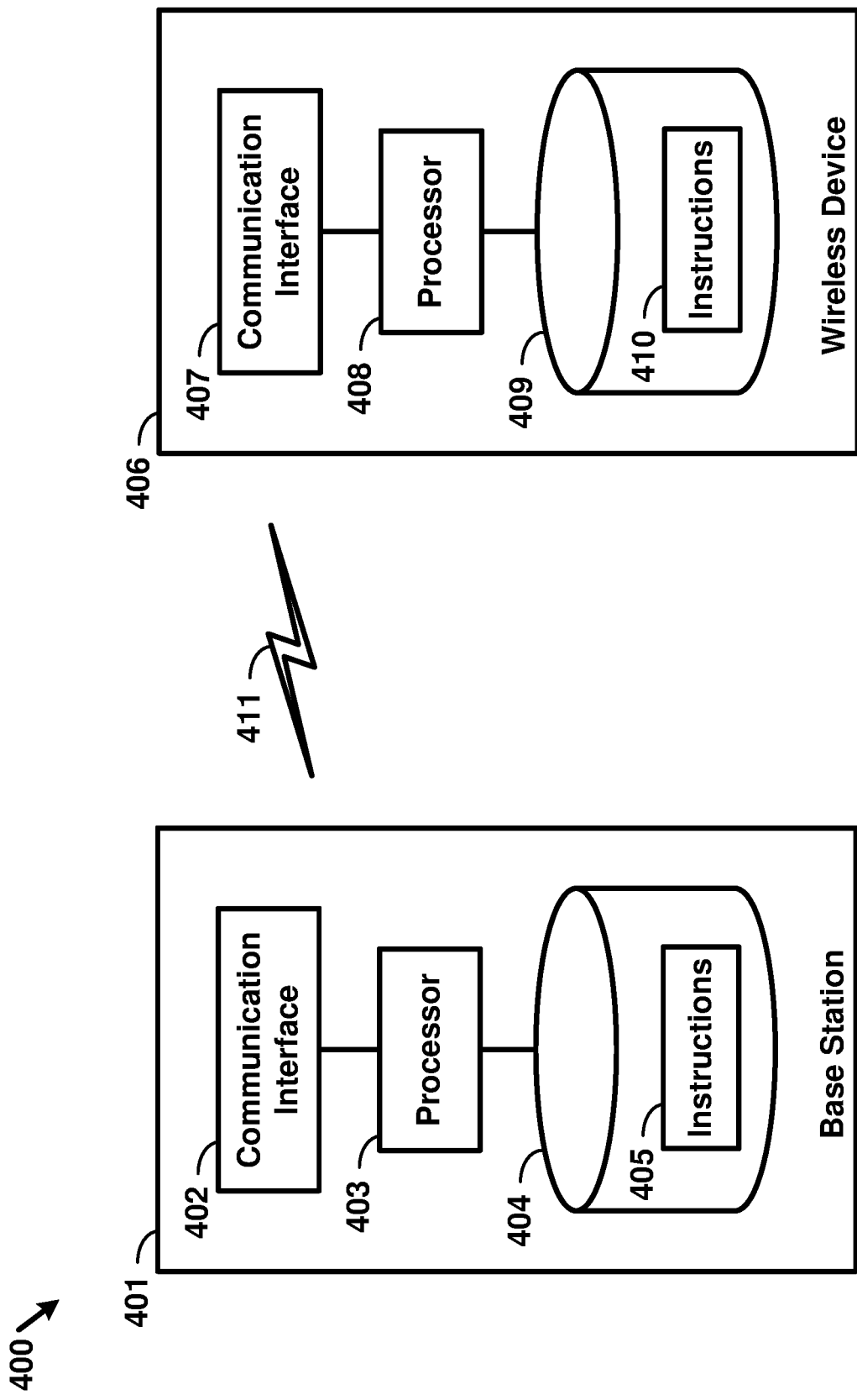
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to some of the various aspects of embodiments, a 5G network may include a multitude of base stations, providing a user plane NR PDCP/NR RLC/NR MAC/NR PHY and control plane (NR RRC) protocol terminations towards the wireless device. The base station(s) may be interconnected with other base station(s) (e.g. employing an Xn interface). The base stations may also be connected employing, for example, an NG interface to an NGC. FIG. 10A and FIG. 10B are example diagrams for interfaces between a 5G core network (e.g. NGC) and base stations (e.g. gNB and eLTE eNB) as per an aspect of an embodiment of the present invention. For example, the base stations may be interconnected to the NGC control plane (e.g. NG CP) employing the NG-C interface and to the NGC user plane (e.g. UPGW) employing the NG-U interface. The NG interface may support a many-to-many relation between 5G core networks and base stations.

A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

Figure 6:
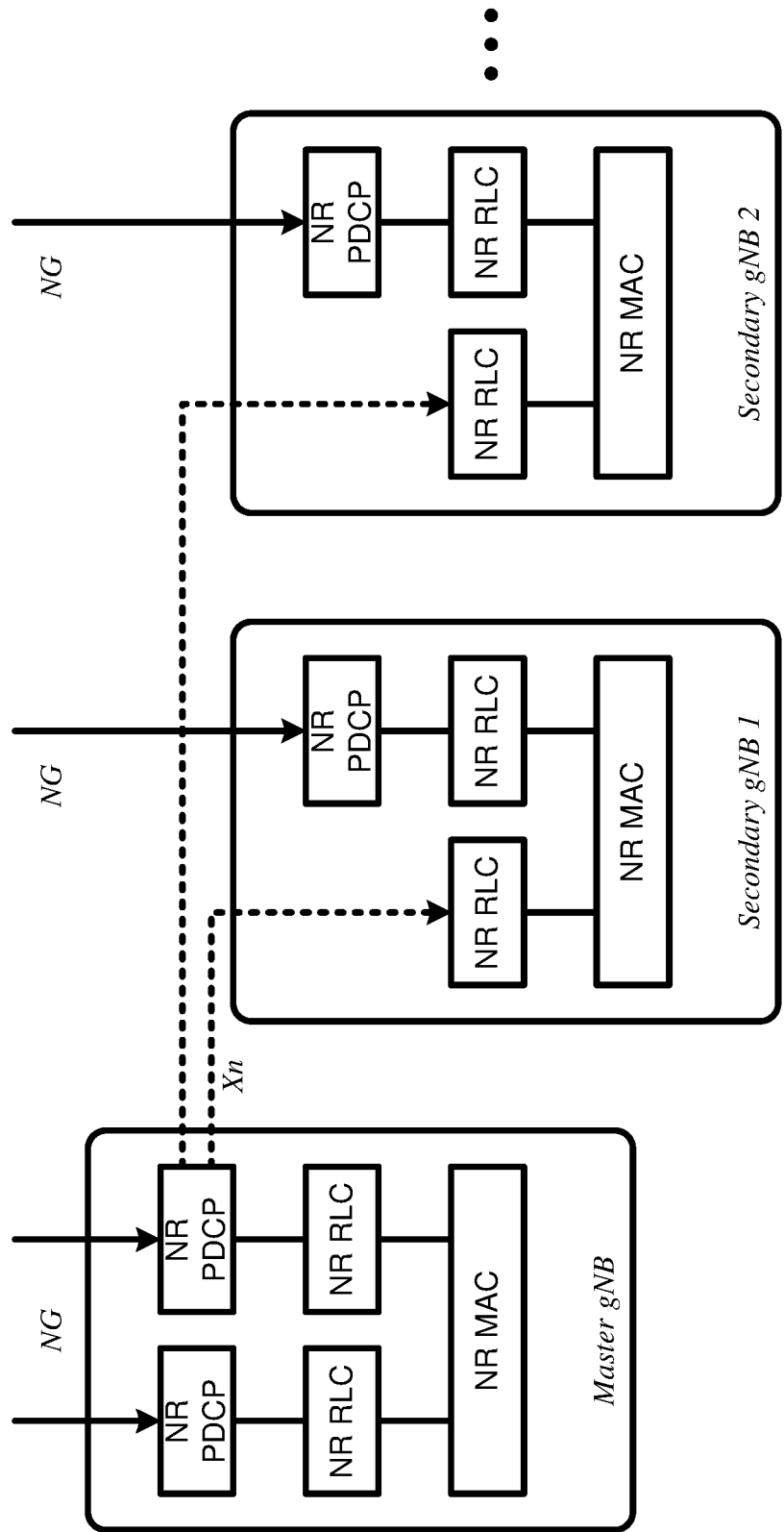
FIG. 6 is an example diagram for a protocol structure with multi-connectivity as per an aspect of an embodiment of the present invention.
Figure 7:
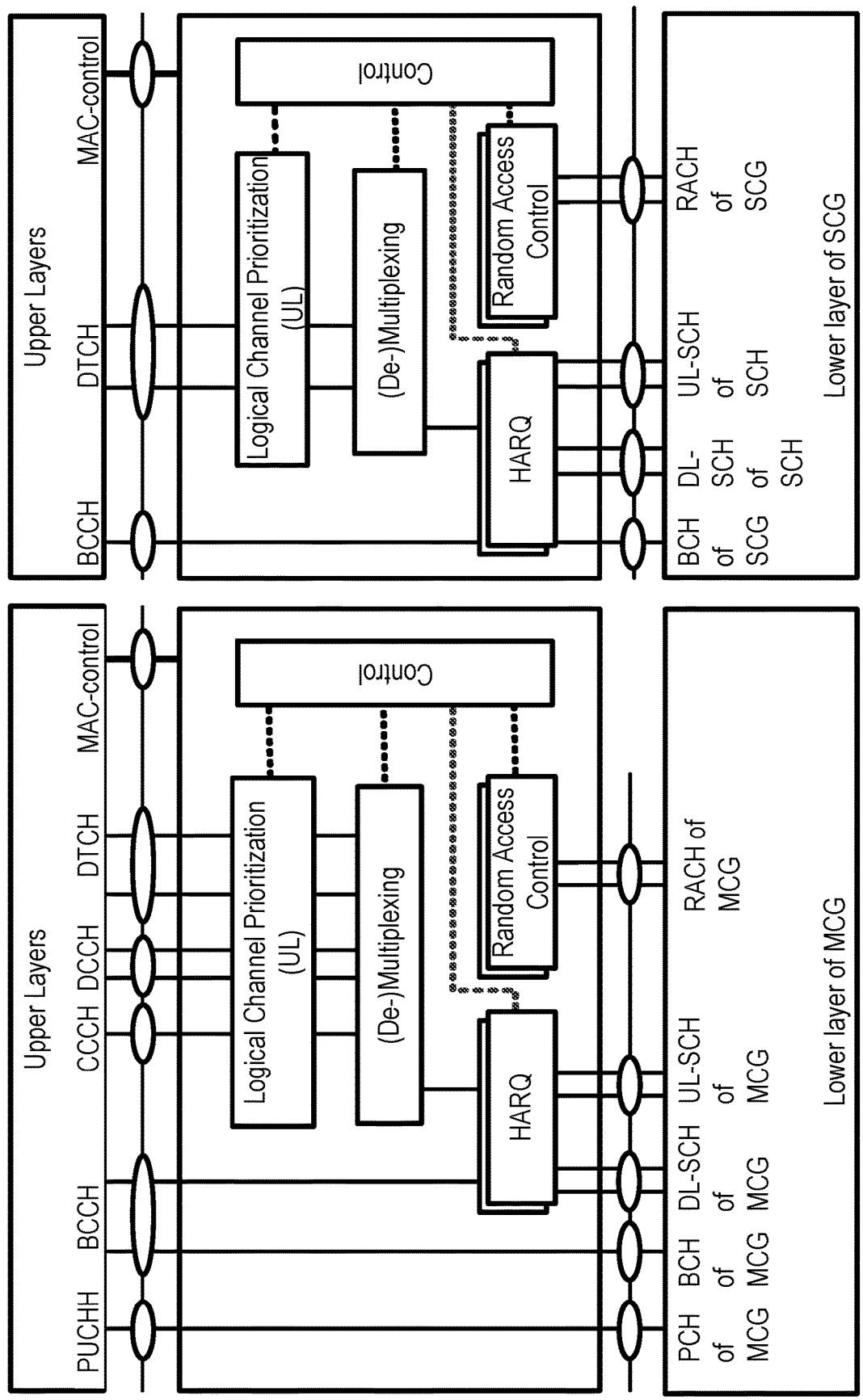
FIG. 7 is an example diagram for a protocol structure with CA and DC as per an aspect of an embodiment of the present invention.

FIG. 6 and FIG. 7 are example diagrams for protocol structure with CA and multi-connectivity as per an aspect of an embodiment of the present invention. NR may support multi-connectivity operation whereby a multiple RX/TX UE in RRC_CONNECTED may be configured to utilize radio resources provided by multiple schedulers located in multiple gNBs connected via a non-ideal or ideal backhaul over the Xn interface. gNBs involved in multi-connectivity for a certain UE may assume two different roles: a gNB may either act as a master gNB or as a secondary gNB. In multi-connectivity, a UE may be connected to one master gNB and one or more secondary gNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In multi-connectivity, the radio protocol architecture that a particular bearer uses may depend on how the bearer is setup. Three alternatives may exist, an MCG bearer, an SCG bearer and a split bearer as shown in FIG. 6. NR RRC may be located in master gNB and SRBs may be configured as a MCG bearer type and may use the radio resources of the master gNB. Multi-connectivity may also be described as having at least one bearer configured to use radio resources provided by the secondary gNB. Multi-connectivity may or may not be configured/implemented in example embodiments of the invention.

In the case of multi-connectivity, the UE may be configured with multiple NR MAC entities: one NR MAC entity for master gNB, and other NR MAC entities for secondary gNBs. In multi-connectivity, the configured set of serving cells for a UE may comprise of two subsets: the Master Cell Group (MCG) containing the serving cells of the master gNB, and the Secondary Cell Groups (SCGs) containing the serving cells of the secondary gNBs. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of NR RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master gNB may be informed by the UE of a SCG failure type, for split bearer, the DL data transfer over the master gNB is maintained; the NR RLC AM bearer may be configured for the split bearer; like PCell, PSCell may not be de-activated; PSCell may be changed with a SCG change (e.g. with security key change and a RACH procedure); and/or a direct bearer type change between a Split bearer and a SCG bearer or simultaneous configuration of a SCG and a Split bearer may or may not be supported.

With respect to the interaction between a master gNB and secondary gNBs for multi-connectivity, one or more of the following principles may be applied: the master gNB may maintain the RRM measurement configuration of the UE and may, (e.g., based on received measurement reports or traffic conditions or bearer types), decide to ask a secondary gNB to provide additional resources (serving cells) for a UE; upon receiving a request from the master gNB, a secondary gNB may create a container that may result in the configuration of additional serving cells for the UE (or decide that it has no resource available to do so); for UE capability coordination, the master gNB may provide (part of) the AS configuration and the UE capabilities to the secondary gNB; the master gNB and the secondary gNB may exchange information about a UE configuration by employing of NR RRC containers (inter-node messages) carried in Xn messages; the secondary gNB may initiate a reconfiguration of its existing serving cells (e.g., PUCCH towards the secondary gNB); the secondary gNB may decide which cell is the PSCell within the SCG; the master gNB may or may not change the content of the NR RRC configuration provided by the secondary gNB; in the case of a SCG addition and a SCG SCell addition, the master gNB may provide the latest measurement results for the SCG cell(s); both a master gNB and secondary gNBs may know the SFN and subframe offset of each other by OAM, (e.g., for the purpose of DRX alignment and identification of a measurement gap). In an example, when adding a new SCG SCell, dedicated NR RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present invention. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
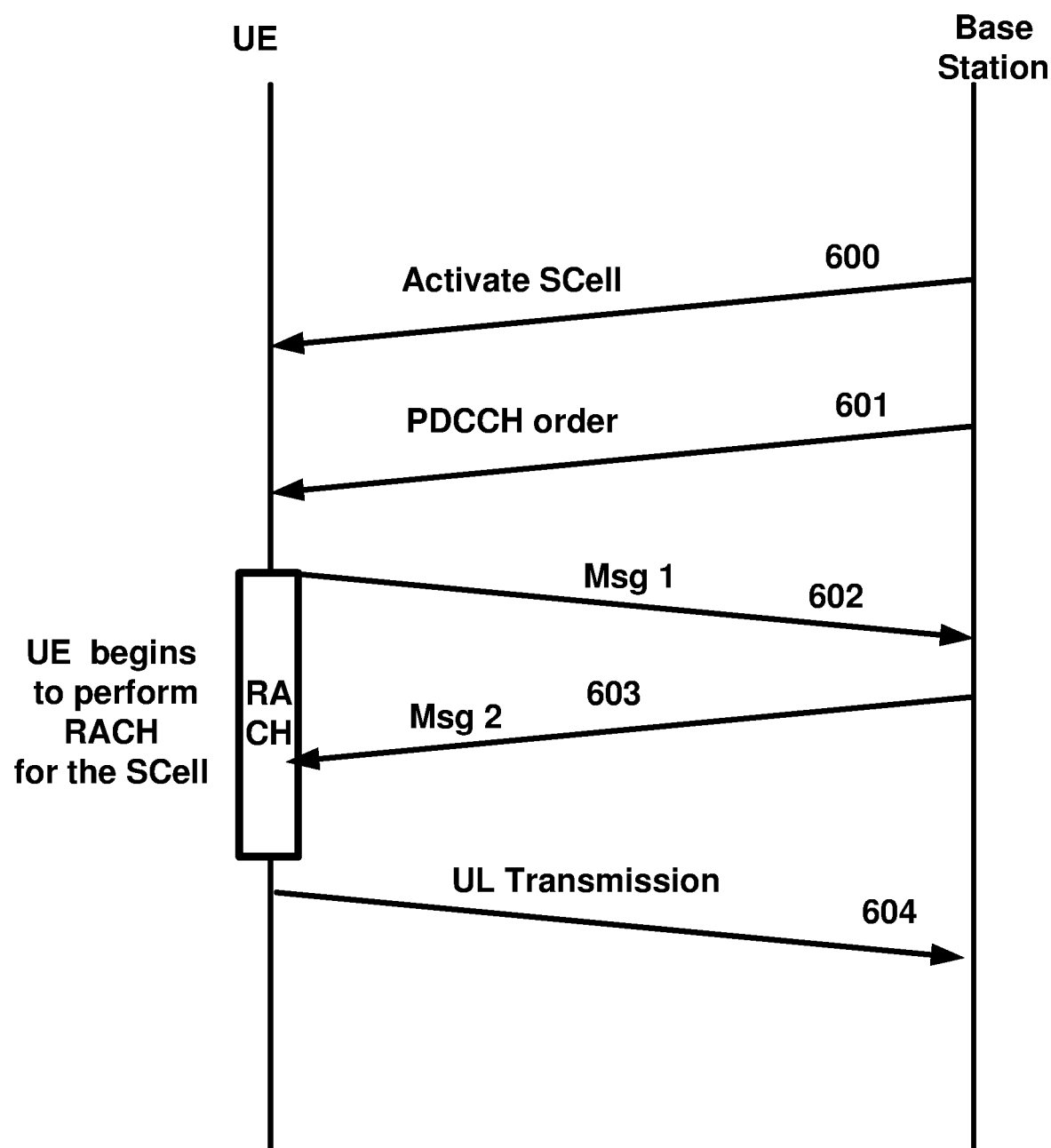
FIG. 9 is an example message flow in a random access process in a secondary TAG as per an aspect of an embodiment of the present invention.

FIG. 9 is an example message flow in a random access process in a secondary TAG as per an aspect of an embodiment of the present invention. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the invention may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

FIG. 11A, FIG. 11B, FIG. 11C, FIG. 11D, FIG. 11E, and FIG. 11F are example diagrams for architectures of tight interworking between 5G RAN and LTE RAN as per an aspect of an embodiment of the present invention. The tight interworking may enable a multiple RX/TX UE in RRC_CONNECTED to be configured to utilize radio resources provided by two schedulers located in two base stations (e.g. (e) LTE eNB and gNB) connected via a non-ideal or ideal backhaul over the Xx interface between LTE eNB and gNB or the Xn interface between eLTE eNB and gNB. Base stations involved in tight interworking for a certain UE may assume two different roles: a base station may either act as a master base station or as a secondary base station. In tight interworking, a UE may be connected to one master base station and one secondary base station. Mechanisms implemented in tight interworking may be extended to cover more than two base stations.

In FIG. 11A and FIG. 11B, a master base station may be an LTE eNB, which may be connected to EPC nodes (e.g. to an MME via the S1-C interface and to an S-GW via the S1-U interface), and a secondary base station may be a gNB, which may be a non-standalone node having a control plane connection via an Xx-C interface to an LTE eNB. In the tight interworking architecture of FIG. 11A, a user plane for a gNB may be connected to an S-GW through an LTE eNB via an Xx-U interface between LTE eNB and gNB and an S1-U interface between LTE eNB and S-GW. In the architecture of FIG. 11B, a user plane for a gNB may be connected directly to an S-GW via an S1-U interface between gNB and S-GW.

In FIG. 11C and FIG. 11D, a master base station may be a gNB, which may be connected to NGC nodes (e.g. to a control plane core node via the NG-C interface and to a user plane core node via the NG-U interface), and a secondary base station may be an eLTE eNB, which may be a non-standalone node having a control plane connection via an Xn-C interface to a gNB. In the tight interworking architecture of FIG. 11C, a user plane for an eLTE eNB may be connected to a user plane core node through a gNB via an Xn-U interface between eLTE eNB and gNB and an NG-U interface between gNB and user plane core node. In the architecture of FIG. 11D, a user plane for an eLTE eNB may be connected directly to a user plane core node via an NG-U interface between eLTE eNB and user plane core node.

In FIG. 11E and FIG. 11F, a master base station may be an eLTE eNB, which may be connected to NGC nodes (e.g. to a control plane core node via the NG-C interface and to a user plane core node via the NG-U interface), and a secondary base station may be a gNB, which may be a non-standalone node having a control plane connection via an Xn-C interface to an eLTE eNB. In the tight interworking architecture of FIG. 11E, a user plane for a gNB may be connected to a user plane core node through an eLTE eNB via an Xn-U interface between eLTE eNB and gNB and an NG-U interface between eLTE eNB and user plane core node. In the architecture of FIG. 11F, a user plane for a gNB may be connected directly to a user plane core node via an NG-U interface between gNB and user plane core node.

FIG. 12A, FIG. 12B, and FIG. 12C are example diagrams for radio protocol structures of tight interworking bearers as per an aspect of an embodiment of the present invention. In FIG. 12A, an LTE eNB may be a master base station, and a gNB may be a secondary base station. In FIG. 12B, a gNB may be a master base station, and an eLTE eNB may be a secondary base station. In FIG. 12C, an eLTE eNB may be a master base station, and a gNB may be a secondary base station. In 5G network, the radio protocol architecture that a particular bearer uses may depend on how the bearer is setup. Three alternatives may exist, an MCG bearer, an SCG bearer, and a split bearer as shown in FIG. 12A, FIG. 12B, and FIG. 12C. NR RRC may be located in master base station, and SRBs may be configured as an MCG bearer type and may use the radio resources of the master base station. Tight interworking may also be described as having at least one bearer configured to use radio resources provided by the secondary base station. Tight interworking may or may not be configured/implemented in example embodiments of the invention.

In the case of tight interworking, the UE may be configured with two MAC entities: one MAC entity for master base station, and one MAC entity for secondary base station. In tight interworking, the configured set of serving cells for a UE may comprise of two subsets: the Master Cell Group (MCG) containing the serving cells of the master base station, and the Secondary Cell Group (SCG) containing the serving cells of the secondary base station. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one split bearer; upon detection of a physical layer problem or a random access problem on a PSCell, or the maximum number of (NR) RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master base station may be informed by the UE of a SCG failure type, for split bearer, the DL data transfer over the master base station is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a master base station and a secondary base station, one or more of the following principles may be applied: the master base station may maintain the RRM measurement configuration of the UE and may, (e.g, based on received measurement reports, traffic conditions, or bearer types), decide to ask a secondary base station to provide additional resources (serving cells) for a UE; upon receiving a request from the master base station, a secondary base station may create a container that may result in the configuration of additional serving cells for the UE (or decide that it has no resource available to do so); for UE capability coordination, the master base station may provide (part of) the AS configuration and the UE capabilities to the secondary base station; the master base station and the secondary base station may exchange information about a UE configuration by employing of RRC containers (inter-node messages) carried in Xn or Xx messages; the secondary base station may initiate a reconfiguration of its existing serving cells (e.g., PUCCH towards the secondary base station); the secondary base station may decide which cell is the PSCell within the SCG; the master base station may not change the content of the RRC configuration provided by the secondary base station; in the case of a SCG addition and a SCG SCell addition, the master base station may provide the latest measurement results for the SCG cell(s); both a master base station and a secondary base station may know the SFN and subframe offset of each other by OAM, (e.g., for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

FIG. 13A and FIG. 13B are example diagrams for gNB deployment scenarios as per an aspect of an embodiment of the present invention. In the non-centralized deployment scenario in FIG. 13A, the full protocol stack (e.g. NR RRC, NR PDCP, NR RLC, NR MAC, and NR PHY) may be supported at one node. In the centralized deployment scenario in FIG. 13B, upper layers of gNB may be located in a Central Unit (CU), and lower layers of gNB may be located in Distributed Units (DU). The CU-DU interface (e.g. Fs interface) connecting CU and DU may be ideal or non-ideal. Fs-C may provide a control plane connection over Fs interface, and Fs-U may provide a user plane connection over Fs interface. In the centralized deployment, different functional split options between CU and DUs may be possible by locating different protocol layers (RAN functions) in CU and DU. The functional split may support flexibility to move RAN functions between CU and DU depending on service requirements and/or network environments. The functional split option may change during operation after Fs interface setup procedure, or may change only in Fs setup procedure (i.e. static during operation after Fs setup procedure).

Figure 14:
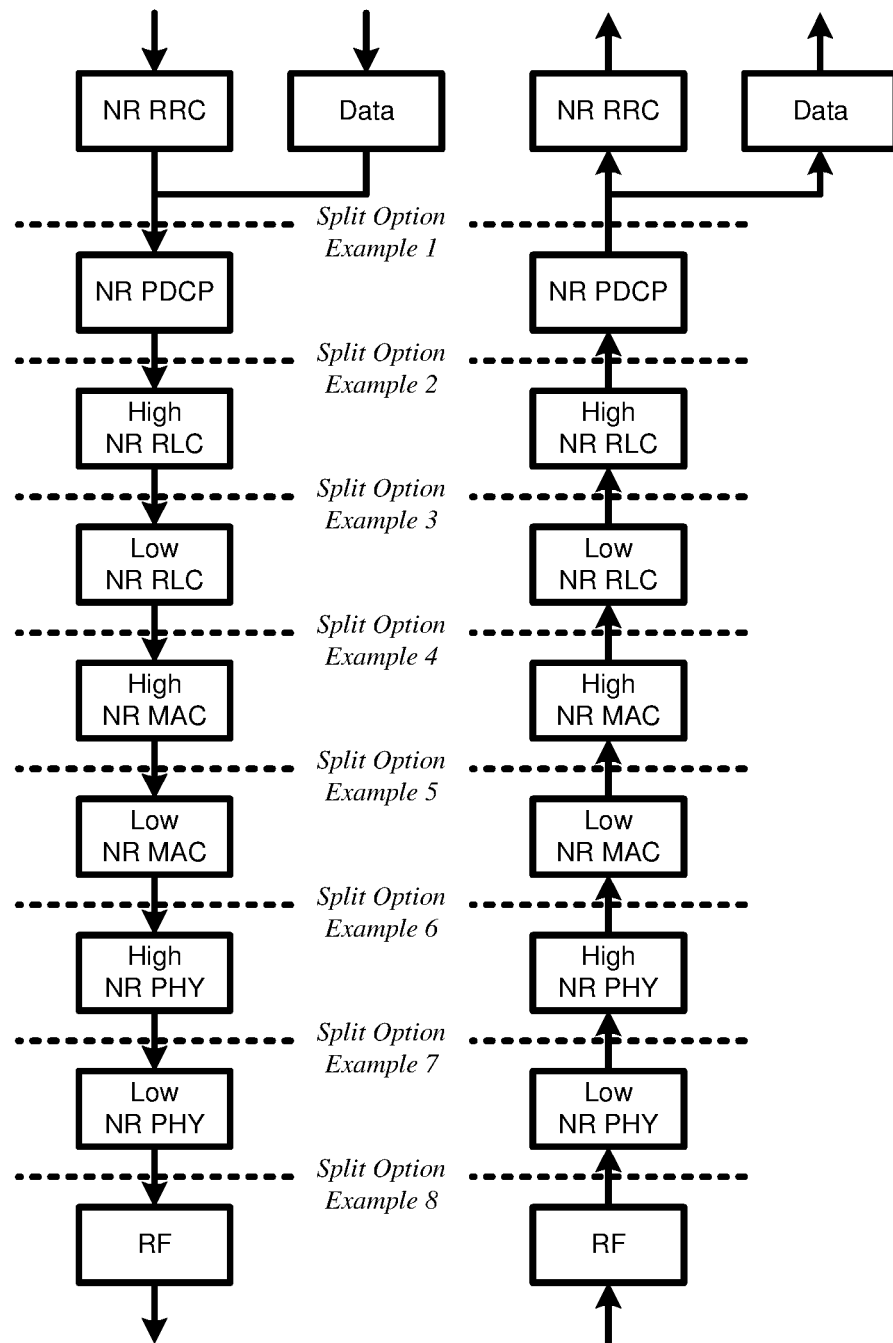
FIG. 14 is an example diagram for functional split option examples of the centralized gNB deployment scenario as per an aspect of an embodiment of the present invention.

FIG. 14 is an example diagram for different functional split option examples of the centralized gNB deployment scenario as per an aspect of an embodiment of the present invention. In the split option example 1, an NR RRC may be in CU, and NR PDCP, NR RLC, NR MAC, NR PHY, and RF may be in DU. In the split option example 2, an NR RRC and NR PDCP may be in CU, and NR RLC, NR MAC, NR PHY, and RF may be in DU. In the split option example 3, an NR RRC, NR PDCP, and partial function of NR RLC may be in CU, and the other partial function of NR RLC, NR MAC, NR PHY, and RF may be in DU. In the split option example 4, an NR RRC, NR PDCP, and NR RLC may be in CU, and NR MAC, NR PHY, and RF may be in DU. In the split option example 5, an NR RRC, NR PDCP, NR RLC, and partial function of NR MAC may be in CU, and the other partial function of NR MAC, NR PHY, and RF may be in DU. In the split option example 6, an NR RRC, NR PDCP, NR RLC, and NR MAC may be in CU, and NR PHY and RF may be in DU. In the split option example 7, an NR RRC, NR PDCP, NR RLC, NR MAC, and partial function of NR PHY may be in CU, and the other partial function of NR PHY and RF may be in DU. In the split option example 8, an NR RRC, NR PDCP, NR RLC, NR MAC, and NR PHY may be in CU, and RF may be in DU.

The functional split may be configured per CU, per DU, per UE, per bearer, per slice, or with other granularities. In per CU split, a CU may have a fixed split, and DUs may be configured to match the split option of CU. In per DU split, each DU may be configured with a different split, and a CU may provide different split options for different DUs. In per UE split, a gNB (CU and DU) may provide different split options for different UEs. In per bearer split, different split options may be utilized for different bearer types. In per slice splice, different split options may be applied for different slices.

In an example embodiment, the new radio access network (new RAN) may support different network slices, which may allow differentiated treatment customized to support different service requirements with end to end scope. The new RAN may provide a differentiated handling of traffic for different network slices that may be pre-configured, and may allow a single RAN node to support multiple slices. The new RAN may support selection of a RAN part for a given network slice, by one or more slice ID(s) or NSSAI(s) provided by a UE or a NGC (e.g. NG CP). The slice ID(s) or NSSAI(s) may identify one or more of pre-configured network slices in a PLMN. For initial attach, a UE may provide a slice ID and/or an NSSAI, and a RAN node (e.g. gNB) may use the slice ID or the NSSAI for routing an initial NAS signaling to an NGC control plane function (e.g. NG CP). If a UE does not provide any slice ID or NSSAI, a RAN node may send a NAS signaling to a default NGC control plane function. For subsequent accesses, the UE may provide a temporary ID for a slice identification, which may be assigned by the NGC control plane function, to enable a RAN node to route the NAS message to a relevant NGC control plane function. The new RAN may support resource isolation between slices. The RAN resource isolation may be achieved by avoiding that shortage of shared resources in one slice breaks a service level agreement for another slice.

The amount of data traffic carried over cellular networks is expected to increase for many years to come. The number of users/devices is increasing and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, can be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs; time & frequency synchronization of UEs.

In an example embodiment, DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the UE. The UL LBT scheme may be different from the DL LBT scheme (e.g. by using different LBT mechanisms or parameters) for example, since the LAA UL is based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a UE perspective may be a continuous transmission from a UE with no transmission immediately before or after from the same UE on the same CC. In an example, UL transmission burst is defined from a UE perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

In an example, a base station may configure a wireless device with a plurality of logical channels. A logical channel may correspond to at least one data radio bearer and/or at least one signaling radio bearer. A radio bearer and/or a signaling bearer may be associated with a quality of service (QoS) requirement (e.g., throughput, latency, jitter, etc.). The logical channel configuration parameters may comprise a plurality of parameters such as priority and/or prioritized bit rate (PBR) and/or bucket size duration (BSD), etc. In an example, one or more of the parameters configured for one or more logical channels may be employed by a logical channel prioritization procedure to multiplex data from a plurality of logical channels in a transport block (TB). The configuration parameters for a logical channel may indicate if a logical channel may be mapped to a cell type (e.g., licensed, unlicensed, mm-Wave, ultra-high frequency, etc.). The configuration parameters for a logical channel may indicate if a logical channel may be mapped to a TTI type/duration and/or a numerology and/or a service type (e.g., URLLC, eMBB, eMTC, etc.). The configuration parameters for a logical channel may indicate the maximum TTI duration that a logical channel may be mapped to.

In an example, a base station may control mapping of a logical channel (e.g., by the wireless device) to one or more numerologies and/or transmission time intervals (TTIs), e.g. TTI durations and/or cells and/or service types and/or groups. In an example, the mapping may be semi-static (e.g., with RRC configuration), dynamic (e.g., using physical layer and/or MAC layer signalling), pre-configured at the wireless device, hard split/soft split, etc. In an example, a wireless device may support a plurality of TTIs and/or numerologies from a single cell. In an example, a plurality of TTIs and/or numerologies and/or cells may be handled by a plurality of MAC entities. In an example, the plurality of TTIs and/or numerologies and/or cells may be grouped (e.g., based on band, types of service/QoS, etc.) and a group of TTIs/numerologies/cells may be handled by a MAC entity. In an example, the plurality of TTIs and/or numerologies and/or cells may be handled by a single MAC entity.

In an example, network/gNB may configure a radio bearer to be mapped to one or more numerologies/TTI durations/cells/service types. In an example, a MAC entity may support one or more numerologies/TTI durations/cells. In an example, a logical channel may be mapped to one or more numerologies/TTI durations/cells/cell types/service types. In an example, one or more logical channels may be mapped to a numerology/TTI duration/cell/cell type/service type. In an example, a HARQ entity may support one or more numerologies/TTI durations/cells/cell types/service types.

In an example, a buffer status reporting procedure may be used to provide a serving base station with information about the amount of data available for transmission in uplink buffers (e.g., uplink buffers associated with one or more logical channels and/or logical channel groups) associated with a MAC entity. In an example, a buffer status report (BSR) MAC CE may be transmitted by a wireless device to a serving base station if the wireless device has uplink resources (e.g., PUSCH or PUSCH like resources) for transmission of the BSR MAC CE. In an example, the BSR may comprise buffers status of one or more logical channels and/or logical channel groups. In an example, the BSR may be transmitted after the BSR is triggered. In an example, the SR may be triggered in response to one or more events. In an example, the one or more events may comprise data becoming available for one or more logical channels and/or logical channel groups. In an example, a scheduling request (SR) may be triggered if there are no uplink resources (e.g., PUSCH and/or PUSCH like resources) for transmission of the BSR. In an example, a wireless device may start a SR process in response to one or more SR triggers. In an example, one or more counters (e.g., SR_COUNTER, etc.) and/or one or more timers (e.g., sr-ProhibitTimer, etc.) may be configured for a SR process. In an example, the values of the one or more timers may be configured by one or more configuration messages (e.g., RRC). In an example, one or more maximum values may be configured (e.g., using one or more configuration messages, e.g., RRC) for the one or more counters (e.g., dsr-TransMax). In an example, a SR process may fail if as many as a configured number of (e.g., dsr-TransMax) SR signals associated with a SR process is transmitted and the wireless device does receive a useful grant.

In an example embodiment, a buffer status report (BSR) may be triggered due to data becoming available for one or more logical channel and/or one or more logical channel groups. In an example, a scheduling request (SR) may be triggered if the wireless device may not transmit the BSR due to lack of uplink resources (e.g., PUSCH and/or PUSCH-like resources). The wireless device may transmit the SR using a physical uplink control channel (e.g., PUCCH and/or a PUCCH-like channel). In an example, the SR may distinguish/indicate the one or more logical channels and/or the one or more logical channel groups that triggered the BSR. In an example embodiment, the SR may distinguish one or more numerology/TTI types of the one or more logical channel and/or the one or more logical channel group that triggered the SR. In an example, the SR may distinguish a requested service type (e.g., URLLC, eMBB, eMTC, and/or the like) and/or the requested cell type (e.g., licensed, unlicensed, cell in mm-wave and/or other high-frequency cells and/or the like), wherein the requested service type and/or the requested cell type may depend on the one or more logical channels and/or the one or more logical channel groups that triggered the BSR. In an example, the base station may take into account the information indicated by the SR (e.g., the one or more indicated logical channels and/or the one or more indicated logical channel groups and/or the one or more indicated TTIs/numerologies and/or the one or more service types and/or the one or more cell types) and transmit a grant to the wireless device based on the information indicated by the SR.

In an example embodiment, the base station may configure (e.g., using one or more radio resource control (RRC) messages and or other configuration messages) a wireless device with a plurality of scheduling request configurations (e.g., resource configuration). In an example, a scheduling request in the plurality of scheduling requests may correspond to one or more logical channels and/or one or more logical channel groups and/or one or more service types and/or one or more TTIs/numerologies and/or one or more cell types. In an example embodiment, the base station may configure a wireless device with a plurality of SR configurations for a same cell. In an example, the same cell may be a primary cell and/or a secondary cell. In an example, a scheduling request in the plurality of scheduling requests may be configured with a SR configuration index. In an example, a scheduling request in the plurality of scheduling requests may indicate a plurality of SR resources. A SR resource may indicate a time (e.g., TTI) and/or frequency (e.g., resource block/element) and/or code and/or antenna port. In an example, two or more SR resources may share a same time and/or frequency resource and/or antenna port and may use different code resources. In an example, two or more SR resource may share a same time/frequency/antenna port/code resource. In an example, the plurality of SR resources may be indicated using one or more parameters, e.g., a periodicity and/or an offset parameter. In an example, the SR configuration index may indicate at least the SR periodicity and/or the offset. In an example, the SR resources for two or more SR configurations may be configured at the same time (e.g., TTI). In an example, one or more SR resources corresponding to two or more SR configurations may be shared among the two more SR configuration. In an example, gNB may distinguish the two or more SR signals corresponding to the two or more SR configurations transmitted at the same time (e.g., TTI).

In an example, a first SR configuration may indicate a first set of one or more TTIs and/or numerologies and a second SR configuration may indicate a second set of the one or more TTIs and/or numerologies. In an example, a third SR configuration may indicate the first set of one or more TTIs and/or numerologies and the second set of one or more TTIs and/or numerologies. In an example, a first SR configuration may indicate a first one or more logical channels and/or a first one or more logical channel groups and a second SR configuration may indicate a second one or more logical channels and/or a second one or more logical channel groups. In an example, a third SR configuration may indicate the first one or more logical channels and/or logical channel groups and the second one or more logical channels and one or more logical channel groups. In an example, a first SR configuration may indicate a first service type (e.g., URLLC, eMBB, eMTC, etc.) and a second SR configuration may indicate a second service type. In an example, a third SR configuration may indicate the first service type and the second service type. In an example, a first SR configuration may indicate a first cell type (e.g., licensed, unlicensed, cell in mm-wave and/or other high-frequency cells and/or the like) and a second SR configuration may indicate a second cell type. In an example, a third SR configuration may indicate the first cell type and the second cell type.

In an example embodiment, a base station may configure (e.g., using one or more radio resource control (RRC) messages and/or other configuration messages) a wireless device with a multi-bit SR. In an example, a multi-bit SR may comprise a plurality of bits (e.g., 2, 3, 4, etc.). In an example, the base station may configure the wireless device with a plurality of SR configurations. In an example, a first SR configuration in the plurality of SR configurations may be have a multi-bit SR configuration. In an example, a second SR configuration in the plurality of SR configurations may be have a single-bit SR configuration. In an example, a first SR field value of a multi-bit SR may indicate a first set of one or more TTIs and/or numerologies and a second field value of the multi-bit SR may indicate a second set of the one or more TTIs and/or numerologies. In an example, a third SR field value of the multi-bit SR may indicate the first set of one or more TTIs and/or numerologies and the second set of one or more TTIs and/or numerologies. In an example, a first SR field value of a multi-bit SR may indicate a first one or more logical channels and/or a first one or more logical channel groups and a second SR field value of the multi-bit SR may indicate a second one or more logical channels and/or a second one or more logical channel groups. In an example, a third SR field value of the multi-bit SR may indicate the first one or more logical channels and/or logical channel groups and the second one or more logical channels and one or more logical channel groups. In an example, a first SR field value of a multi-bit SR may indicate a first service type (e.g., URLLC, eMBB, eMTC, etc.) and a second SR field value of the multi-bit SR may indicate a second service type. In an example, a third SR field value may indicate the first service type and the second service type. In an example, a first SR field value of a multi-bit SR may indicate a first cell type (e.g., licensed, unlicensed, cell in mm-wave and/or other high-frequency cells and/or the like) and a second SR field value of the multi-bit SR may indicate a second cell type. In an example, a third SR field value may indicate the first cell type and the second cell type.

A first scheduling request may indicate one or more uplink grants are requested for one or more first logical channels/logical channel groups/TTIs/numerologies/cell types/service types. A second scheduling request may indicate one or more uplink grants are requested for one or more second logical channels/logical channel groups/TTIs/numerologies/cell types/service types. In legacy scheduling request procedure, a SR process does not indicate the type of requested uplink grant (e.g., employable by one or more logical channels/logical channel groups/TTIs/numerologies/cell types/service types). A plurality of triggered SRs correspond to a single SR process in the legacy SR procedure. Example embodiments enhance the legacy SR procedure to handle a plurality of SR processes. The embodiments disclose methods for starting a new SR process when an SR process is ongoing and/or methods to cancel an ongoing SR process when a new SR process starts. The embodiments enhance the efficiency of the scheduling request procedure by indicating that uplink resources are requested for one or more logical channels/logical channel groups/TTIs/numerologies/cell types/service types and efficiently handling (e.g., starting and/or canceling) a plurality of SR processes.

In an example embodiment, a wireless device may receive one or more messages comprising configuration parameters for one or more cells. In an example, the one or more messages may comprise one or more radio resource control (RRC) messages. The wireless device may start a first scheduling request process in response to a first SR trigger corresponding to one or more first events. In an example, the wireless device may trigger a second SR corresponding to one or more second events while the first SR process is ongoing. The wireless device may start a second SR process when one or more criteria are met. In an example, the wireless device may not start the second SR process if the one or more criteria are not met. The wireless device may transmit an SR signal via an uplink control channel in response to starting the second SR process. In an example, the wireless device may receive an uplink grant (e.g., by receiving a downlink control information (DCI) comprising/indicating the uplink grant) for a cell comprising transmission parameters for one or more transport blocks (TBs). In an example, the transmission parameters may comprise, transport block size, power control, radio resource allocation parameters, TTI/numerology and/or one or more TTIs/numerologies, MIMO parameters, etc. The wireless device may construct one or more TBs using the transmission parameters indicated in the uplink grant. The wireless device may transmit the one or more TBs employing the radio resource indicated by the uplink grant.

In an example, the configuration parameters may comprise parameters for a multi-bit SR. In an example, a first value of the multi-bit SR may indicate that the multi-bit SR is a request for at least one uplink grant for at least one first TTI/numerology and a second value of the multi-bit SR may indicate that the multi-bit SR is a request for at least one uplink grant for at least one second TTI/numerology. In an example, the one or more first events may comprise a first buffer status report (BSR) corresponding to the first SR being triggered due to data becoming available for at least one first logical channel being mapped to the at least one first TTI/numerology. In an example, the one or more second events may comprise a second buffer status report (BSR) corresponding to the second SR being triggered due to data becoming available for at least one second logical channel being mapped to the at least one second TTI/numerology.

In an example implementation, a first value of the multi-bit SR may indicate that at least one uplink grant for at least one first service type is requested and a second value of the multi-bit SR may indicate that at least one uplink grant for at least one second service type is requested. In an example, the one or more first events may comprise a first buffer status report (BSR) corresponding to the first SR being triggered due to data becoming available for at least one first logical channel corresponding to the first service type. In an example, the one or more second events may comprise a second buffer status report (BSR) corresponding to the second SR being triggered due to data becoming available for at least one second logical channel corresponding to the second service type.

In an example implementation, a first value of the multi-bit SR may indicate that at least one uplink grant for at least one first cell type is requested and a second value of the multi-bit SR may indicate that at least one uplink grant for at least one second cell type is requested. In an example, the one or more first events may comprise a first buffer status report (BSR) corresponding to the first SR being triggered due to data becoming available for at least one first logical channel corresponding to and/or mapped to the first cell type. In an example, the one or more second events may comprise a second buffer status report (BSR) corresponding to the second SR being triggered due to data becoming available for at least one second logical channel corresponding to and/or mapped to the second cell type.

In an example implementation, a first value of the multi-bit SR may indicate that at least one uplink grant for at least one first logical channel is requested and a second value of the multi-bit SR may indicate that at least one uplink grant for at least one second logical channel is requested. In an example, the one or more first events may comprise a first buffer status report (BSR) corresponding to the first SR being triggered due to data becoming available for the at least one first logical channel. In an example, the one or more second events may comprise a second buffer status report (BSR) corresponding to the second SR being triggered due to data becoming available for the at least one second logical channel.

In an example implementation, a first value of the multi-bit SR may indicate that at least one uplink grant for at least one first logical channel group is requested and a second value of the multi-bit SR may indicate that at least one uplink grant for at least one second logical channel group is requested. In an example, the one or more first events may comprise a first buffer status report (BSR) corresponding to the first SR being triggered due to data becoming available for the at least one first logical channel in the at least one first logical channel group. In an example, the one or more second events may comprise a second buffer status report (BSR) corresponding to the second SR being triggered due to data becoming available for at least one second logical channel in the at least one second logical channel group.

In an example, the configuration parameters may comprise parameters for a plurality of SR resource configurations. In an example, the plurality of SR resource configurations may be on a same cell. In an example, the plurality of SR configurations may be for a plurality of cells. An SR configuration in the plurality of SR configurations may be associated with a SR configuration index. In an example, a first SR configuration may indicate that at least one uplink grant for at least one first TTI/numerology is requested and a second SR configuration may indicate that at least one uplink grant for at least one second TTI/numerology is requested. In an example, the one or more first events may comprise a first buffer status report (BSR) corresponding to the first SR being triggered due to data becoming available for at least one first logical channel being mapped to the at least one first TTI/numerology. In an example, the one or more second events may comprise a second buffer status report (BSR) corresponding to the second SR being triggered due to data becoming available for at least one second logical channel being mapped to the at least one second TTI/numerology.

In an example, a first SR configuration may indicate that at least one uplink grant for at least one first service type is requested and a second SR configuration may indicate that at least one uplink grant for at least one second service type is requested. In an example, the one or more first events may comprise a first buffer status report (BSR) corresponding to the first SR being triggered due to data becoming available for at least one first logical channel corresponding to the at least one first service type. In an example, the one or more second events may comprise a second buffer status report (BSR) corresponding to the second SR being triggered due to data becoming available for at least one second logical channel corresponding to the at least one second service type.

In an example, a first SR configuration may indicate that at least one uplink grant for at least one first cell type is requested and a second SR configuration may indicate that at least one grant for at least one second cell type is requested. In an example, the one or more first events may comprise a first buffer status report (BSR) corresponding to the first SR being triggered due to data becoming available for at least one first logical channel corresponding to and/or mapped to the at least one first cell type. In an example, the one or more second events may comprise a second buffer status report (BSR) corresponding to the second SR being triggered due to data becoming available for at least one second logical channel corresponding to and/or mapped to the at least one second cell type.

In an example, a first SR configuration may indicate that at least one uplink grant for at least one first cell type is requested and a second SR configuration may indicate that at least one uplink grant for at least one second cell type is requested. In an example, the one or more first events may comprise a first buffer status report (BSR) corresponding to the first SR being triggered due to data becoming available for at least one first logical channel corresponding to and/or mapped to the at least one first cell type. In an example, the one or more second events may comprise a second buffer status report (BSR) corresponding to the second SR being triggered due to data becoming available for at least one second logical channel corresponding to and/or mapped to the at least one second cell type.

In an example, a first SR configuration may indicate that at least one uplink grant for at least one first logical channel is requested and a second SR configuration may indicate that at least one uplink grant for at least one second logical channel is requested. In an example, the one or more first events may comprise a first buffer status report (BSR) corresponding to the first SR being triggered due to data becoming available for the at least one first logical channel. In an example, the one or more second events may comprise a second buffer status report (BSR) corresponding to the second SR being triggered due to data becoming available for the at least one second logical channel.

In an example, a first SR configuration may indicate that at least one uplink grant for at least one first logical channel group is requested and a second SR configuration may indicate that at least one uplink grant for at least one second logical channel group is requested. In an example, the one or more first events may comprise a first buffer status report (BSR) corresponding to the first SR being triggered due to data becoming available for at least one first logical channel in the at least one first logical channel group. In an example, the one or more second events may comprise a second buffer status report (BSR) corresponding to the second SR being triggered due to data becoming available for at least one second logical channel in the at least one second logical channel group.

In an example, the one or more criteria may comprise that a priority of the at least one second logical channel is higher than and/or equal to a priority of the at least one first logical channel. In an example, the one or more criteria may comprise the triggering of the second SR and may be independent of the priority of the one or more second logical channels, e.g., the priority of the one or more logical channels may be higher, equal or lower than the priority of the one or more first logical channels.

In an example, the one or more criteria may comprise a first SR resource configured for the second SR (e.g., as indicated by the SR resource configuration corresponding to the second SR) occurring before the next SR resource for the first SR process (e.g., as indicated by the SR resource configuration corresponding to the second SR). In an example, the one or more criteria may comprise a first SR resource for the second SR occurring before a threshold number of TTIs and/or time before the next SR resource for the first SR process. In an example, the one or more criteria may comprise a first SR resource for the second SR occurring before a threshold number of TTIs and/or time. In an example, the one or more criteria may comprise the periodicity of the second SR being smaller than the periodicity of the first SR and/or the periodicity of the second SR being smaller than a threshold (e.g., a threshold time and/or a threshold number of a TTI) and/or the periodicity of the second SR being a configurable number of times smaller than the periodicity of the first SR. In an example, the one or more criteria may comprise a value of a first counter corresponding to the first SR process being larger than or equal to a first configurable value. In an example, the threshold values may be configurable (e.g., using RRC and/or dynamic signaling such as DCI).

In an example implementation, the wireless device may cancel the first SR process when the one or more criteria is met. In an example, the wireless device may, when the one or more criteria is met, abandon the first SR process. In an example, the wireless device may reset one or more counters corresponding to the first SR process. In an example, the wireless device may stop one or more timers corresponding to the first SR process. In an example the wireless device may update the multiple bits in the multi-bit SR of the first SR process to indicate the at least one second logical channel/logical channel group/TTI/numerology/service type/cell type, when the one or more criteria is met. In an example, the wireless device may keep values of counters and timers associated with first SR process and use the values for the updated SR process. In an example, the wireless device may reset one or more counters associated with the first SR process after updating the first SR process.

In an example, the wireless device may stop one or more timers associated with the first SR process after updating the first SR process.

In an example implementation, the wireless device may keep the first SR pending. In an example, the wireless device may use a second set of timers and/or counters for the second SR process. In an example, the second set of timers and/or counters may be different from the first set of timers and counters for the first SR process.

In an example, the multiple bits in the multi-bit SR may indicate that at least one grant for the at least one first logical channel/logical channel group/TTI/numerology/service type/cell type and at least one grant for the at least one second logical channel/logical channel group/TTI/numerology/service type/cell type are requested. In an example, the wireless device may update the multi-bit SR, indicating the at least one grant for the at least one first logical channel/logical channel group/TTI/numerology/service type/cell type and the at least one grant for the at least one second logical channel/logical channel group/TTI/numerology/service type/cell type, when the wireless device receives one or more grants for the at least one logical channel/logical channel group/TTI/numerology/service type/cell type and/or when the wireless device receives one or more grants for the at least one second logical channel/logical channel group/TTI/numerology/service type/cell type. For example, when the wireless device receives one or more grants for the at least one first logical channel/logical channel group/TTI/numerology/service type/cell type, the multi-bit SR, initially indicating that at least one grant for the at least one first logical channel/logical channel group/TTI/numerology/service type/cell type and at least one grant for the at least one second logical channel/logical channel group/TTI/numerology/service type/cell type are requested, may indicate that at least one grant for the at least one second logical channel/logical channel group/TTI/numerology/service type/cell type is requested.

In an example implementation, the wireless device may cancel the first SR process and the second SR process when a grant is received and a BSR is transmitted, wherein the BSR comprises status of buffers associated with the logical channels that triggered the first SR and the second SR. In an example, the wireless device may cancel the first SR process when a grant for the at least one first logical channel/logical channel group/TTI/numerology/service type/cell type is received. In an example, the wireless device may cancel the second SR process when a grant for the at least one second logical channel/logical channel group/TTI/numerology/service type/cell type is received.

Figure 15:
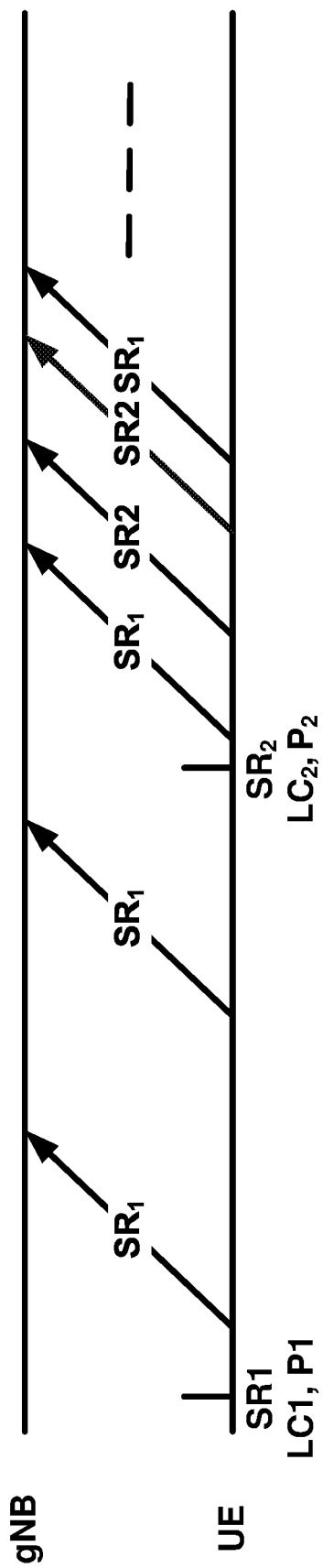
FIG. 15 is an illustration of an example scheduling request procedure as per an aspect of an embodiment of the present invention.

An Example scheduling request procedure is illustrated in FIG. 15 describing example wireless device behavior when a second SR process is triggered while a first SR process is ongoing. A first scheduling request (e.g., SR1) may be triggered, e.g., due to data becoming available to at least one first logical channel (e.g., logical channel 1 (LC1) with a priority P1). In an example, the wireless device may start a first SR process (SR1) after SR1 is triggered. The wireless device may transmit a SR signal corresponding to SR1 via a physical uplink control channel. In an example, the wireless device may use uplink resources configured for SR1 (e.g., for the at least one first logical channel and/or for the TTI and/or the numerology that the at least one first logical channel is mapped to and/or the for the service type corresponding to the at least one first logical channel and/or for the cell type that the at least one first logical channel is mapped to). In an example, the wireless device may transmit a multi-bit SR indicating resources are requested for the at least one first logical channel and/or for the TTI and/or the numerology that the at least one first logical channel is mapped to and/or the for the service type corresponding to the at least one first logical channel and/or for the cell type that the at least one first logical channel is mapped to. In an example, while the SR1 process is ongoing, a second scheduling request may be triggered, e.g., due to data becoming available to at least one second logical channel (e.g., logical channel 2 (LC2) with a priority P2). In an example, the wireless device may start the SR2 process after the SR2 process is triggered. In an example, the wireless device may start or not start the SR2 process depending on one or more criteria. In an example, the one or more criteria may depend on the priorities of the at least one first logical channel priority and the at least one second logical channel priority (e.g., P1 and P2). In an example, the wireless device may start the SR2 process if the at least one second logical channel have priority higher than or equal to the at least one first logical channel (e.g., if $P2 \geq P1$). In an example, the wireless may not start the SR2 process if the at least one second logical channel have priority lower than or equal to the at least one first logical channel (e.g., if $P2<P1$). In an example, the one or more criteria may depend on the service types associates to the at least one first logical channel and the at least one second logical channel. In an example, the one or more criteria may depend on the cell types that that the at least one first logical channel and the at least one second logical channel are mapped to. In an example, the one or more criteria may depend on the logical channel groups that the at least one first logical channel group and the at least one second logical channel group belong to.

Figure 16:
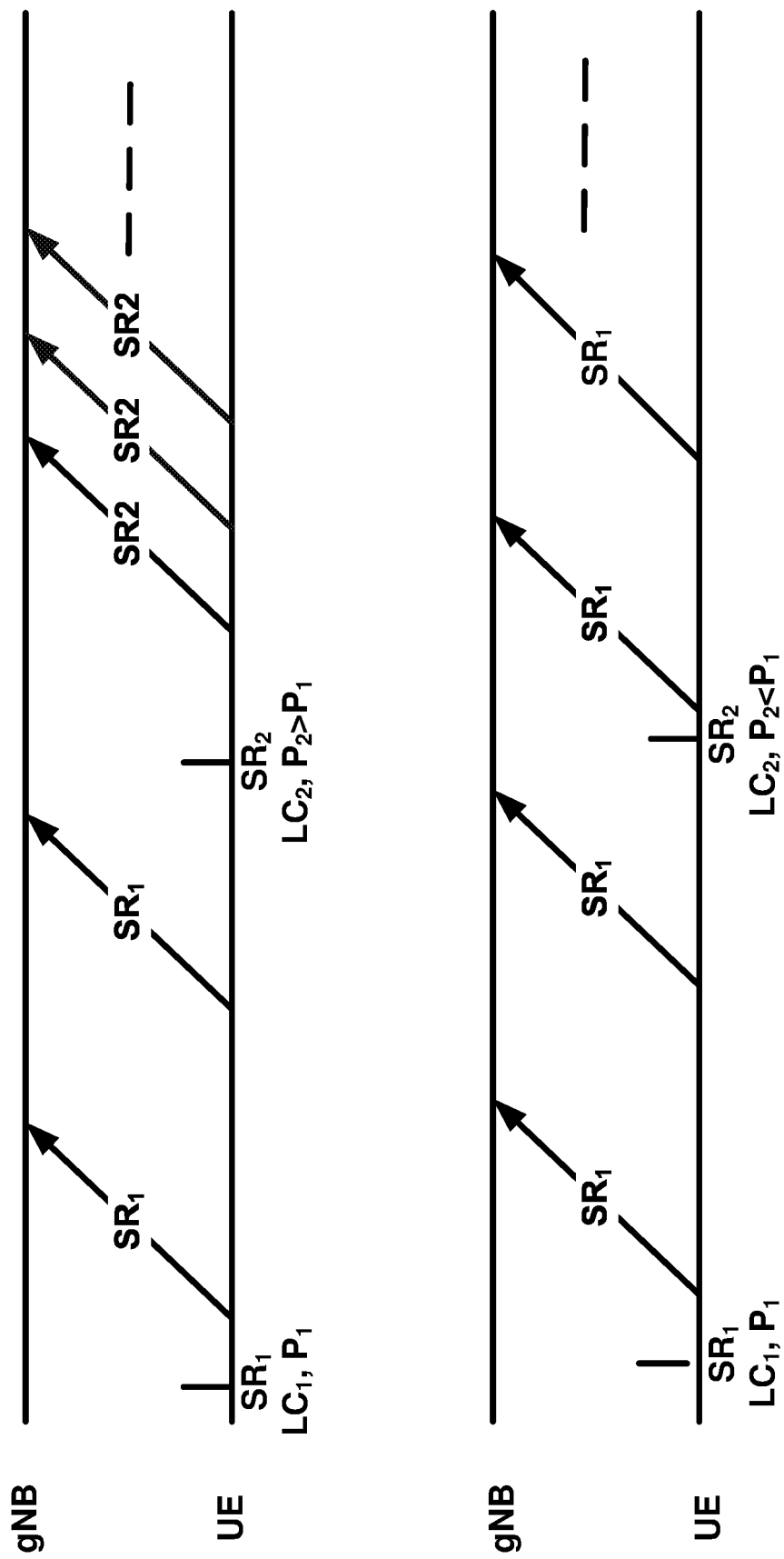
FIG. 16 is an illustration of an example scheduling request procedure as per an aspect of an embodiment of the present invention.

An Example scheduling request procedure is illustrated in FIG. 16 describing example wireless device behavior when a second SR process is triggered while a first SR process is ongoing. An Example scheduling request procedure is illustrated in FIG. 15 describing example wireless device behavior when a second SR process is triggered while a first SR process is ongoing. A first scheduling request (e.g., SR1) may be triggered, e.g., due to data becoming available to at least one first logical channel (e.g., logical channel 1 (LC1) with a priority P1). In an example, the wireless device may start a first SR process (SR1) after SR1 is triggered. The wireless device may transmit a SR signal corresponding to SR1 via a physical uplink control channel. In an example, the wireless device may use uplink resources configured for SR1 (e.g., for the at least one first logical channel and/or for the TTI and/or the numerology that the at least one first logical channel is mapped to and/or the for the service type corresponding to the at least one first logical channel and/or for the cell type that the at least one first logical channel is mapped to). In an example, the wireless device may transmit a multi-bit SR indicating resources are requested for the at least one first logical channel and/or for the TTI and/or the numerology that the at least one first logical channel is mapped to and/or the for the service type corresponding to the at least one first logical channel and/or for the cell type that the at least one first logical channel is mapped to. In an example, while the SR1 process is ongoing, a second scheduling request may be triggered, e.g., due to data becoming available to at least one second logical channel (e.g., logical channel 2 (LC2) with a priority P2). In an example, the wireless device may start the SR2 process after the SR2 process is triggered. In an example, the wireless device may start or not start the SR2 process depending on one or more criteria. In an example, the one or more criteria may depend on the priorities of the at least one first logical channel priority and the at least one second logical channel priority (e.g., P1 and P2). In an example, the wireless device may start the SR2 process if the at least one second logical channel have priority higher than or equal to the at least one first logical channel (e.g., if P2≥P1). In an example, the wireless may not start the SR2 process if the at least one second logical channel have priority lower than or equal to the at least one first logical channel (e.g., if P2<P1). In an example, the wireless device may cancel the SR1 process after starting the SR2 process. In an example, the wireless device may not continue transmission of SR signals corresponding to the SR1 after canceling the SR1 process. In an example, if SR2 is started when LC2 has higher priority than or equal priority to LC1 (e.g., P2≥P1), the wireless device will start transmitting SR signals corresponding to SR2 (e.g., using resources corresponding to SR2 and using a multi-bit SR field value indicating SR2 and/or logical channel/logical channel group/TTI/numerology/cell type/service type corresponding to SR2) and stop transmitting SR signals corresponding to SR1).

In legacy SR procedure, a wireless device which is not configured with SR resources may initiate a random access procedure after a SR is triggered. In new radio (NR), a plurality of SRs corresponding to a plurality of logical channels and/or logical channel groups and/or TTIs and/or numerologies and/or cell types and/or service types, etc., may be triggered for the wireless device. The scheduling request procedure and the initiation of random access needs to be enhanced to take into account the plurality of triggered SRs. Example embodiments enhance the scheduling request procedure.

In an example embodiment, a wireless device may receive one or more messages comprising configuration parameters for one or more cells. In an example, the one or more messages may comprise one or more radio resource control (RRC) messages. In an example, the configuration parameters may indicate whether a random access procedure is skipped for at least one first logical channel (e.g., mapped to at least one first TTI/numerology and/or corresponding to at least one first service type and/or belonging to at least one first logical channel group and/or being mapped to at least one first cell type and/or corresponding to a first logical channel priority) in a plurality of logical channels. The wireless device may trigger a first SR in response to data becoming available for the at least one first logical channel. In an example, the first SR may be triggered in response to a first BSR being triggered and lack of resources (e.g., PUSCH or PUSCH like resources) for transmission of the first BSR. The wireless device may initiate a random access procedure if no valid SR resource is configured for requesting resources for the at least one first logical channel and the configuration parameters indicates that the random access procedure is not skipped for the at least one first logical channel. The wireless device may, otherwise, not initiate the random access procedure. In an example, the wireless device may receive an uplink grant (e.g., by receiving a downlink control information (DCI) comprising/indicating the uplink grant) for a cell comprising transmission parameters for one or more transport blocks (TBs). In an example, the transmission parameters may comprise, transport block size, power control, radio resource allocation parameters, TTI/numerology and/or one or more TTIs/numerologies, MIMO parameters, etc. The wireless device may construct one or more TBs using the transmission parameters indicated in the uplink grant. The wireless device may transmit the one or more TBs employing the radio resource indicated by the uplink grant.

In an example implementation, the initiating the random access procedure may further comprise selecting one or more random access resources employing the at least one first logical channel and/or the at least one first logical channel group and/or the at least one first cell type and/or the at least one first TTI/numerology that the at least one first logical channel is mapped to and/or the at least one service type corresponding to the at least one first logical channel. In an example, the selecting one or more random access resources may comprise selecting a cell and/or a TTI/numerology and/or a preamble and/or RACH resource.

In an example embodiment, a wireless device may receive one or more messages comprising configuration parameters for one or more cells. The one or more messages may comprise one or more radio resource control (RRC) messages. In an example, the configuration parameters may comprise parameters for a plurality of logical channels. In an example, the configuration parameters may comprise at least one first parameter. In an example, the at least one first parameter may indicate whether a random access procedure is skipped for a logical channel (e.g., mapped to a TTI/numerology and/or corresponding to a service type and/or belonging to a logical channel group and/or being mapped to a cell type and/or corresponding to a logical channel priority) in the plurality of logical channels. In an example, the at least one first parameter may indicate whether a random access procedure is skipped for a MAC entity and/or one or more logical channels configured for a MAC entity. In an example, the at least one parameter may be part of configuration parameters for the plurality of logical channels. In an example the at least one parameter may be part of configuration parameters for a plurality of scheduling request resource configurations. In an example, the wireless device may trigger a first scheduling request (SR) due to data becoming available for at least one first logical channel. The wireless device may trigger a second SR due to data becoming available for at least one second logical channel. The wireless device may initiate a random access procedure if a first condition is met and the at least one first parameter does not indicate skipping random access. In an example, the wireless device may receive an uplink grant (e.g., by receiving a downlink control information (DCI) comprising/indicating the uplink grant) for a cell comprising transmission parameters for one or more transport blocks (TBs). In an example, the transmission parameters may comprise, transport block size, power control, radio resource allocation parameters, TTI/numerology and/or one or more TTIs/numerologies, MIMO parameters, etc. The wireless device may construct one or more TBs using the transmission parameters indicated in the uplink grant. The wireless device may transmit the one or more TBs employing the radio resource indicated by the uplink grant.

In an example, the first condition may comprise at least one of the first SR and the second SR not being configured with valid SR resources. In an example, the first condition may comprise both of the first SR and the second SR not being configured with valid SR resources. In an example, the first SR (or the second SR) may not be configured with valid SR resources if the SR configuration parameters does not comprise the resource configuration parameters for the first SR (or the second SR). In an example, the wireless device may cancel the first SR and the second SR if the first condition is met and/or the at least one first parameter does not indicate skipping random access. In an example, the wireless device may cancel a SR with no valid configured SR resources and keep a SR with valid SR resources pending. In an example, the wireless device may cancel the first SR and keep the second SR pending if the first SR has no valid SR resources and the second SR has valid SR resources. In an example, the wireless device may consider the priority and/or periodicity and/or other parameters when canceling a SR.

Implementation of existing SR mechanisms when multiple SR processes for requesting resources from the same base station are pending may result in inefficient resource allocation by the base station. This issue may not be applicable when multiple SR processes are for multiple MAC entities associated with multiple base stations. Implementation of existing SR mechanisms lead to inefficient uplink scheduling, inefficient uplink resource utilization and degraded network performance. There is need to improve the SR mechanism when multiple SR resources of a base station are configured for a wireless device, and an SR resource corresponds to one or more logical channels being mapped to one or more transmission intervals. When logical channels are mapped to one or more transmission time intervals of an uplink data channel, example embodiments may provide additional flexibility to improve uplink resource efficiency. Example embodiments enhance the legacy SR mechanisms when multiple SR processes are running in parallel. Example embodiments provide enhanced SR mechanisms when multiple SR processes are pending for transmission of SR requests to the same base station. In an example embodiment, a wireless device may be configured with a plurality of SR configurations and each SR configuration may correspond to one or more logical channels mapped to one or more transmission interval (e.g., associated with one or more transmission time interval of a uplink data channel) for transmission to a base station. Example embodiments enhances the legacy scheduling request process and improves uplink radio resource efficiency.

Figure 27:
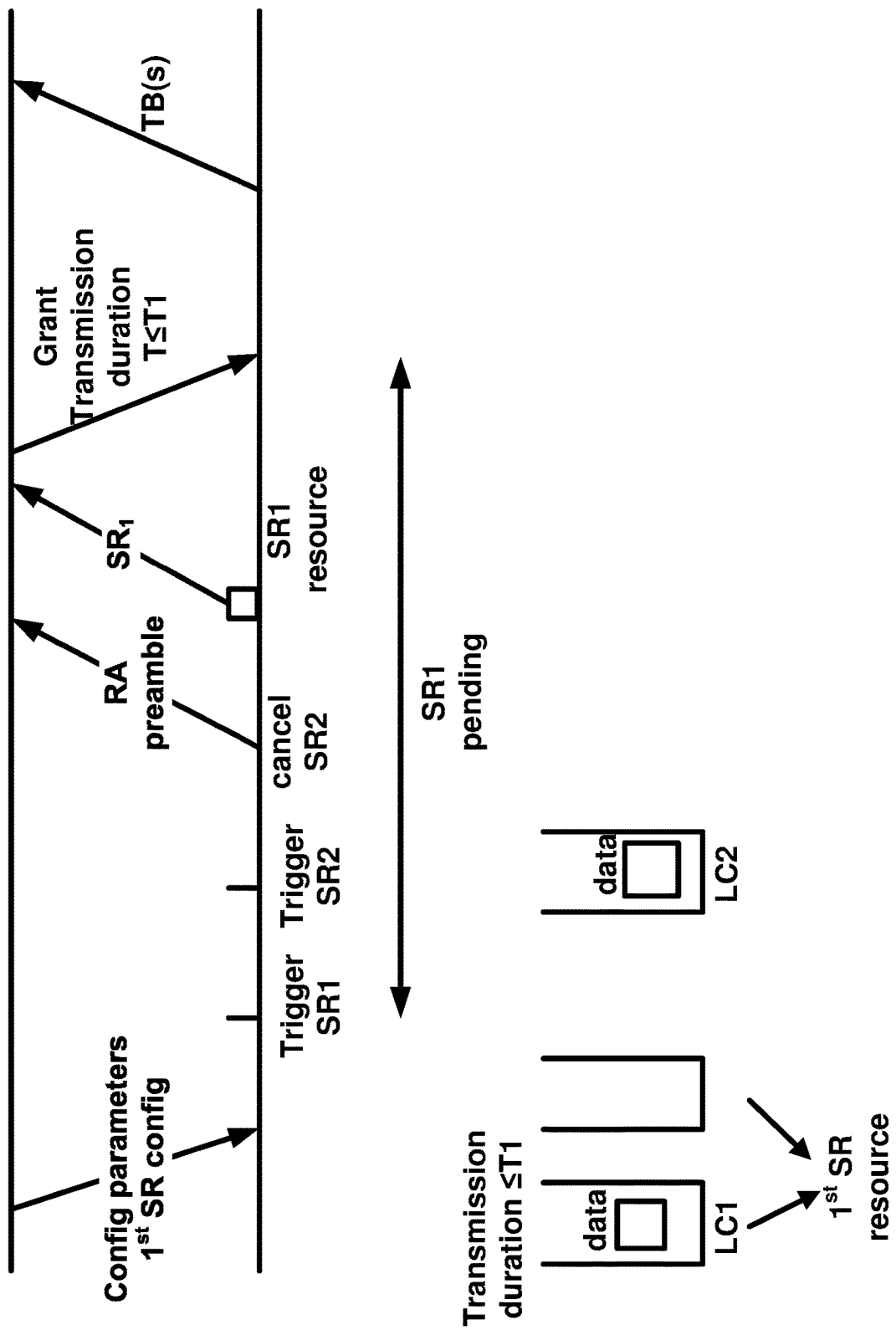
FIG. 27 is an is an illustration of an example scheduling request procedure as per an aspect of an embodiment of the present invention.

An example embodiment is shown in FIG. 27. In an example, a wireless device may receive, from a base station, one or more messages. The one or more messages may comprise configuration parameters for a plurality of logical channels comprising a first logical channel and a second logical channel. A logical channel in the plurality of logical channels may be associated with a bearer/quality of service requirement. The one or more messages may comprise configuration parameters for a first scheduling request. The configuration parameters for the first scheduling request may comprise a first SR configuration index. In an example, the configuration parameters for the first scheduling request may comprise one or more first timer values for one or more first timers (e.g., one or more first prohibit timers) and one or more first counter values for one or more first counters (e.g., one or more first SR transmission counters). The first scheduling request may indicate a first plurality of SR resources comprising a first SR resource. In an example, the first SR resource may correspond to a first logical channel. In an example, configuration parameters for the first logical channel may comprise/indicate the first configuration index. In an example, the first logical channel may correspond to one or more transmission duration up to a first value. In an example, configuration parameters for the first logical channel may indicate that the first logical channel may be transmitted via (e.g., mapped to) transport blocks leading to a transmission duration up to the first value. In an example, the first value may indicate a maximum transmission duration value. In an example, a transmission duration in the one or more transmission durations may correspond to transmission duration of a packet/transport block. In an example, a transmission duration in the one or more transmission durations may correspond to a TTI. In an example, a transmission duration in the one or more transmission durations may correspond to a PUSCH duration. In an example, the wireless device may trigger a first SR in response to data becoming available to the first logical channel. In an example, the wireless device may trigger a second SR in response to data becoming available to a second logical channel.

In an example, when no valid SR resource is configured for the second SR, the wireless device may initiate a random access procedure. The wireless device may cancel the second SR (e.g., in response to initiating the random access procedure and/or transmitting a random access preamble) and keep the first SR pending. In this example enhanced SR mechanism, a wireless device may maintain the status of the first SR and transmit an SR request while the second SR process is cancelled. The base station receives additional and more specific information on what type of uplink grant is needed by the wireless device. The base station no longer needs to transmit an uplink grant corresponding to the second logical channel. The wireless device may transmit, to the base station, a first SR via the first SR resource in response to the triggering of the first SR. The wireless device may receive, from the base station, an uplink grant for transmission of one or more transport blocks in a transmission duration up to the first value. In an example embodiment, the uplink resource allocation of the base station increases uplink resource efficiency when this additional information is available to the base station. In an example, the uplink grant may comprise transmission parameters for transmission of the one or more transport blocks.

Figure 17:
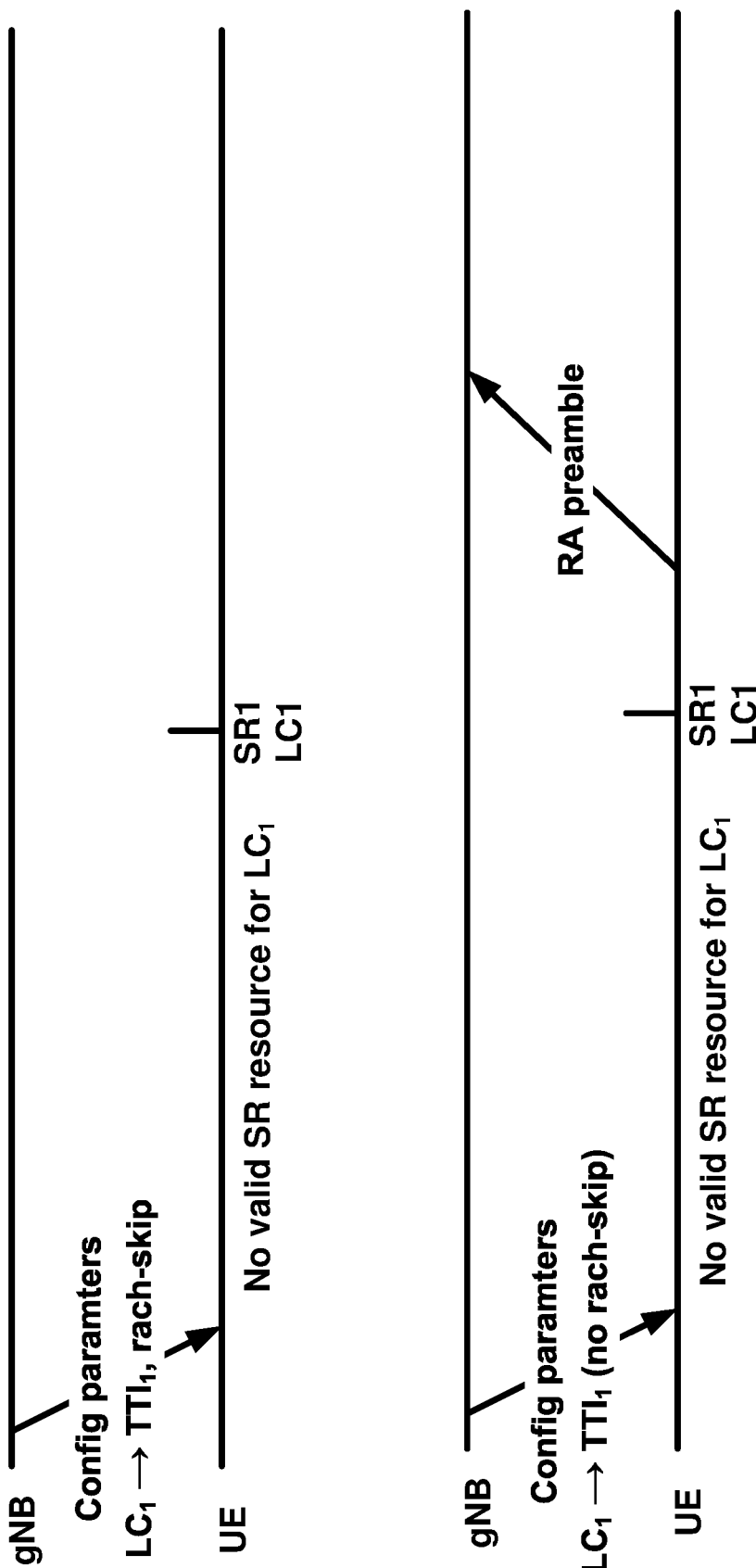
FIG. 17 is an illustration of an example scheduling request procedure as per an aspect of an embodiment of the present invention.

An example scheduling request procedure is illustrated in FIG. 17. The wireless device may receive one or more messages comprising configuration parameters from a base station. In an example, the configuration parameters may comprise parameters for a plurality for scheduling request configurations. A SR configuration in the plurality of SR configurations may be identified by a SR configuration index. A SR configuration may indicate the SR resources, a periodicity, an offset, a logical channel/logical channel group/TTI/numerology/service/cell type corresponding to the SR. In an example, the configuration parameters may comprise parameters for a multi-bit SR. The configuration parameters may indicate a first multi-bit SR field value indicates a first logical channel/logical channel group/TTI/numerology/service/cell type and/or a second multi-bit SR field value indicates a second logical channel/logical channel group/TTI/numerology/service/cell type and/or a third multi-bit SR field value indicates the first logical channel/logical channel group/TTI/numerology/service/cell type and the second logical channel/logical channel group/TTI/numerology/service/cell type. In an example, the configuration parameters may comprise parameters for one or more logical channels. The parameters for a logical channel may comprise mapping information between the logical channel and one or more TTI/numerology, priority, prioritized bit rate (PBR), bucket size duration (BSD), a first parameter indicating whether to skip a random access procedure if a scheduling request is triggered (e.g., due to data availability for the logical channel) and wireless device is not configured with valid SR resources corresponding to the logical channel and/or a logical channel group that the logical channel belongs to and/or a TTI/numerology that the logical channel is mapped to and/or a cell type that the logical channel is mapped to and/or a service type that the logical channel is mapped to. In an example, the first parameter may be called rach-skip. Other names may be used. In an example illustrated in FIG. 17, the logical channel 1 (LC1) may be configured with the first parameter and the wireless device may be configured with no valid SR resources corresponding to LC1 (or the logical channel group that LC1 belongs to or the TTI/numerology and or the cell type that LC1 is mapped to or the service type that LC1 corresponds to). The wireless device may drop transmission of a random access preamble (e.g., not start a random access procedure). The second example in FIG. 17 illustrates that the logical channel 1 (LC1) may not be configured with the first parameter and the wireless device may start a random access procedure (e.g., transmit a random access preamble) if the wireless device the wireless device may be configured with no valid SR resources corresponding to LC1 (or the logical channel group that LC1 belongs to or the TTI/numerology and or the cell type that LC1 is mapped to or the service type that LC1 corresponds to).

In legacy SR procedure, when a SR process fails, a wireless device may initiate a random access procedure and/or notify RRC to release PUCCH for a serving cells and/or clear a downlink assignment or an uplink grant and/or initiate a random access procedure and/or cancel a pending SR. In new radio (NR), a plurality of SRs corresponding to a plurality of logical channels and/or logical channel groups and/or TTIs and/or numerologies and/or cell types and/or service types, etc may be triggered for the wireless device. The scheduling request procedure and the wireless device behavior after a SR process fails (e.g., initiation of random access, etc.) needs to be enhanced to take into account the plurality of triggered SRs. Example embodiments enhance the scheduling request procedure.

In an example, a wireless device may receive one or more messages comprising configuration parameters for one or more cells. The one or more messages may comprise one or more radio resource control (RRC) messages. In an example, the configuration parameters may comprise parameters for a plurality of logical channels. In an example, the configuration parameters may comprise at least one first parameter. The at least one parameter may be called rach-skip or rach-sr-fail-skip or other names. In an example, the at least one first parameter may be pre-configured. In an example, the at least one first parameter may be dynamically indicated to the wireless device (e.g., using DCI and/or common DCI and/or MAC CE, etc.). In an example, the at least one first parameter may indicate whether a random access procedure is skipped for a logical channel (e.g., mapped to a TTI/numerology and/or corresponding to a service type and/or belonging to a logical channel group and/or being mapped to a cell type and/or corresponding to a logical channel priority) in the plurality of logical channels. In an example, the at least one first parameter may indicate whether a random access procedure is skipped for a MAC entity and/or one or more logical channels configured for a MAC entity. In an example, the at least one parameter may be part of configuration parameters for the plurality of logical channels. In an example the at least one parameter may be part of configuration parameters for a plurality of scheduling request resource configurations.

In an example, the wireless device may start a first SR process due to data becoming available for at least one first logical channel. The wireless device may initiate a random access procedure if the first SR process fails and the at least one first parameter does not indicate skipping random access. In an example implementation, the initiating the random access procedure may further comprise selecting one or more random access resources employing the at least one first logical channel and/or the at least one first logical channel group and/or the at least one first cell type and/or at least one first TTI/numerology and/or at least one service type. In an example a second SR process may start due to data becoming available for at least one second logical channel. In an example, if the first SR process and a second SR process fail and the at least one first parameter does not indicate skipping random access, the wireless device may initiate a random access procedure. The initiating the random access procedure may comprise selecting one or more random access resources employing the at least one first logical channel and the at least one second logical channel and their corresponding logical channel groups, priorities, TTIs/numerologies, service types, cell types, etc. In an example, the selecting one or more random access resources may comprise selecting a cell and/or a TTI/numerology and/or a preamble and/or RACH resource. In an example, the wireless device may receive an uplink grant (e.g., by receiving a downlink control information (DCI) comprising/indicating the uplink grant) for a cell comprising transmission parameters for one or more transport blocks (TBs). In an example, the transmission parameters may comprise, transport block size, power control, radio resource allocation parameters, TTI/numerology and/or one or more TTIs/numerologies, MIMO parameters, etc. The wireless device may construct one or more TBs using the transmission parameters indicated in the uplink grant. The wireless device may transmit the one or more TBs employing the radio resource indicated by the uplink grant.

In an example, the at least one first parameter and/or at least one second parameter may indicate if the wireless device should skip and/or perform one or more of the following if the SR process fails: notifying RRC to release one or more PUCCH for one or more serving cells, notifying RRC to release one or more sounding reference signal (SRS) for one or more serving cells, clearing one or more configured and/or dynamically indicated downlink assignments and/or uplink grants, initiating a random access procedure, canceling one or more pending SRs. The at least one first parameter and/or the at least one second parameter may be configured for one or more logical channels and/or one or more MAC entities and/or one or more logical channels configured for one or more MAC entities and/or one or more scheduling request resource configurations, etc.

In an example, a wireless device may receive one or more messages comprising configuration parameters for one or more cells. The one or more messages may comprise one or more radio resource control (RRC) messages. In an example, the configuration parameters may comprise parameters for a plurality of logical channels. In an example, the wireless device may start a first SR process due to data becoming available for at least one first logical channel. In an example, the wireless device may start a second SR process due to data becoming available for at least one second logical channel. In an example, the first SR process may fail (e.g., after a first counter reaching a first value). The wireless device may skip random access if one or more first conditions are met. In an example, the one or more first conditions may depend on the priority of the at least one first logical channel and the at least one second logical channel, the periodicity of resources for the first SR and the second SR, a second counter value for the second SR. In an example, the one or more first conditions may comprise the priority of the at least one second logical channel having higher priority than the at least one first logical channel. In an example, the one or more first conditions may comprise the configured resources for the second SR process having shorter periodicity than the configured resources for the first SR process.

Figure 18:
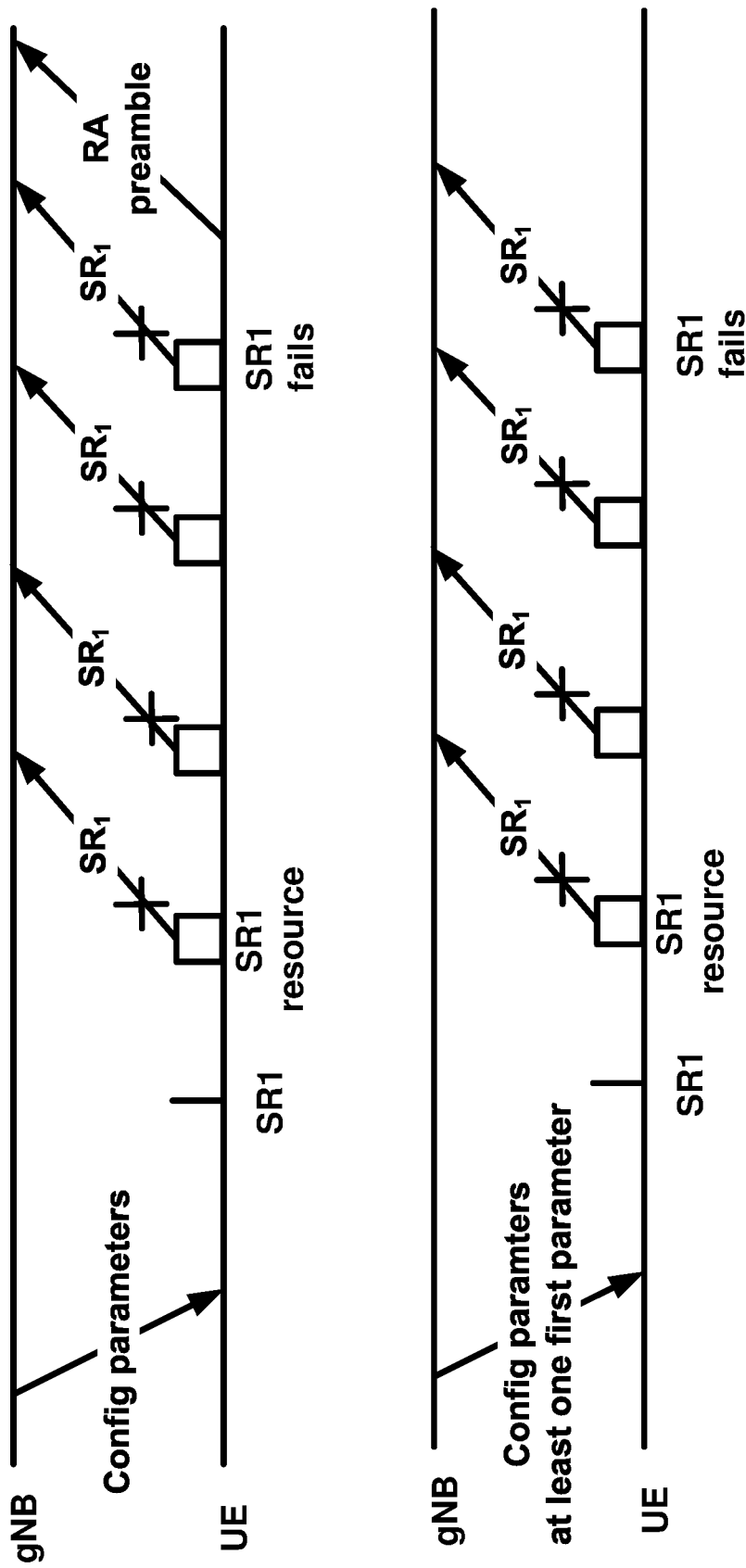
FIG. 18 is an is an illustration of an example scheduling request procedure as per an aspect of an embodiment of the present invention.

An example scheduling request procedure is illustrated in FIG. 18. A wireless device receives one or more messages comprising configuration parameters. In an example, the configuration parameters may comprise parameters for a plurality for scheduling request configurations. A SR configuration in the plurality of SR configurations may be identified by a SR configuration index. A SR configuration may indicate the SR resources, a periodicity, an offset, a logical channel/logical channel group/TTI/numerology/service/cell type corresponding to the SR. In an example, the configuration parameters may comprise parameters for a multi-bit SR. The configuration parameters may indicate a first multi-bit SR field value indicates a first logical channel/logical channel group/TTI/numerology/service/cell type and/or a second multi-bit SR field value indicates a second logical channel/logical channel group/TTI/numerology/service/cell type and/or a third multi-bit SR field value indicates the first logical channel/logical channel group/TTI/numerology/service/cell type and the second logical channel/logical channel group/TTI/numerology/service/cell type. In an example, the configuration parameters may comprise an at least one first parameter. In an example, the at least one first parameter may indicate if a wireless device may skip one or more behavior if a scheduling request process (e.g., corresponding to a first logical channel/logical channel group/TTI/numerology/service/cell type) fails. In an example, the at least one behavior may comprise starting a random access procedure. In an example, the at last one behavior may comprise notifying RRC to release PUCCH for a serving cell. In an example, the at least one behavior may comprise notifying RRC to release SRS for a serving cell. In an example, the at least one behavior may comprise clearing a configured downlink assignment and/or uplink grant. In an example, the at least one behavior may comprise initiating a random access procedure and/or canceling a pending SR. In an example, a first SR (e.g., SR1) may be triggered. In an example, SR1 may be triggered due to data becoming available for a first at least one logical channel. In an example, the wireless device may start the SR process after it is triggered. In an example, the wireless device is not configured with the at least one first parameter. The wireless device may start a random access procedure if the first SR process fails (e.g., after transmitting SR signals corresponding to the first SR process for a configured number of time and not receiving a grant). In the other example illustrated in FIG. 18, the wireless device is configured with the at least one first parameter. The wireless device may not start a random access procedure if the first SR process fails.

In legacy BSR and SR procedures, a SR is triggered if the wireless device does not have an uplink grant to transmit the BSR. In NR, there may be scenarios that a wireless device may not transmit a BSR even if the wireless device has uplink resources due to presence of higher priority data that consume the grant capacity. A wireless device may trigger a SR and may need to keep the SR pending (e.g., not cancel the SR) in some scenarios even after receiving a grant. The legacy SR/BSR procedures need to be enhanced to improve the scheduling performance in a NR wireless network.

In an example embodiment, a wireless device may receive one or more messages comprising configuration parameters for one or more cells. The one or more messages may comprise one or more radio resource control (RRC) messages. In an example, the configuration parameters may comprise parameters for a plurality of logical channels. The wireless device may trigger a buffer status report (BSR) transmission, if one or more conditions are met for at least one first logical channel. In an example, the one or more first conditions may be data becoming available for the at least one logical channel. The wireless device may receive at least one first uplink grant. The wireless device may trigger a scheduling request (SR) if the at least one uplink grant may not be employed to transmit a BSR comprising an indication of data in the at least one first logical channel. In an example, the at least one first logical channel may correspond to eMBB service type and the BSR MAC CE may not be transmitted using the at least one first uplink grant e.g., due to availability of URLLC data (e.g., the URLLC data may have a higher priority than the BSR MAC CE and the at least one first uplink grant may not accommodate both the BSR MAC CE and the URLLC data). The wireless device may transmit an SR signal via an uplink control channel. In an example, the wireless device may receive an uplink grant (e.g., by receiving a downlink control information (DCI) comprising/indicating the uplink grant) for a cell comprising transmission parameters for one or more transport blocks (TBs). In an example, the transmission parameters may comprise, transport block size, power control, radio resource allocation parameters, TTI/numerology and/or one or more TTIs/numerologies, MIMO parameters, etc. The wireless device may construct one or more TBs using the transmission parameters indicated in the uplink grant. The wireless device may transmit the one or more TBs employing the radio resource indicated by the uplink grant.

In an example embodiment, a wireless device may receive one or more messages comprising configuration parameters for one or more cells. The one or more messages may comprise one or more radio resource control (RRC) messages. In an example, the configuration parameters may comprise parameters for a plurality of logical channels. In an example, the wireless device may trigger a first scheduling request (SR) if one or more conditions are met. In an example, the one or more conditions may comprise data becoming available for at least one first logical channel. The wireless device may start a first SR process in response to the SR trigger. The wireless device may receive at least one first uplink grant. The wireless device may keep the first SR process pending if the at least one first uplink grant may not be employed to transmit pending data. In an example, the pending data may be data from one or more logical channels with non-empty buffer. In an example, the pending data may be data from the at least one first logical channel that triggered the first SR. In an example, the size of the at least one first uplink grant may be enough to accommodate the pending data but the at least part of the pending data may not be mapped to TTI/numerology/cell type of the at least one first uplink grant. The wireless device may, otherwise (e.g., if the at least one first uplink grant may be employed to transmit pending data) cancel the first SR process. In an example, the wireless device may transmit an SR signal via an uplink control channel. In an example, the wireless device may receive an uplink grant (e.g., by receiving a downlink control information (DCI) comprising/indicating the uplink grant) for a cell comprising transmission parameters for one or more transport blocks (TBs). In an example, the transmission parameters may comprise, transport block size, power control, radio resource allocation parameters, TTI/numerology and/or one or more TTIs/numerologies, MIMO parameters, etc. The wireless device may construct one or more TBs using the transmission parameters indicated in the uplink grant. The wireless device may transmit the one or more TBs employing the radio resource indicated by the uplink grant.

In an example embodiment, a wireless device may receive one or more messages comprising configuration parameters for one or more cells. The one or more messages may comprise one or more radio resource control (RRC) messages. In an example, the configuration parameters may comprise parameters for a plurality of logical channels. In an example, the wireless device may trigger a first scheduling request (SR) if one or more conditions are met. In an example, the one or more conditions may comprise data becoming available for at least one first logical channel. The wireless device may start a first SR process in response to the SR trigger. The wireless device may receive at least one first uplink grant. In an example, the wireless device may cancel the first SR process if the at least one first uplink grant may be employed to transmit a BSR indicating buffer status for one or more logical channels that triggered the first SR process. In an example, the wireless device may receive an uplink grant (e.g., by receiving a downlink control information (DCI) comprising/indicating the uplink grant) for a cell comprising transmission parameters for one or more transport blocks (TBs). In an example, the transmission parameters may comprise, transport block size, power control, radio resource allocation parameters, TTI/numerology and/or one or more TTIs/numerologies, MIMO parameters, etc. The wireless device may construct one or more TBs using the transmission parameters indicated in the uplink grant. The wireless device may transmit the one or more TBs employing the radio resource indicated by the uplink grant.

In an example embodiment, a wireless device may receive one or more messages comprising configuration parameters for one or more cells. The one or more messages may comprise one or more radio resource control (RRC) messages. In an example, the configuration parameters may comprise parameters for a plurality of logical channels. In an example, the wireless device may trigger a first scheduling request (SR) if one or more first conditions are met. In an example, the one or more first conditions may comprise data becoming available for at least one first logical channel. In an example, the wireless device may trigger a second scheduling request (SR) if one or more second conditions are met. In an example, the one or more second conditions may comprise data becoming available for at least one second logical channel. The wireless device may start a first SR process in response to the first SR trigger. The wireless device may start a second SR process in response to the second SR trigger. The wireless device may receive at least one first uplink grant. In an example, the wireless device may cancel the first SR process and keep the second SR pending if the at least one first uplink grant may be employed to transmit a BSR indicating buffer status for the at least one first logical channel and not indicating the buffer status of the at least one second logical channel. In an example, the wireless device may receive an uplink grant (e.g., by receiving a downlink control information (DCI) comprising/indicating the uplink grant) for a cell comprising transmission parameters for one or more transport blocks (TBs). In an example, the transmission parameters may comprise, transport block size, power control, radio resource allocation parameters, TTI/numerology and/or one or more TTIs/numerologies, MIMO parameters, etc. The wireless device may construct one or more TBs using the transmission parameters indicated in the uplink grant. The wireless device may transmit the one or more TBs employing the radio resource indicated by the uplink grant.

Figure 19:
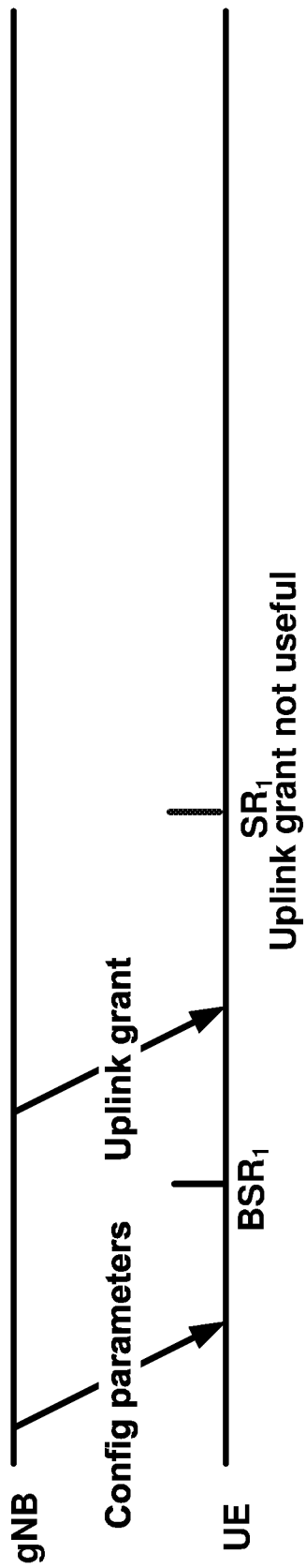
FIG. 19 is an is an illustration of an example scheduling request procedure as per an aspect of an embodiment of the present invention.

An example scheduling request procedure is illustrated in FIG. 19. A wireless device may receive one or more messages comprising configuration parameters. In an example, the configuration parameters may comprise parameters for one or more scheduling request configurations. In an example, the configuration parameters may comprise parameters for buffer status reporting. In an example, the configuration parameters may comprise parameters for one or more logical channels. In an example, a buffers status may be triggered due to data becoming available for at least one first logical channel. In an example, the wireless device may have a configured uplink grant. In an example, the configured uplink grant may be not be employable to transmit the buffer status report. For example, the BSR may be triggered due to data becoming available for one or more logical channels corresponding to eMBB service type. The uplink grant may useful for transmission of URLLC traffic and the wireless device may have pending URLLC traffic. The size of the uplink grant may not be enough to transmit the URLLC and BSR. In an example, URLCC traffic may have higher priority than BSR. The data multiplexing procedure (e.g., logical channel prioritization procedure) may not allow the BSR MAC CE be included in the MAC PDU created for the uplink grant. The wireless device may trigger a scheduling request. The wireless device may start a SR process after triggering the SR if the wireless device has configured valid SR resources.

Figure 20:
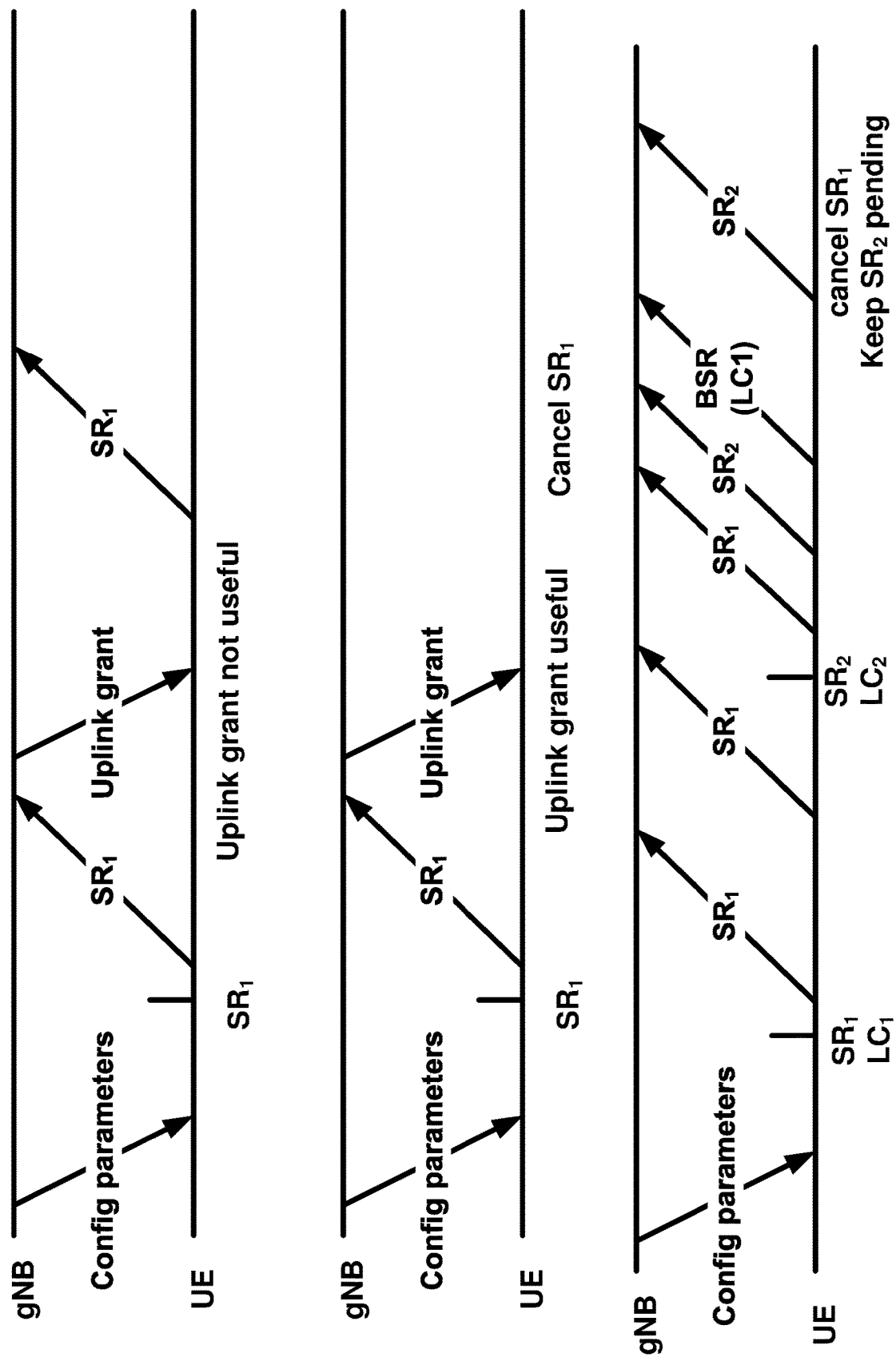
FIG. 20 is an is an illustration of an example scheduling request procedure as per an aspect of an embodiment of the present invention.

An example scheduling request procedure is illustrated in FIG. 20. A wireless device may receive one or more messages comprising configuration parameters. In an example, the configuration parameters may comprise parameters for one or more scheduling request configurations. In an example, the configuration parameters may comprise parameters for one or more logical channels. In an example, the wireless device may trigger a scheduling request e.g., due to data becoming available for at least one first logical channel and lack of uplink resources (e.g., PUSCH) to transmit a BSR. The wireless device may start a SR process after trigger the SR. The wireless device may subsequently receive an uplink grant. In an example, the uplink grant may not be employable/useful, e.g., for transmission of data (e.g., pending data and/or data corresponding to the at least first logical channel). In an example, the wireless device may keep the SR process pending and/or transmit a SR signal in the next available SR resource e.g., corresponding to the pending SR. In another example illustrated in FIG. 20, the wireless device may receive a useful uplink grant after starting the SR process. In an example, the uplink grant may be useful for transmission of a buffer status report. In an example, the uplink grant may be useful for transmission of pending data. In an example, the uplink grant may be useful for transmission of data corresponding to the at least one first logical channel. The wireless device may cancel the pending SR. In another example, illustrated in FIG. 20, the wireless device may trigger a first SR e.g. after data becoming available for at least one first logical channel. The wireless device may start the first SR process. The wireless device may transmit SR signals in resources associated with the first SR. The wireless device may trigger a second SR after data becoming available for at least second logical channel. The wireless device may start the second SR process. The wireless device may transmit SR signals in resources associated with the second SR. In an example, wireless device may transmit a buffer status report comprising buffer status of the at least one first logical channel and not the buffer status of the at least one second logical channel. In an example, the wireless device may cancel the first SR and keep the second SR pending.

Implementation of existing SR mechanisms when multiple SR processes for requesting resources from the same base station are pending may result in inefficient resource allocation by the base station. This issue may not be applicable when multiple SR processes are for multiple MAC entities associated with multiple base stations. Implementation of existing SR mechanisms lead to inefficient uplink scheduling, inefficient uplink resource utilization and degraded network performance. There is need to improve the SR mechanism when multiple SR resources of a base station are configured for a wireless device, and an SR resource corresponds to one or more logical channels being mapped to one or more transmission intervals. When logical channels are mapped to one or more transmission time intervals of an uplink data channel, example embodiments may provide additional flexibility to improve uplink resource efficiency. Example embodiments enhance the legacy SR mechanisms when multiple SR processes are running in parallel. Example embodiments provide enhanced SR mechanisms when multiple SR processes are pending for transmission of SR requests to the same base station. In an example embodiment, a wireless device may be configured with a plurality of SR configurations and each SR configuration may correspond to one or more logical channels mapped to one or more transmission interval (e.g., associated with one or more transmission time interval of a uplink data channel) for transmission to a base station. Example embodiments enhances the legacy scheduling request process and improves uplink radio resource efficiency. In legacy SR procedures, a SR process may be canceled in response to receiving an uplink grant that has a size that is large enough to transmit uplink data from logical channels with available data. In an example embodiment, an uplink grant may be usable for transmission of data from a subset of logical channels. Existing SR cancellation processes lead to inefficiency in uplink scheduling, inefficient utilization of uplink resources and degradation in network performance. There is a need to enhance the legacy scheduling request cancellation process and improve the scheduling request process when uplink grants are mappable to a subset of logical channels. Example embodiment enhance the legacy scheduling request cancellation process.

Figure 26:
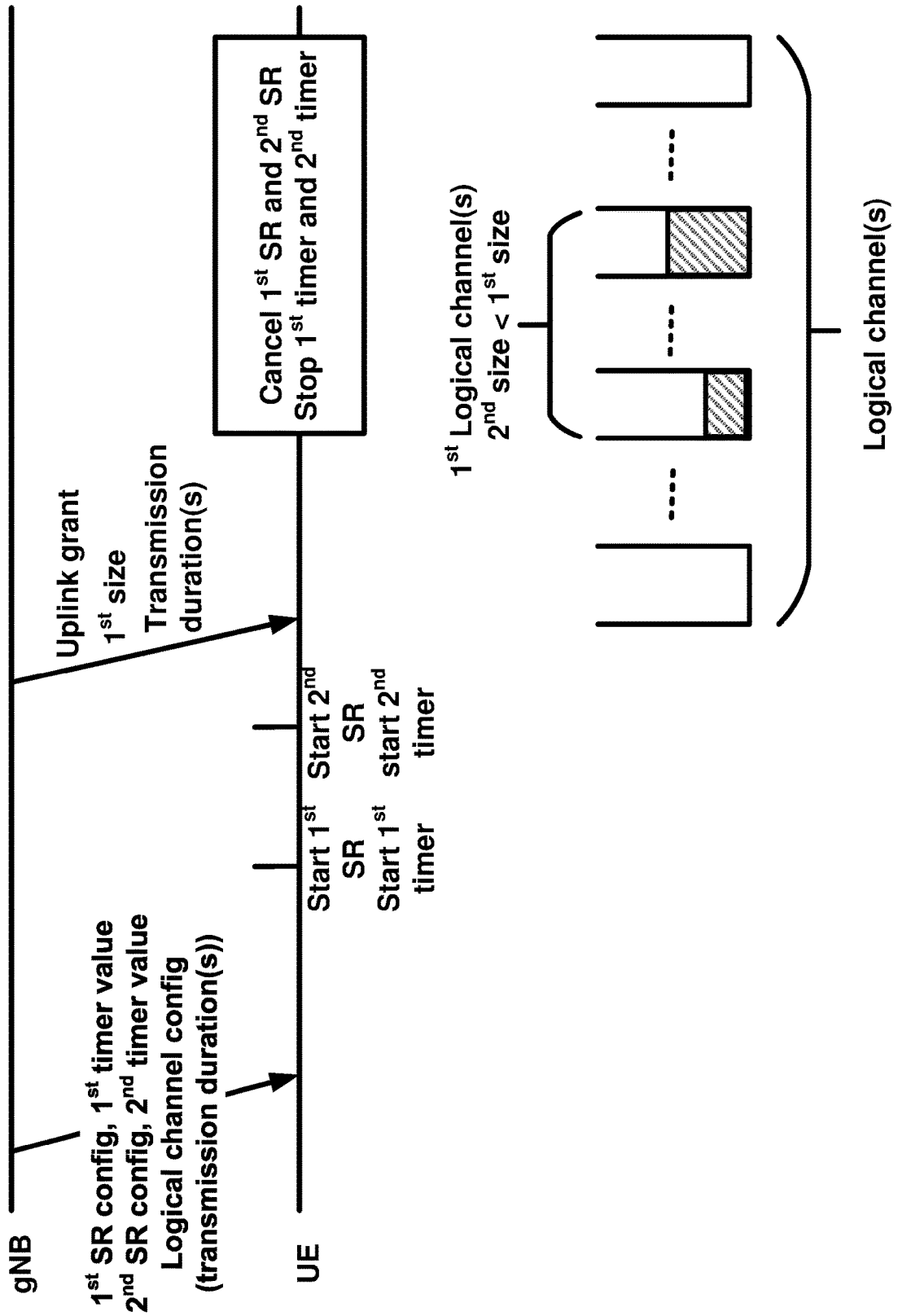
FIG. 26 is an is an illustration of an example scheduling request procedure as per an aspect of an embodiment of the present invention.

An example embodiment is shown in FIG. 26. A wireless device may receive one or more messages comprising configuration parameters. In an example, the one or more messages may comprise first SR configuration parameters. The first SR configuration parameters may indicate a first timer value for a first timer. In an example, the first SR configuration parameters may further comprise a first counter value for a first counter. In an example, the first SR configuration parameters may comprise a first SR configuration index for a first SR corresponding to the first SR configuration parameters. In an example, the one or more messages may comprise second SR configuration parameters. The second SR configuration parameters may indicate a second timer value for a second timer. In an example, the second SR configuration parameters may further comprise a second counter value for a second counter. In an example, the second SR configuration parameters may comprise a second SR configuration index for a second SR corresponding to the second SR configuration parameters. In an example, the one or more messages may comprise logical channel configuration parameters for one or more logical channels. The one or more logical channels may correspond to one or more transmission durations. In an example, a transmission duration in the one or more transmission durations may indicate/correspond to a TTI. In an example, a transmission duration in the one or more transmission durations may indicate/correspond to a packet/transport block transmission duration. In an example, a transmission duration in the one or more transmission durations may indicate/correspond to a PUSCH duration. In an example, configuration parameters for a logical channel may indicate that the logical channel may be transmitted via a transport block leading to a transmission duration to a value. In an example, configuration parameters for a logical channel may comprise a SR configuration index corresponding to the logical channel.

In an example, the one or more messages may indicate that at least one first logical channel corresponds to the first SR configuration. In an example, configuration parameters for a logical channel in the at least one first logical channel may comprise/indicate the first SR configuration index. In an example, the one or more messages may indicate that at least one second logical channel corresponds to the second SR configuration. In an example, configuration parameters for a logical channel in the at least one second logical channel may comprise/indicate the second SR configuration index. In an example, the wireless device may trigger a first SR in response to data becoming available to a first logical channel in the at least one first logical channel. In an example, the wireless device may trigger a second SR in response to data becoming available to a second logical channel in the at least one second logical channel.

In an example, the wireless device may receive one or more downlink control information. The one or more downlink control information may indicate one or more uplink grants. The one or more uplink grants may be associated with one or more transmission durations. In an example, in response to: the one or more logical channels comprising one or more first logical channels with available data for transmission and a first size of the one or more uplink grants being larger than a second size of the one or more first logical channels with available data: the wireless device may cancel a first SR corresponding to the first SR configuration and a second SR corresponding to the second SR configuration; and the wireless device may stop the first timer and the second timer. The wireless device may stop one or more timers associated with a SR in response to cancelling the SR.

In new radio (NR), a plurality of SRs corresponding to a plurality of logical channels and/or logical channel groups and/or TTIs and/or numerologies and/or cell types and/or service types, etc may be triggered for the wireless device. The legacy SR triggering does not distinguish between the plurality of SRs. This leads to inefficiency in the NR scheduling performance. The legacy SR triggering process after a BSR triggering needs to be enhanced to take into account the plurality of SRs.

In an example embodiment, a wireless device may receive one or more messages comprising configuration parameters for one or more cells, the configuration parameters comprising parameters for one or more logical channels. The wireless device may trigger a first buffer status report (BSR) when data becomes available for one or more first logical channels. The wireless device may trigger one or more first scheduling request processes if one or more first conditions are met, wherein the one or more first SR processes correspond to one or more second logical channels. In an example, the one or more first conditions may comprise lack of uplink resources (e.g., PUSCH resources) for transmission of the first BSR. In an example, the one or more second logical channels may be the one or more first logical channels. The wireless device may transmit one or more SR signals via one or more uplink control channels. In an example, the wireless device may receive an uplink grant (e.g., by receiving a downlink control information (DCI) comprising/indicating the uplink grant) for a cell comprising transmission parameters for one or more transport blocks (TBs). In an example, the transmission parameters may comprise, transport block size, power control, radio resource allocation parameters, TTI/numerology and/or one or more TTIs/numerologies, MIMO parameters, etc. The wireless device may construct one or more TBs using the transmission parameters indicated in the uplink grant. The wireless device may transmit the one or more TBs employing the radio resource indicated by the uplink grant.

In an example embodiment, a wireless device may receive one or more messages comprising configuration parameters for one or more cells, the configuration parameters comprising parameters for one or more logical channels. The wireless device may trigger a first buffer status report (BSR) when data becomes available for one or more first logical channels. The wireless device may trigger one or more first scheduling request processes if one or more first conditions are met, wherein the one or more first SR processes correspond to one or more second logical channels. In an example, the one or more first conditions may comprise lack of uplink resources (e.g., PUSCH resources) for transmission of the first BSR. In an example, the one or more second logical channels may be logical channels with non-empty buffer status in the first BSR. In an example, the wireless device may start a plurality of SR processes corresponding to the one or more second logical channels. In an example, the plurality of SR processes may use multi-bit SR wherein an SR field value may indicate a plurality of logical channels and/or logical channel groups and/or TTIs/numerologies and/or service types and/or cell types. The wireless device may transmit one or more SR signals via one or more uplink control channels. In an example, the wireless device may receive an uplink grant (e.g., by receiving a downlink control information (DCI) comprising/indicating the uplink grant) for a cell comprising transmission parameters for one or more transport blocks (TBs). In an example, the transmission parameters may comprise, transport block size, power control, radio resource allocation parameters, TTI/numerology and/or one or more TTIs/numerologies, MIMO parameters, etc. The wireless device may construct one or more TBs using the transmission parameters indicated in the uplink grant. The wireless device may transmit the one or more TBs employing the radio resource indicated by the uplink grant.

Figure 21:
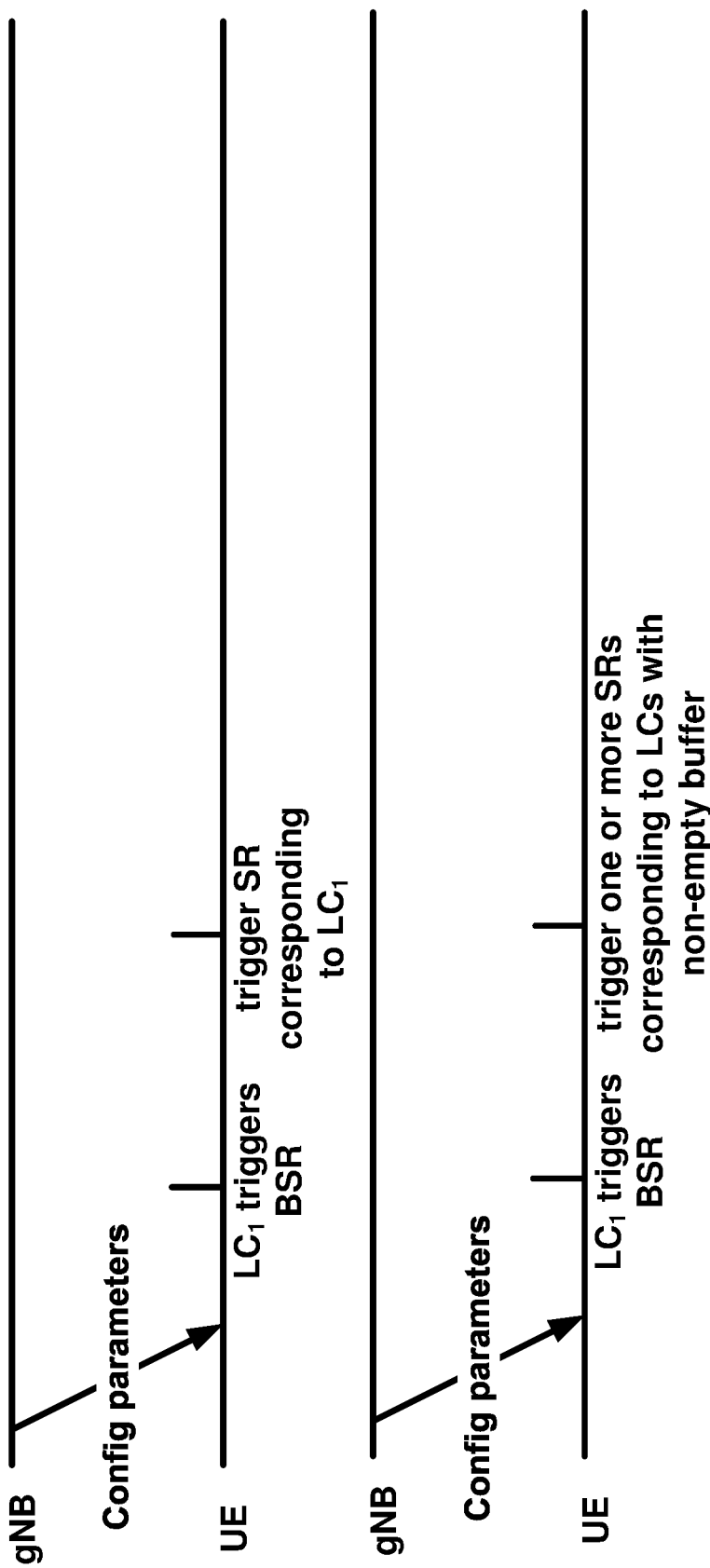
FIG. 21 is an is an illustration of an example scheduling request procedure as per an aspect of an embodiment of the present invention.

An example scheduling request triggering procedure is illustrated in FIG. 21. A wireless device may receive one or more messages comprising configuration parameters. In an example, the configuration parameters may comprise parameters for one or more scheduling request configurations. In an example, a scheduling request configuration may correspond to one or more logical channels/logical channel groups/TTIs/numerologies/service types/cell types. In an example a scheduling request configuration may be associated with a configuration index. In an example, the wireless device may be configured with a multi-bit SR. A value of the multi-bit SR may indicate one or more logical channels/logical channel groups/TTIs/numerologies/service types/cell types. In an example, the configuration parameters may comprise parameters for one or more logical channels. In an example, the one or more messages may comprise buffer status reporting configuration parameters. In an example, the wireless device may trigger a buffer status report due to data becoming available for at least one first logical channel. In an example, the wireless device may trigger one or more scheduling requests e.g. due to lack of uplink resources for transmission of the BSR. In an example, the wireless device may trigger one or more SRs corresponding to the at least one first logical channel and/or the logical channel group/TTI/numerology/service type/cell type of the at least one first logical channel. In an example, the wireless device may trigger one or more SRs corresponding to the logical channel(s) with non-empty buffer status in the BSR and/or the logical channel group(s)/TTI(s)/numerology(ies)/service type(s)/cell type(s) of the logical channel(s) with non-empty buffer status.

Implementation of existing SR mechanisms when multiple SR processes for requesting resources from the same base station are pending may result in inefficient resource allocation by the base station. This issue may not be applicable when multiple SR processes are for multiple MAC entities associated with multiple base stations. Implementation of existing SR mechanisms lead to inefficient uplink scheduling, inefficient uplink resource utilization and degraded network performance. There is need to improve the SR mechanism when multiple SR resources of a base station are configured for a wireless device, and an SR resource corresponds to one or more logical channels being mapped to one or more transmission intervals. When logical channels are mapped to one or more transmission time intervals of an uplink data channel, example embodiments may provide additional flexibility to improve uplink resource efficiency. Example embodiments enhance the legacy SR mechanisms when multiple SR processes are running in parallel. Example embodiments provide enhanced SR mechanisms when multiple SR processes are pending for transmission of SR requests to the same base station. In an example embodiment, a wireless device may be configured with a plurality of SR configurations and each SR configuration may correspond to one or more logical channels mapped to one or more transmission interval (e.g., associated with one or more transmission time interval of a uplink data channel) for transmission to a base station. Example embodiments enhances the legacy scheduling request process and improves uplink radio resource efficiency. In legacy scheduling procedures, a scheduling request indicates need for uplink resources by a wireless device. The legacy SR contains minimal information and does not indicate which logical channels have data available for transmission. In an example embodiment, a plurality of uplink resources may be configured for a wireless device that may operate in different frequencies (e.g., low frequency, mmWave frequencies, etc.), may have different numerologies/TTIs and may be suitable for different services, quality of service requirements (e.g., delay, jitter, throughput, etc.). The legacy SR procedure leads to inefficient scheduling resulting in poor resource utilization and degraded performance of wireless networks. There is a need to enhance the legacy SR triggering mechanisms to improve the system performance when different SRs are configured for different logical channels. Example embodiments enhance the legacy SR triggering processes.

Figure 25:
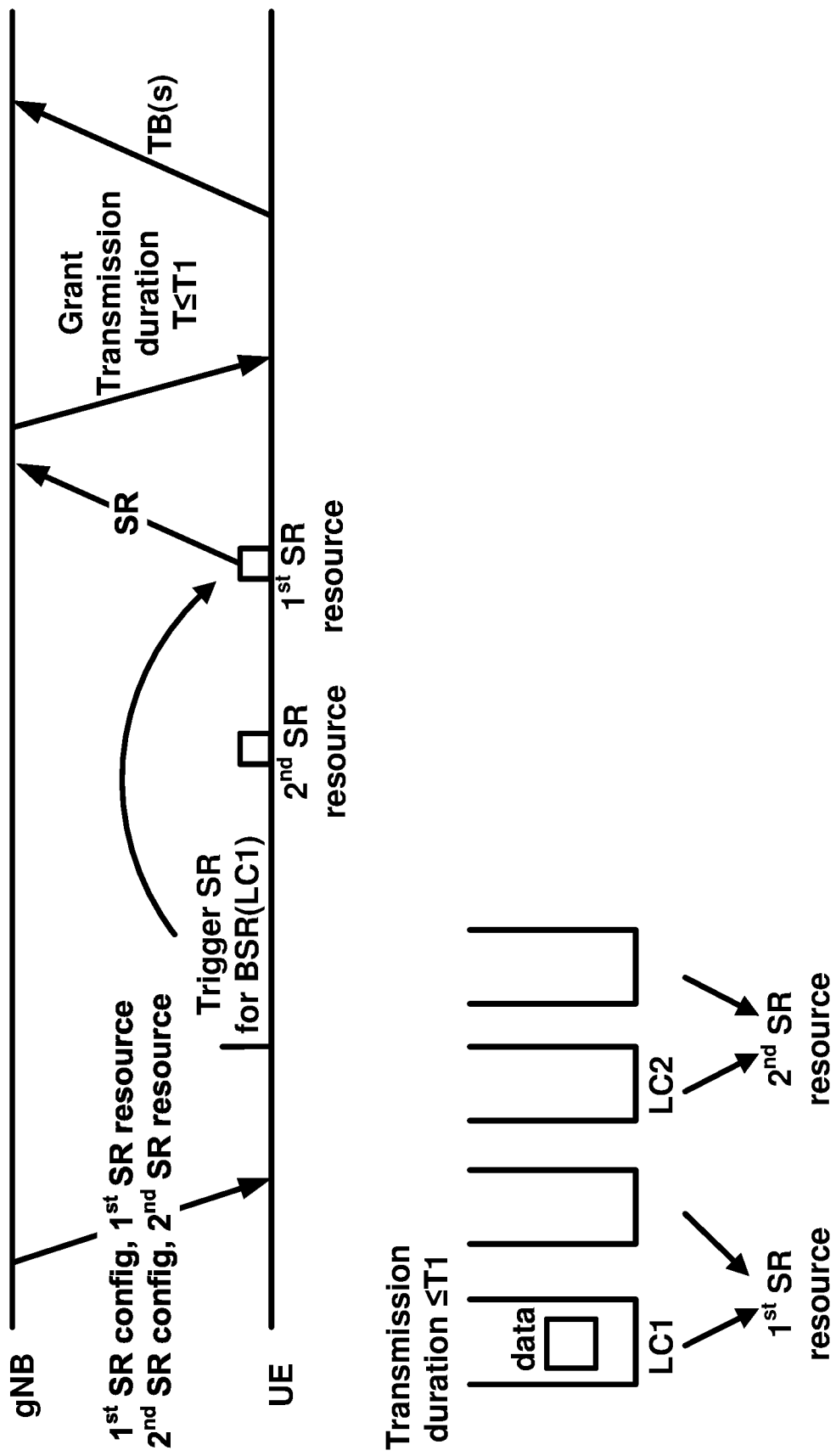
FIG. 25 is an is an illustration of an example scheduling request procedure as per an aspect of an embodiment of the present invention.

In an example embodiment is shown in FIG. 25. A wireless device may receive, from a base station, configuration parameters for a plurality of logical channels. In an example, a logical channel may be associated with a bearer/quality of service requirement. The wireless device may receive, from the base station, configuration parameters of a plurality of scheduling request (SR) configurations. A SR configuration in the plurality of SR configurations may indicate a plurality of SR resources. The SR configuration may further comprise configuration parameters for one or more timer (e.g., one or more timer values) and one or more counters (e.g., one or more counter values). In an example, a SR configuration may be associated with a SR configuration index. In an example, configuration parameters for a logical channel in the plurality of logical channels may comprise an SR configuration index associated with the logical channel. In an example, the configuration parameters for a logical channel may indicate that one or more first cells are allowed serving cells for the logical channel (e.g., the logical channel may be transmitted via transport blocks on the one or more first cells). In an example, the configuration parameters for a logical channel may indicate that the logical channel may be transmitted via (e.g., mapped to) transport blocks leading to transmission durations up to a value (e.g., a maximum value). In an example, the transmission duration may indicate a transmission time interval (TTI). In an example, the transmission duration may indicate a packet/transport block transmission duration. In an example, the transmission duration may indicate physical uplink shared channel (PUSCH) duration. In an example, the plurality of logical channels may comprise a first logical channel and a second logical channel. The configuration parameters may indicate a first SR resource of the base station corresponding to the first logical channel. The first logical channel may correspond to one or more first transmission durations up to a first value. In an example, the wireless device may transmit the first logical channel via a transport block leading to a transmission duration up to the first value. The configuration parameters may indicate a second SR resource of the base station corresponding to a second logical channel. The second logical channel may correspond to one or more second transmission durations up to a second value. In an example, the wireless device may transmit the second logical channel via a transport block leading to a transmission duration up to the second value.

In an example, uplink data may become available to one of the first logical channel or the second logical channel. The wireless device may trigger a BSR in response to the uplink data becoming available to the one of the first logical channel or the second logical channel. In an example, the wireless device may not have uplink resources (e.g., PUSCH resource) for transmission of the BSR. The wireless device may trigger an SR in response to uplink resources not being available to transmit the BSR. The wireless device may the SR via an SR resource that corresponds to the logical channel that triggered the BSR. The logical channel that triggered the BSR may be the one of the first logical channel or the second logical channel. The SR resource may be one of the first SR resource that corresponds to the first logical channel or the second SR resource that corresponds to the second logical channel. In response to transmitting the SR, the wireless device may receive an uplink grant for transmission of one or more transport blocks. The uplink grant may comprise transmission parameters (e.g., resource allocation parameters, HARQ related parameters, power control parameters, MIMO/beamforming parameters, etc.) for transmission of the one or more transport blocks. In an example, the one or more transport blocks may comprise the BSR. The one or more transport blocks may comprise data from logical channels comprising the one of the first logical channel or the second logical channel. The one or more transport blocks may be transmitted in a transmission duration that corresponds to the one of the first logical channel or the second logical channel (e.g., the logical channel that triggered the BSR).

Figure 22:
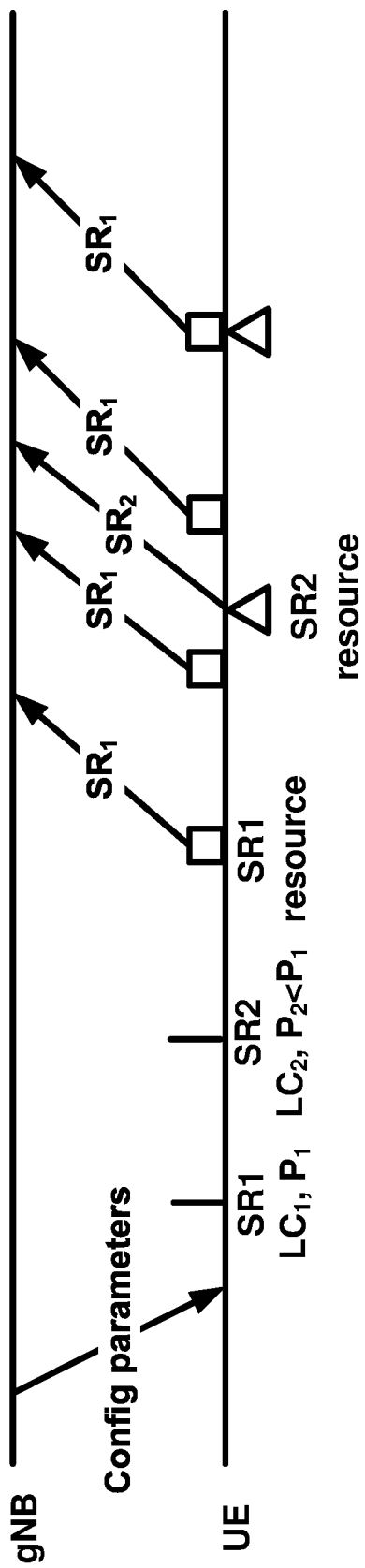
FIG. 22 is an is an illustration of an example scheduling request procedure as per an aspect of an embodiment of the present invention.

In an example embodiment, a wireless device may receive one or more messages comprising configuration parameters for one or more cells. In an example the configuration parameters may comprise parameters for a plurality of logical channels. In an example, the parameters for a logical channel may comprise a priority. In an example, the configuration parameters may comprise parameters for a first scheduling requests (SR) uplink radio resources and a second scheduling requests (SR) uplink radio resources. In an example, the first SR and the second SR may be configured with different configuration indices. In an example, the first SR uplink resources and the second SR uplink resources may comprise overlapping resources in a first time interval (e.g., first transmission time interval (TTI)). The wireless device may start a first SR process on the first SR uplink resources after data becomes available for one or more first logical channels. The wireless device may start a second SR process on the second SR uplink resources after data becomes available for one or more second logical channels. The one or more first logical channels may have higher priority than the one or more second logical channels. The wireless device may transmit a first SR signal corresponding to the first SR process in the first time interval (e.g., TTI). In an example, the wireless device may drop a second SR signal corresponding to the second SR process in the first time interval (e.g., TTI). In an example, the wireless device may not transmit the first SR signal and/or the second SR signa; in the first time interval (e.g., TTI). In an example, the wireless device may randomly (and/or based on UE implementation) drop one of a first SR signal corresponding to the first SR process and the second SR signal corresponding to the second SR process in the first time interval (e.g., TTI). In an example, the wireless device may transmit both a first SR signal corresponding to the first SR process and the second SR signal corresponding to the second SR process in the first time interval (e.g., TTI). In an example, the wireless device may transmit both a first SR signal corresponding to the first SR process and the second SR signal corresponding to the second SR process in the first time interval (e.g., TTI) and use different codes (e.g., CDMA codes). The base station may be able to distinguish the first SR signal and the second SR signal An example illustration in FIG. 22 shows a first SR process being associated with at least one first logical channel and a second SR process being associated with at least one second logical channel and the at least one second logical channel having a lower priority (P2) compared to the priority of the at least one first logical channel (P1). The example, in FIG. 22 shows that the wireless device drops the SR signal associated with the second SR in an overlapping resource. In an example, other parameters of the one or more first logical channels and the one or more second logical channels may be considered when deciding which SR signal to drop and which SR signal to transmit in an overlapping SR resource. In an example, the base station may distinguish the SR resources in a subframe e.g., when the SR signals are transmitted using different bits, times (e.g., a same TTI but different time), resource elements, resource blocks, codes, etc. In an example, the base station may not distinguish SR signals transmitted in a same resource. In an example, the wireless device may receive an uplink grant (e.g., by receiving a downlink control information (DCI) comprising/indicating the uplink grant) for a cell comprising transmission parameters for one or more transport blocks (TBs). In an example, the transmission parameters may comprise, transport block size, power control, radio resource allocation parameters, TTI/numerology and/or one or more TTIs/numerologies, MIMO parameters, etc. The wireless device may construct one or more TBs using the transmission parameters indicated in the uplink grant. The wireless device may transmit the one or more TBs employing the radio resource indicated by the uplink grant.

Figure 23:
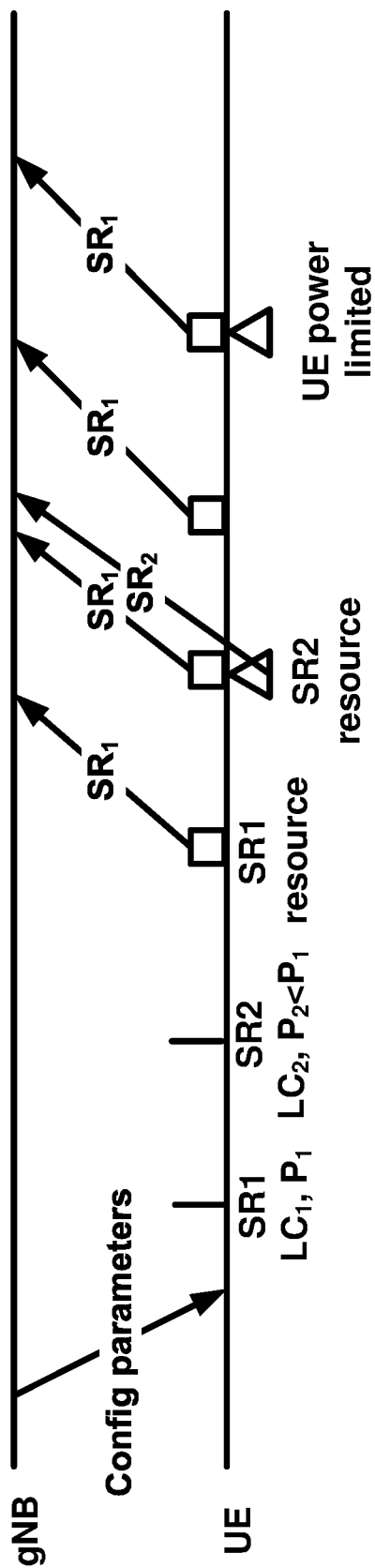
FIG. 23 is an is an illustration of an example scheduling request procedure as per an aspect of an embodiment of the present invention.

In an example embodiment, a wireless device may receive one or more messages comprising configuration parameters for one or more cells. In an example the configuration parameters may comprise parameters for a plurality of logical channels. In an example, the parameters for a logical channel may comprise a priority. In an example, the configuration parameters may comprise parameters for a first scheduling requests (SR) uplink radio resources and a second scheduling requests (SR) uplink radio resources. In an example, the first SR and the second SR may be configured with different configuration indices. In an example, the first SR process and the second SR process may have non-overlapping resources in a first time interval (e.g., first transmission time interval (TTI)). In an example the first SR process and the second SR process may be for a same cell. In an example the first SR process and the second SR process may be for different cells. In an example, the wireless device may start the first SR process after data becomes available for one or more first logical channels. In an example, the wireless device may start the second SR process after data becomes available for one or more second logical channels, wherein the one or more first logical channels have higher priority than the one or more second logical channels. The wireless device may transmit a first SR signal corresponding to the first SR process in the first time interval (e.g., first TTI). In an example, the wireless device may drop and/or scale the power of a second signal corresponding to the second SR process in the first time interval (e.g., first TTI) if the wireless device is power limited. In an example, the wireless device may scale both the first signal corresponding to the first SR process and the second signal corresponding to the second SR process in the first time interval (e.g., TTI) if the wireless device is power limited. In an example, the scaling factor for the first SR signal and the second SR signal may depend on the priorities of the one or more first logical channels and the one or more second logical channels. In an example, if the wireless device is power limited in the first time interval (e.g., TTI), the wireless device may drop both the first signal and the second signal. An example illustration in FIG. 23 shows a first SR process being associated with at least one first logical channel and a second SR process being associated with at least one second logical channel and the at least one second logical channel having a lower priority (P2) compared to the priority of the at least one first logical channel (P1). The example, in FIG. 23 shows that the wireless device drops the SR signal associated with the second SR in a non-overlapping resource. In this example, the wireless device is power-limited in a time interval (e.g., TTI) comprising non-overlapping resources. In an example, other parameters of the one or more first logical channels and the one or more second logical channels may be considered when deciding which SR signal to drop and which SR signal to transmit in an overlapping SR resource. In an example, other parameters of the one or more first logical channels and the one or more second logical channels may be considered when deciding whether to drop and/or scale the power of the first SR signal and/or the second SR signal. In an example, the wireless device may not increment a counter corresponding to the second SR process if the wireless device drops the second signal. In an example, the wireless device may increment a counter corresponding to the second SR process if the wireless device drops the second signal. In an example, the wireless device may receive an uplink grant (e.g., by receiving a downlink control information (DCI) comprising/indicating the uplink grant) for a cell comprising transmission parameters for one or more transport blocks (TBs). In an example, the transmission parameters may comprise, transport block size, power control, radio resource allocation parameters, TTI/numerology and/or one or more TTIs/numerologies, MIMO parameters, etc. The wireless device may construct one or more TBs using the transmission parameters indicated in the uplink grant. The wireless device may transmit the one or more TBs employing the radio resource indicated by the uplink grant.

In an example, a wireless device may calculate the power for one or more channels/signals transmitted during a time interval (e.g., TTI) using one or more parameters. The one or more parameters may include path loss measurements, allocated resources (e.g., number of resource blocks), power control related parameters in a grant (e.g., closed power control commands, etc.). An example, power control calculation may be as follows:

$$P_{PUCCH}(i)=\min\{P_{CMAX,c}(i), P_{0\_PUCCH}+PL_c+g(i)\}$$
[dBm]

where $P_{PUCCH}(i)$ may be the power of physical uplink control channel, $P_{CMAX,c}(i)$ may be the configured UE transmit power in subframe i for serving cell c, $P_{0\_PUCCH}$ may be a parameter indicated by upper layers, $PL_c$ may be a path loss estimate and may be a closed loop power control command indicated by a grant. Other example power control calculations may be used. In an example, the total calculated power for a time interval (e.g., TTI) may be more than a maximum transmit power. The maximum transmit power may be per cell/TTI/numerology and/or per UE. In an example, if a wireless device is power limited, the wireless device may scale the power and/or drop one or more channels/signals.

In an example, a base station may configure a plurality of timers and/or counters for a plurality of scheduling request configurations. In an example, a base station may set a first counter (e.g., SR_COUNTER) corresponding to a first scheduling request configuration to zero if there is no other pending SR for the same SR configuration (e.g., corresponding to one or more logical channels and/or logical channel groups and/or TTIs/numerologies and/or cell types and or service types). In an example, a counter corresponding to a SR process may be incremented when a SR signal corresponding to the SR process is transmitted. In an example, the SR processes may not share a common counter. In an example, a SR counter for a SR process may be incremented in a time interval (e.g., TTI) that a SR signal corresponding to the SR process is transmitted, if there is no useful uplink resource (e.g., PUSCH) for the time interval (e.g., TTI) to transmit the pending data corresponding to the SR.

Implementation of existing SR mechanisms when multiple SR processes for requesting resources from the same base station are pending may result in inefficient resource allocation by the base station. This issue may not be applicable when multiple SR processes are for multiple MAC entities associated with multiple base stations. Implementation of existing SR mechanisms lead to inefficient uplink scheduling, inefficient uplink resource utilization and degraded network performance. There is need to improve the SR mechanism when multiple SR resources of a base station are configured for a wireless device, and an SR resource corresponds to one or more logical channels being mapped to one or more transmission intervals. When logical channels are mapped to one or more transmission time intervals of an uplink data channel, example embodiments may provide additional flexibility to improve uplink resource efficiency. Example embodiments enhance the legacy SR mechanisms when multiple SR processes are running in parallel. Example embodiments provide enhanced SR mechanisms when multiple SR processes are pending for transmission of SR requests to the same base station. In an example embodiment, a wireless device may be configured with a plurality of SR configurations and each SR configuration may correspond to one or more logical channels mapped to one or more transmission interval (e.g., associated with one or more transmission time interval of a uplink data channel) for transmission to a base station. Example embodiments enhances the legacy scheduling request process and improves uplink radio resource efficiency. In legacy SR procedures, there is one ongoing SR process in a MAC entity. In response to a first number of SR signals being transmitted (e.g., a first counter reaching a first value) and the wireless device not receiving an uplink grant, the wireless device may start a random access process. In an example embodiment, a wireless device may be configured with a plurality of SR configurations and each SR configuration may correspond to one or more logical channels. A plurality of SR processes, wherein each process has an associated counter, may be running in parallel. The legacy SR processes may lead to inefficient uplink scheduling and degraded network performance when a plurality of SR processes are running in parallel. Example embodiments enhance the legacy process for starting random access when parallel scheduling requests run in parallel.

Figure 28:
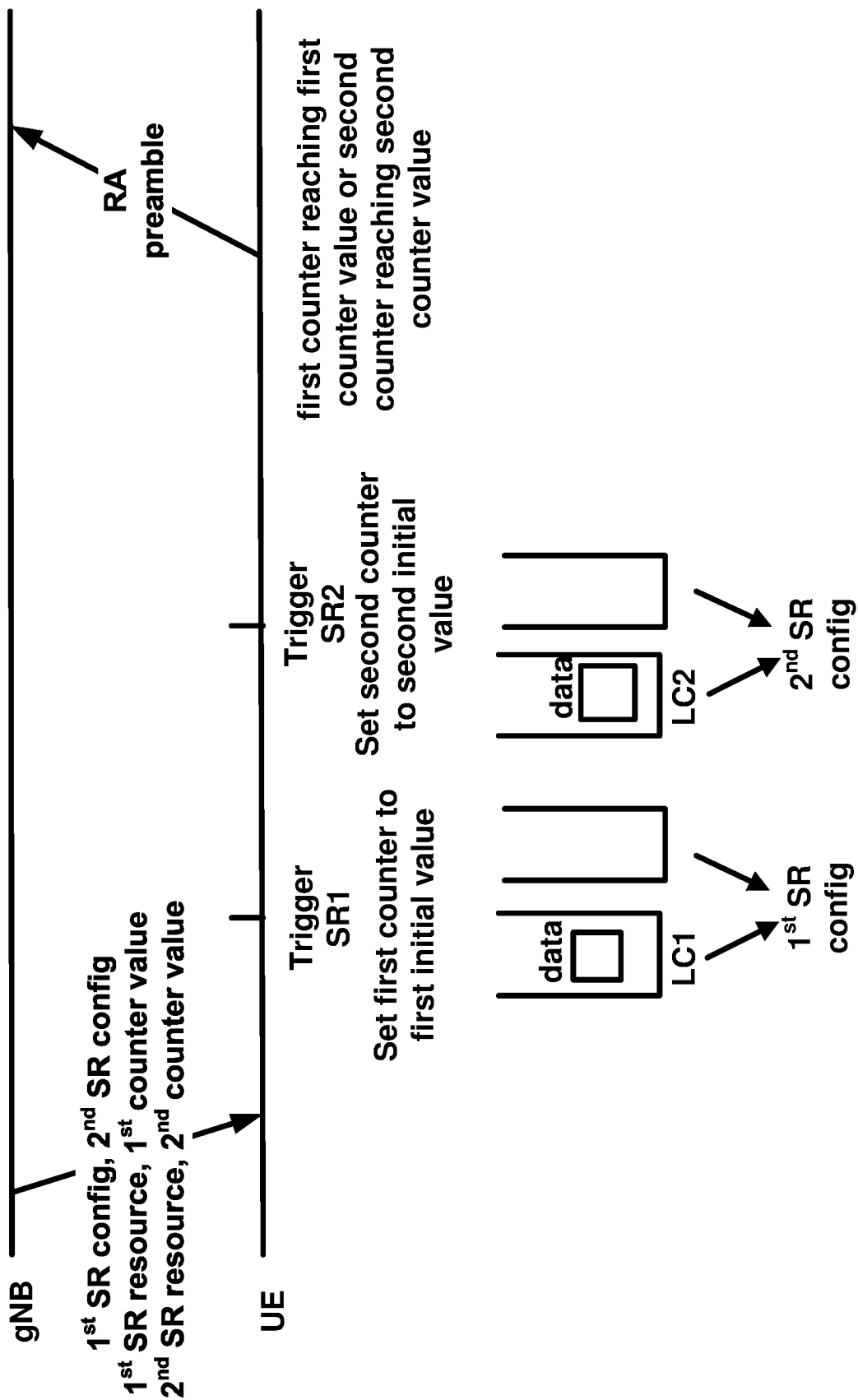
FIG. 28 is an is an illustration of an example scheduling request procedure as per an aspect of an embodiment of the present invention.

An example embodiment is shown in FIG. 28. In an example, a wireless device may receive, from a base station, one or more messages. The one or more messages may comprise configuration parameters for a plurality of logical channels comprising a first logical channel and a second logical channel. The first logical channel may be associated with a first bearer/quality of service. The second logical channel may be associated with a second bearer/quality of service. The one or more messages may comprise configuration parameters for a plurality of scheduling request configurations comprising a first scheduling request configuration and a second scheduling request configuration. The first scheduling request configuration parameters may indicate a first plurality of SR resources. The first scheduling request configuration parameters may comprise one or more first timer values. The second scheduling request configuration parameters may indicate a second plurality of SR resources. The second scheduling request configuration parameters may comprise one or more second timer values. In an example, first configuration parameters for the first scheduling request may comprise a first scheduling request configuration index. In an example, second configuration parameters for the second scheduling request may comprise a second scheduling request configuration index. The one or more messages (e.g., first scheduling request configuration parameters) may indicate a first counter value for a first counter of a first scheduling request (SR) configuration of the base station, wherein the first SR configuration corresponds to a first logical channel. The one or more messages (e.g., second scheduling request configuration parameters) may indicate a second counter value for a second counter of a second scheduling request (SR) configuration of the base station, wherein the second SR configuration corresponds to a second logical channel. In an example, configuration parameters for the first logical channel may comprise/indicate the first SR configuration index indicating that the first logical channel corresponds to the first scheduling request configuration. In an example, configuration parameters for the second logical channel may comprise/indicate the second SR configuration index indicating that the second logical channel corresponds to the second scheduling request configuration.

In an example, the wireless device may trigger a first SR corresponding to the first SR configuration in response to data becoming available to the first logical channel. In an example, the wireless device may set the first counter to a first initial value in response to no other SRs corresponding to the first SR configuration pending. In an example, the first initial value may be zero. In an example, the first initial value may be one. In an example, the wireless device may trigger a second SR corresponding to the second SR configuration in response to data becoming available to the second logical channel. In an example, the wireless device may set the second counter to a second initial value in response to no other SRs corresponding to the second SR configuration pending. In an example, the second initial value may be zero. In an example, the second initial value may be one. The wireless device may increment the first counter in response to transmitting the first SR. The wireless device may increment the second counter in response to transmitting the second SR. The wireless device may transmit, to the base station, a random access preamble in response to the first counter reaching the first counter value or the second counter reaching the second counter value. In an example, the wireless device may receive a random access response from the base station in response to transmitting the random access preamble.

In an example, the SR configuration parameters may comprise different parameters for a first SR and a second SR in a plurality of SRs. In an example, SR configuration parameters such as dsr-TransMax and sr-ProhibitTimer may be different for the first SR and the second SR.

In an example embodiment, a wireless device may receive one or more messages comprising configuration parameters for one or more cells. In an example, the one or more configuration parameters may comprise parameters for a plurality of logical channels. In an example, the one or more configuration parameters may comprise parameters for one or more SRs. In an example, the wireless device may trigger a buffer status report in response to data becoming available for one or more logical channels. In an example, the wireless device may trigger a scheduling request if one or more conditions are met. In an example, the one or more conditions may comprise lack of uplink resources for transmission of the buffer status report. In an example, the scheduling request may indicate the one or more logical channels and/or one or more logical channel groups comprising the one or more logical channels and/or one or more TTIs/numerologies that the one or more logical channels are mapped to and/or one or more service types corresponding to the one or more logical channels and/or one or more cell types that the one or more logical channels are mapped to. In an example, the wireless device may start a scheduling request process corresponding to the scheduling request trigger. In an example, the wireless device may transmit a SR signal via an uplink control channel. In an example, the SR signal may be transmitted on the TTI/numerology corresponding to the one or more logical channels. In an example, the wireless device may receive an uplink grant (e.g., by receiving a downlink control information (DCI) comprising/indicating the uplink grant) for a cell comprising transmission parameters for one or more transport blocks (TBs). In an example, the transmission parameters may comprise, transport block size, power control, radio resource allocation parameters, TTI/numerology and/or one or more TTIs/numerologies, MIMO parameters, etc. The wireless device may construct one or more TBs using the transmission parameters indicated in the uplink grant. The wireless device may transmit the one or more TBs employing the radio resource indicated by the uplink grant.

In NR, a plurality of SR configurations may be configured for a wireless device. A first SR configuration in the plurality of SR configurations may correspond to one or more first logical channels in the plurality of logical channels. In an example, a logical channel in the one or more first logical channels may be configured with a first parameter. In an example, a buffer status report may be triggered due to data becoming available for the logical channel. The MAC entity may delay triggering of a SR in response to the wireless device not having an uplink grant. The delay in triggering the SR may be due to the wireless device (e.g., the logical channel configured for the wireless device) being configured with semi-persistent scheduling grants and/or grant-free transmissions. To enable the delay, the MAC entity may start/restart a timer and may trigger the SR in response to the timer not running and the BSR pending. There is a need to enhance the scheduling request process by configuring a plurality of timers for the plurality of SR configurations. To improve the flexibility of the scheduling process, a first timer value may be configured for the first timer and a second timer value may be configured for a second timer. The scheduling request process needs to be enhanced to improve the efficiency of uplink scheduling in the wireless device. Example embodiments enhance the efficiency of the scheduling request process in the wireless network and the wireless device.

In an example embodiment, a wireless device may receive one or more messages. The one or more messages may comprise radio resource control (RRC) messages and/or other configuration messages. The one or more messages may comprise logical channel configuration parameters for a plurality of logical channels. In an example, the one or more messages may comprise a first timer value for a first timer. The first timer may be for a first logical channel group. The first logical channel group may comprise one or more first logical channels in the plurality of logical channels. In an example, the one or more messages may comprise a second timer value for a second timer. The second timer may be for a second logical channel group. The second logical channel group may comprise one or more second logical channels in the plurality of logical channels. In an example, the wireless device may trigger a buffer status report (BSR) in response to data becoming available for a logical channel in the plurality of logical channels. The logical channel may be configured with a first parameter. In an example, the first parameter may be a logical channel SR prohibit parameter. In an example, the first parameter, if configured, may delay transmission of a SR in response to SR being triggered for the logical channel configured with the first parameter. In an example, the logical channel configuration parameters for the logical channel may comprise the first parameter and/or may indicate whether the logical channel is configured with the first parameter and/or may delay transmission of a SR in response to BSR being triggered due to data becoming available for the logical channel. In an example, the wireless device may select one of the first timer or the second timer and start and/or restart the one of the first or the second timer. In an example, the selection of the one of the first timer or the second timer may be at least based on whether the logical channel that triggered the BSR belongs to the first logical channel group or the second logical channel group. In an example, the wireless device may trigger a scheduling request (SR) in response to the one of the first timer or the second timer being expired and the BSR being pending. In an example, the wireless device may transmit a SR signal on a SR resource. In an example, the wireless device may start a random access procedure in response to transmission of SR being unsuccessful for a first number of times. In an example, the one or more messages may comprise and/or indicate the first number. In an example, a counter may be incremented if a transmission of SR is unsuccessful and the random access procedure may start in response to the counter reaching the first number. In an example, the wireless device may transmit a random access preamble in response to starting the random access procedure.

In an example embodiment, a wireless device may receive one or more messages. The one or more messages may comprise radio resource control (RRC) messages and/or other configuration messages. The one or more messages may comprise logical channel configuration parameters for a plurality of logical channels. In an example, the one or more messages may comprise a first timer value for a first timer. The first timer may be for a first logical channel group. The first logical channel group may comprise one or more first logical channels in the plurality of logical channels. In an example, the one or more messages may comprise a second timer value for a second timer. The second timer may be for a second logical channel group. The second logical channel group may comprise one or more second logical channels in the plurality of logical channels. In an example, the wireless device may trigger a buffer status report (BSR) in response to data becoming available for a logical channel in the plurality of logical channels. The logical channel may not be configured with a first parameter (e.g., logical channel SR prohibit). In an example, the first parameter, if configured, may delay transmission of a SR in response to SR being triggered for the logical channel configured with the first parameter. In an example, the logical channel configuration parameters for the logical channel may comprise the first parameter and/or may indicate whether the logical channel is configured with the first parameter and/or may delay transmission of a SR in response to BSR being triggered due to data becoming available for the logical channel. In an example, the wireless device may select one of the first timer or the second timer and stop the one of the first timer or the second timer in response to the one of the first timer or the second timer being running. In an example, the selection of the one of the first timer or the second timer may be at least based on whether the logical channel that triggered the BSR belongs to the first logical channel group or the second logical channel group. In an example, the wireless device may trigger a scheduling request (SR) in response to the BSR being pending and the wireless device not having an uplink grant. In an example, the wireless device may transmit a SR signal on a SR resource. In an example, the wireless device may start a random access procedure in response to transmission of SR being unsuccessful for a first number of times. In an example, the one or more messages may comprise and/or indicate the first number. In an example, a counter may be incremented if a transmission of SR is unsuccessful and the random access procedure may start in response to the counter reaching the first number. In an example, the wireless device may transmit a random access preamble in response to starting the random access procedure.

In an example, the SR may comprise a single bit. The base station may detect the presence of SR by detecting the energy level on the SR resource where the SR signal is transmitted. By transmitting the SR signal on the SR resource, the wireless device may signal to the base station that the wireless device needs uplink resource usable for transmission of data (e.g., one or more logical channels and/or one or more radio bearers) and/or one or more services (e.g., URLLC, eMBB, eMTC, etc.) corresponding to the SR resource used for transmission of the SR signal. In an example, the base station may transmit one or more uplink grants and allocate uplink resources to the wireless device considering (e.g., based on) the SR resource used for transmission of the SR signal.

In an example, the one or more first logical channels may correspond to a first SR configuration and the one or more second logical channels may correspond to a second SR configuration. In an example, the one or more messages may comprise the first SR configuration parameters and the second SR configuration parameters. In an example, the first SR configuration parameters may comprise one or more first fields indicating the one or more first logical channels and the second SR configuration parameters may comprise one or more second fields indicating the one or more second logical channels. In an example, the one or more first fields may comprise a first list of the one or more first logical channels (e.g., one or more first logical channel IDs) and the one or more second fields may comprise a second list of the one or more second logical channels (e.g., one or more second logical channel IDs). In an example, the first SR configuration parameters may indicate a first plurality of SR resources and the second SR configuration parameters may indicate a second plurality of SR resources. In an example, the first SR configuration parameters may comprise one or more first indices indicating the first plurality of SR resources and the second SR configuration parameters comprise one or more second indices indicating the second plurality of SR resources. In an example, the first SR configuration indicates a first numerology/TTI length/duration and/or one or more first services and/or one or more first logical channels. In an example, the second SR configuration indicates a second numerology/TTI length/duration and/or one or more second services and/or one or more second logical channels. In an example, the one or more first logical channels may be mapped to a first numerology/TTI length/duration and the one or more second logical channels may be mapped to a second numerology/TTI length/duration. In an example, the SR resource for transmission of the SR signal may be a resource from one of the first plurality of SR resources or the second plurality of SR resources depending on whether the logical channel that triggered the BSR belongs to the first logical channel group or the second logical channel group.

In an example, the one of the first timer or the second timer may expire in response to a time equal to the corresponding timer value (e.g., the first timer value in response to the one of the first timer or second timer being the first timer and the second timer value in response to the one of the first timer or the second timer being the second timer) elapsing in response to the one of the first timer or second timer starting or restarting. In an example, the BSR may be pending if the BSR is not canceled. In an example, the BSR may be pending if the wireless device does not receive an uplink grant (e.g., an uplink grant useful for transmission of the logical channel that triggered the BSR and/or all the pending data and/or a portion of the pending data) while the one of the first timer or the second timer is running.

In an example embodiment, a BSR may comprise buffer status of a plurality of logical channel groups. A logical channel group may be identified with a logical channel group ID. In an example, a logical channel group for transmission of BSR may correspond to a logical channel group corresponding to a SR configuration. In an example, the SR configuration parameters may comprise and/or indicate the logical channel group ID corresponding to the SR configuration. In an example, the base station may indicate the mapping between the logical channel groups and the SR configurations. In an example, the mapping may be indicated using an information element in RRC. In an example, the mapping may be dynamically indicated to the wireless device (e.g., using physical layer signaling and/or MAC layer signaling e.g., PDCCH or MAC CE).

In NR, a plurality of SR configurations may be configured for a wireless device. A first SR configuration in the plurality of SR configurations may correspond to one or more first logical channels in the plurality of logical channels. In an example, a logical channel in the one or more first logical channels may be configured with a first parameter. In an example, a buffer status report may be triggered due to data becoming available for the logical channel. The MAC entity may delay triggering of a SR in response to the wireless device not having an uplink grant. The delay in triggering the SR may be due to the wireless device (e.g., the logical channel configured for the wireless device) being configured with semi-persistent scheduling grants and/or grant-free transmissions. To enable the delay, the MAC entity may start/restart a timer and may trigger the SR in response to the timer not running and the BSR pending. There is a need to enhance the scheduling request process by configuring a plurality of timers for the plurality of SR configurations. To improve the efficiency of the scheduling process, a timer value may be configured for and/or shared by the first timer and a second timer. The scheduling request process needs to be enhanced to improve the efficiency of uplink scheduling in the wireless device. Example embodiments enhance the efficiency of the scheduling request process in the wireless network and the wireless device.

In an example embodiment, a wireless device may receive one or more messages. The one or more messages may comprise radio resource control (RRC) messages and/or other configuration messages. The one or more messages may comprise logical channel configuration parameters for a plurality of logical channels. In an example, the one or more messages may comprise a timer value for a first timer and a second timer. The first timer may be for a first logical channel group. The first logical channel group may comprise one or more first logical channels in the plurality of logical channels. The second timer may be for a second logical channel group. The second logical channel group may comprise one or more second logical channels in the plurality of logical channels. In an example, the wireless device may trigger a buffer status report (BSR) in response to data becoming available for a logical channel in the plurality of logical channels. The logical channel may be configured with a first parameter. In an example, the first parameter may be a logical channel SR prohibit parameter. In an example, the first parameter, if configured, may delay transmission of a SR in response to SR being triggered for the logical channel configured with the first parameter. In an example, the logical channel configuration parameters for the logical channel may comprise the first parameter and/or may indicate whether the logical channel is configured with the first parameter and/or may delay transmission of a SR in response to BSR being triggered due to data becoming available for the logical channel. In an example, the wireless device may select one of the first timer or the second timer and start and/or restart the one of the first timer or the second timer. In an example, the selection of the one of the first timer or the second timer may be at least based on whether the logical channel that triggered the BSR belongs to the first logical channel group or the second logical channel group. In an example, the wireless device may trigger a scheduling request (SR) in response to the one of the first timer or the second timer being expired and the BSR being pending. In an example, the wireless device may transmit a SR signal on a SR resource. In an example, the wireless device may start a random access procedure in response to transmission of SR being unsuccessful for a first number of times. In an example, the one or more messages may comprise and/or indicate the first number. In an example, a counter may be incremented if a transmission of SR is unsuccessful and the random access procedure may start in response to the counter reaching the first number. In an example, the wireless device may transmit a random access preamble in response to starting the random access procedure.

In an example, the one of the first timer or the second timer may expire in response to a time equal to the timer value elapsing in response to the one of the first timer or second timer starting or restarting.

In an example embodiment, a wireless device may receive one or more messages. The one or more messages may comprise radio resource control (RRC) messages and/or other configuration messages. The one or more messages may comprise logical channel configuration parameters for a plurality of logical channels. In an example, the one or more messages may comprise a timer value for a first timer and a second timer. The first timer may be for a first logical channel group. The first logical channel group may comprise one or more first logical channels in the plurality of logical channels. The second timer may be for a second logical channel group. The second logical channel group may comprise one or more second logical channels in the plurality of logical channels. In an example, the wireless device may trigger a buffer status report (BSR) in response to data becoming available for a logical channel in the plurality of logical channels. The logical channel may not be configured with a first parameter (e.g., a logical channel SR prohibit parameter). In an example, the first parameter, if configured, may delay transmission of a SR in response to SR being triggered for the logical channel configured with the first parameter. In an example, the logical channel configuration parameters for the logical channel may comprise the first parameter and/or may indicate whether the logical channel is configured with the first parameter and/or may delay transmission of a SR in response to BSR being triggered due to data becoming available for the logical channel. In an example, the wireless device may select one of the first timer or the second timer and stop the one of the first timer or the second timer. In an example, the selection of the one of the first timer or the second timer may be at least based on whether the logical channel that triggered the BSR belongs to the first logical channel group or the second logical channel group. In an example, the wireless device may trigger a scheduling request (SR) in response to the one of the first timer or the BSR being pending and the wireless device not having an uplink grant. In an example, the wireless device may transmit a SR signal on a SR resource. In an example, the wireless device may start a random access procedure in response to transmission of SR being unsuccessful for a first number of times. In an example, the one or more messages may comprise and/or indicate the first number. In an example, a counter may be incremented if a transmission of SR is unsuccessful and the random access procedure may start in response to the counter reaching the first number. In an example, the wireless device may transmit a random access preamble in response to starting the random access procedure.

In NR, a plurality of SR configurations may be configured for a wireless device. A first SR configuration in the plurality of SR configurations may correspond to one or more first logical channels in the plurality of logical channels. In an example, a logical channel in the one or more first logical channels may be configured with a first parameter. In an example, a buffer status report may be triggered due to data becoming available for the logical channel. The MAC entity may delay triggering of a SR in response to the wireless device not having an uplink grant. The delay in triggering the SR may be due to the wireless device (e.g., the logical channel configured for the wireless device) being configured with semi-persistent scheduling grants and/or grant-free transmissions. To enable the delay, the MAC entity may start/restart a timer and may trigger the SR in response to the timer not running and the BSR pending. There is a need to enhance the scheduling request process by configuring a plurality of timers for the plurality of SR configurations. In an example, the configuration parameters may indicate that the first timer is released. The scheduling request process needs to be enhanced to improve the efficiency of uplink scheduling in the wireless device. Example embodiments enhance the efficiency of the scheduling request process in the wireless network and the wireless device.

In an example embodiment, a wireless device may receive one or more messages. The one or more messages may comprise radio resource control (RRC) messages and/or other configuration messages. The one or more messages may comprise logical channel configuration parameters for a plurality of logical channels. In an example, the one or more messages may comprise configuration parameters for a first timer. The configuration parameters for the first timer may comprise a first timer value for the first timer. The configuration parameters for the first timer may indicate that the first timer is released. The first timer may be for a first logical channel group. The first logical channel group may comprise one or more first logical channels in the plurality of logical channels. In an example, the one or more messages may comprise configuration parameters for a second timer. The configuration parameters for the second timer may comprise a second timer value for the second timer. The configuration parameters for the second timer may indicate that the second timer is released. The second timer may be for a second logical channel group. The second logical channel group may comprise one or more second logical channels in the plurality of logical channels. In an example, the wireless device may trigger a buffer status report (BSR) in response to data becoming available for a logical channel in the plurality of logical channels. The logical channel may be configured with a first parameter. In an example, the first parameter may be a logical channel SR prohibit parameter. In an example, the first parameter, if configured, may delay transmission of a SR in response to SR being triggered for the logical channel configured with the first parameter. In an example, the logical channel configuration parameters for the logical channel may comprise the first parameter and/or may indicate whether the logical channel is configured with the first parameter and/or may delay transmission of a SR in response to BSR being triggered due to data becoming available for the logical channel. In an example, the wireless device may select one of the first timer or the second timer and start and/or restart the one of the first timer or the second timer, in response to the one of the first timer or second timer not being released. In an example, the selection of the one of the first timer or the second timer may be at least based on whether the logical channel that triggered the BSR belongs to the first logical channel group or the second logical channel group. In an example, the wireless device may trigger a scheduling request (SR) in response to the one of the first timer or the second timer being expired and the BSR being pending. In an example, the wireless device may transmit a SR signal on a SR resource. In an example, the wireless device may start a random access procedure in response to transmission of SR being unsuccessful for a first number of times. In an example, the one or more messages may comprise and/or indicate the first number. In an example, a counter may be incremented if a transmission of SR is unsuccessful and the random access procedure may start in response to the counter reaching the first number. In an example, the wireless device may transmit a random access preamble in response to starting the random access procedure.

In an example embodiment, a wireless device may receive one or more messages. The one or more messages may comprise radio resource control (RRC) messages and/or other configuration messages. The one or more messages may comprise logical channel configuration parameters for a plurality of logical channels. In an example, the one or more messages may comprise configuration parameters for a first timer. The configuration parameters for the first timer may comprise a first timer value for the first timer. The configuration parameters for the first timer may indicate that the first timer is released. The first timer may be for a first logical channel group. The first logical channel group may comprise one or more first logical channels in the plurality of logical channels. In an example, the one or more messages may comprise configuration parameters for a second timer. The configuration parameters for the second timer may comprise a second timer value for the second timer. The configuration parameters for the second timer may indicate that the second timer is released. The second timer may be for a second logical channel group. The second logical channel group may comprise one or more second logical channels in the plurality of logical channels. In an example, the wireless device may trigger a buffer status report (BSR) in response to data becoming available for a logical channel in the plurality of logical channels. The logical channel may not be configured with a first parameter (e.g., a logical channel SR prohibit parameter). In an example, the first parameter, if configured, may delay transmission of a SR in response to SR being triggered for the logical channel configured with the first parameter. In an example, the logical channel configuration parameters for the logical channel may comprise the first parameter and/or may indicate whether the logical channel is configured with the first parameter and/or may delay transmission of a SR in response to BSR being triggered due to data becoming available for the logical channel. In an example, the wireless device may select one of the first timer or the second timer and stop the one of the first timer or the second timer, in response to the one of the first timer or second timer not being released. In an example, the selection of the one of the first timer or the second timer may be at least based on whether the logical channel that triggered the BSR belongs to the first logical channel group or the second logical channel group. In an example, the wireless device may trigger a scheduling request (SR) in response to the one of the first timer or the second timer being expired and the BSR being pending. In an example, the wireless device may transmit a SR signal on a SR resource. In an example, the wireless device may start a random access procedure in response to transmission of SR being unsuccessful for a first number of times. In an example, the one or more messages may comprise and/or indicate the first number. In an example, a counter may be incremented if a transmission of SR is unsuccessful and the random access procedure may start in response to the counter reaching the first number. In an example, the wireless device may transmit a random access preamble in response to starting the random access procedure.

Figure 24:
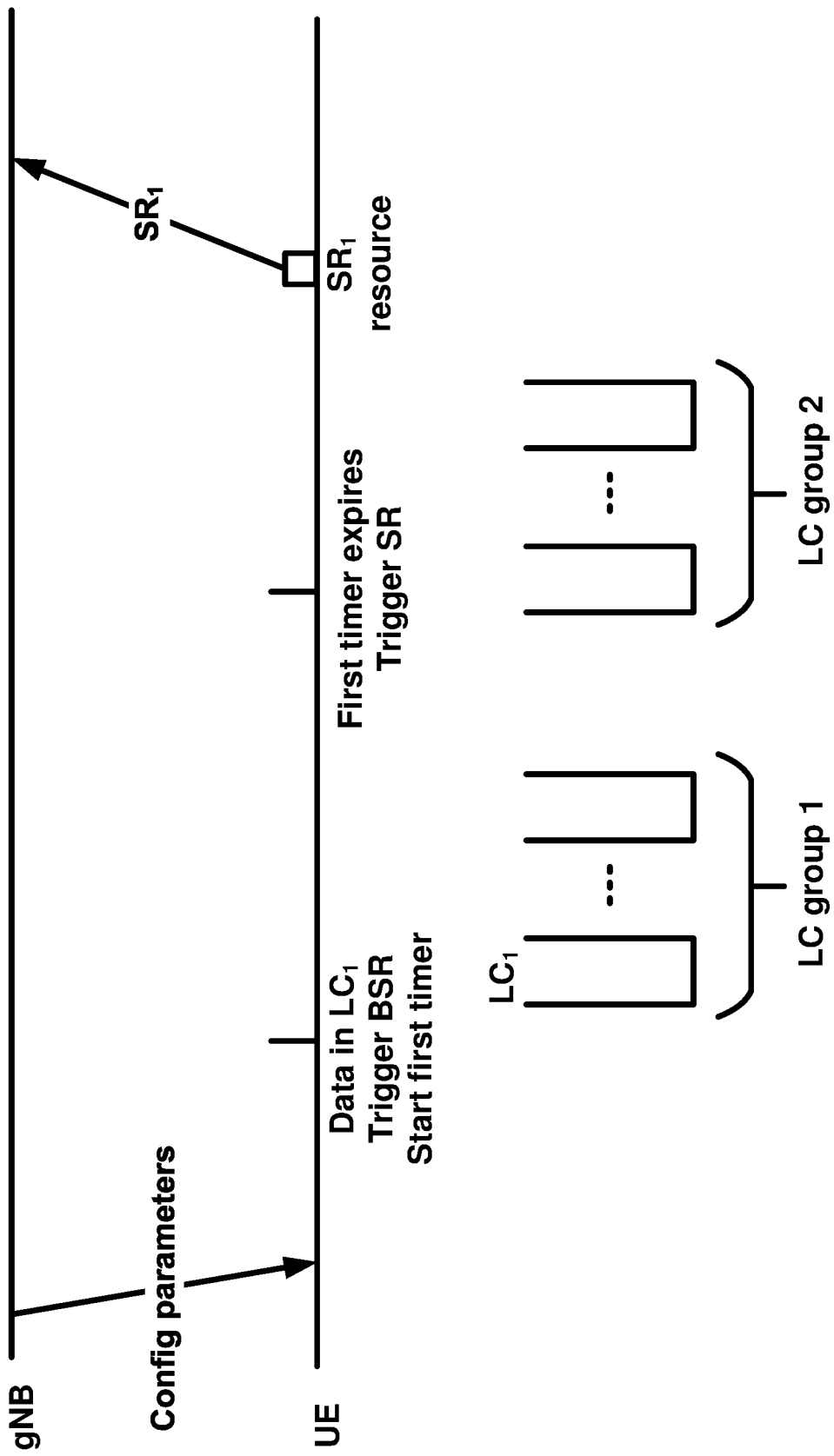
FIG. 24 is an is an illustration of an example scheduling request procedure as per an aspect of an embodiment of the present invention.

In an example embodiment in FIG. 24, a wireless device may receive one or more messages. The one or more messages may comprise radio resource control (RRC) messages and/or other configuration messages. The one or more messages may comprise logical channel configuration parameters for a plurality of logical channels. In an example, the one or more messages may comprise configuration parameters for a first timer. The first timer may be for a first logical channel group. The first logical channel group may comprise one or more first logical channels in the plurality of logical channels. In an example, the one or more messages may comprise configuration parameters for a second timer. The second timer may be for a second logical channel group. The second logical channel group may comprise one or more second logical channels in the plurality of logical channels. In an example, the wireless device may trigger a buffer status report (BSR) in response to data becoming available for a logical channel (e.g., $LC_1$ in FIG. 24) in the plurality of logical channels. The logical channel (e.g., $LC_1$ in FIG. 24) may be configured with a first parameter. In an example, the first parameter may be a logical channel SR prohibit parameter. In an example, the first parameter may delay transmission of a SR in response to SR being triggered for $LC_1$. In an example, the logical channel configuration parameters $LC_1$ may comprise the first parameter and/or may indicate whether $LC_1$ is configured with the first parameter and/or may delay transmission of a SR in response to BSR being triggered due to data becoming available for $LC_1$. In an example, the wireless device may determine that $LC_1$ is in the first LC group and may start and/or restart the first timer in response to this determination. The wireless device may trigger the SR in response to the expiration of the first timer. The wireless device may transmit a SR signal in a SR resource configured for the first SR configuration (e.g., for the one or more first logical channels). In an example, the wireless device may start a random access procedure in response to transmission of SR being unsuccessful for a first number of times. In an example, the one or more messages may comprise and/or indicate the first number. In an example, a counter may be incremented if a transmission of SR is unsuccessful and the random access procedure may start in response to the counter reaching the first number. In an example, the wireless device may transmit a random access preamble in response to starting the random access procedure.

Implementation of existing SR mechanisms when multiple SR processes for requesting resources from the same base station are pending may result in inefficient resource allocation by the base station. This issue may not be applicable when multiple SR processes are for multiple MAC entities associated with multiple base stations. Implementation of existing SR mechanisms lead to inefficient uplink scheduling, inefficient uplink resource utilization and degraded network performance. There is need to improve the SR mechanism when multiple SR resources of a base station are configured for a wireless device, and an SR resource corresponds to one or more logical channels being mapped to one or more transmission intervals. When logical channels are mapped to one or more transmission time intervals of an uplink data channel, example embodiments may provide additional flexibility to improve uplink resource efficiency. Example embodiments enhance the legacy SR mechanisms when multiple SR processes are running in parallel. Example embodiments provide enhanced SR mechanisms when multiple SR processes are pending for transmission of SR requests to the same base station. In an example embodiment, a wireless device may be configured with a plurality of SR configurations and each SR configuration may correspond to one or more logical channels mapped to one or more transmission interval (e.g., associated with one or more transmission time interval of a uplink data channel) for transmission to a base station. Example embodiments enhances the legacy scheduling request process and improves uplink radio resource efficiency. In legacy SR process, a logical channel may be configured with a prohibit/delaying parameter indicating that when a buffer status report is triggered due to data becoming available to the logical channel and the wireless device not having uplink resources for transmission of BSR, the corresponding scheduling request triggering is delayed. The wireless device may trigger the SR only if a corresponding scheduling request timer is not running. In an example embodiment, a plurality of SR configurations may be configured for a wireless device. A SR configuration in the plurality of SR configurations may correspond to one or more logical channels. The legacy procedures do not provide enough flexibility, for example, to treat the SR delaying for different logical channels differently. This leads to inefficient uplink scheduling and degraded network performance. There is a need to enhance the SR triggering delay process and configuration in an NR system. Example embodiments enhance the SR triggering delay process and configuration.

Figure 29:
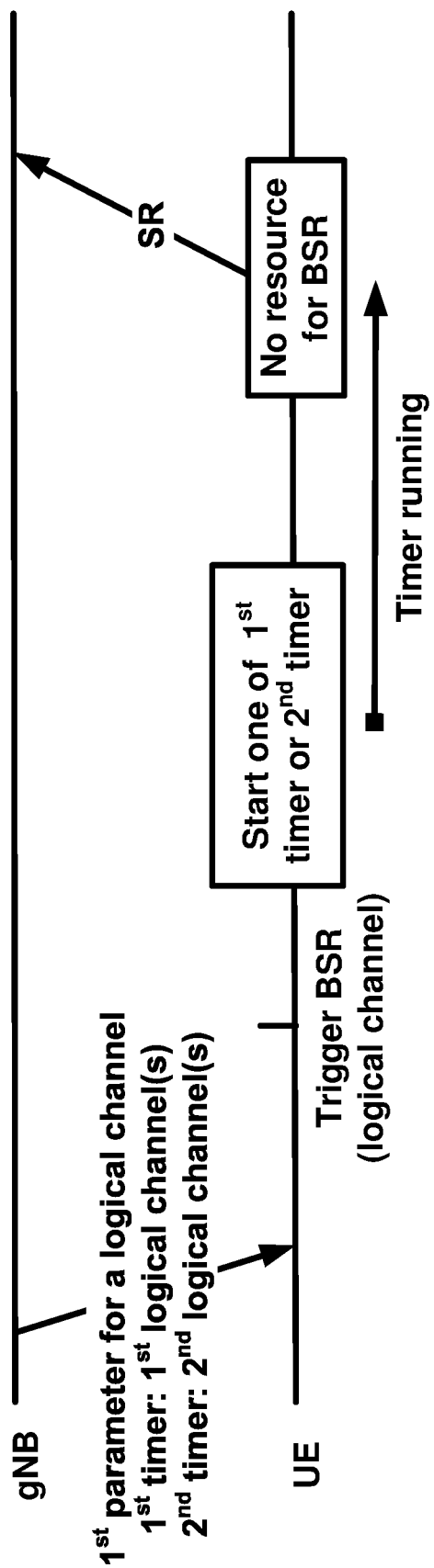
FIG. 29 is an is an illustration of an example scheduling request procedure as per an aspect of an embodiment of the present invention.

An example embodiment is shown in FIG. 29. A wireless device may receive configuration parameters. In an example, the configuration parameters may comprise logical channel configuration parameters for a plurality of logical channels comprising one or more first logical channels and one or more second logical channels. In an example, the configuration parameters may comprise a first parameter for a logical channel in the one or more first logical channels or the one or more second logical channels. In an example, the first parameter for the first logical channel may indicate delaying triggering the scheduling request if data becomes available for the first logical channel. In an example, the configuration parameters may comprise first scheduling request configuration parameters and second scheduling request configuration parameters. In an example, the configuration parameters (e.g., the first scheduling request configuration parameters) may comprise a first timer value for a first timer corresponding to the one or more first logical channels. In an example, the configuration parameters (e.g., the second scheduling request configuration parameters) may comprise a second timer value for a second timer corresponding to the one or more second logical channel. In an example, the first scheduling request configuration parameters may comprise a first scheduling request configuration index. In an example, the second scheduling request configuration parameters may comprise a second scheduling request configuration index. In an example the configuration parameters for the one or more first logical channels may comprise/indicate the first scheduling request configuration index. In an example, the configuration parameters for the one or more second logical channels may comprise/indicate the second configuration index. In an example, the wireless device may trigger a buffer status report in response to data becoming available to the logical channel. In an example, the wireless device may start one of the first timer or the second timer based on whether the one or more first logical channels comprise the logical channel or the or more second logical channels comprise the logical channel. The wireless device may transmit a scheduling request in response to: uplink resources not being available for transmitting the buffer status report and the one of the first timer or the second timer not running. In an example, the wireless device may transmit a random access preamble in response to the transmitting the scheduling request and not receiving an uplink grant for transmission of data from the logical channel in response to the transmitting the scheduling request.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

FIG. 30 is an example flow diagram as per an aspect of an embodiment of the present disclosure. At 3010, a wireless device may receive from a base station, one or more messages indicating: a first scheduling request (SR) resource and a second SR resource. The first SR resource may be of the base station and correspond to a first logical channel. The first logical channel may correspond to one or more first transmission durations up to a first value. The second SR resource may be of the base station and correspond to a second logical channel. The second logical channel may correspond to one or more second transmission durations up to a second value. At 3020, an SR may be triggered in response to uplink resources not being available for transmission of a triggered buffer status report (BSR). The triggered BSR may be in response to uplink data becoming available for one of the first logical channel or the second logical channel. At 3030, the SR may be transmitted to the base station via an SR resource that corresponds to a logical channel that triggered the BSR. The SR resource may be one of: the first SR resource that corresponds to the first logical channel; or the second SR resource that corresponds to the second logical channel. At 3040, in response to the transmitting of the SR, an uplink grant may be received from the base station. The uplink grant may be for transmission of one or more transport blocks in a transmission duration that corresponds to the one of: the first logical channel or the second logical channel.

According to an embodiment, the wireless device may further transmit, in response to the uplink grant, one or more transport blocks comprising the BSR. According to an embodiment, the one or more transport blocks may be transmitted via a physical uplink shared channel. According to an embodiment, the wireless device may transmit the SR via the first SR resource when the triggered BSR is in response to uplink data becoming available for the first logical channel. The wireless device may transmit the SR via the second SR resource when the triggered BSR is in response uplink data becoming available for to the second logical channel. According to an embodiment, the first logical channel and the second logical channel are for data transmission to a same base station. According to an embodiment, the one or more messages may indicate: a first SR configuration index for a first SR configuration corresponding to the first SR resources; and a second SR configuration index for a second SR configuration corresponding to the second SR resources. According to an embodiment, the first SR configuration may indicate one or more first Sr prohibit timer values and one or more first SR transmission counter values; and the second SR configuration may indicate one or more second SR prohibit timer values and one or more second SR transmission counter values. According to an embodiment, the one or messages may indicate that: the first logical channel corresponds to the first SR configuration; and the second logical channel corresponds to the second SR configuration. According to an embodiment, a first transmission duration may comprise a first transmission time interval for transmission of a first transport block. According to an embodiment, the first logical channel may correspond to a first quality of service requirement and the second logical channel corresponds to a second quality of service requirement. According to an embodiment, the uplink grant may comprise transmission parameters for the transmission of the one or more transport blocks. According to an embodiment, the one or more transport blocks may comprise data from one or more logical channels comprising the one of the first logical channel or the second logical channel. According to an embodiment, the one or more messages may indicate that a first cell is an allowed serving cell for the first logical channel; and the uplink grant may indicate the transmission of the one or more transport blocks via the first cell.

FIG. 31 is an example flow diagram as per an aspect of an embodiment of the present disclosure. At 3110, a wireless device may receive one or more messages from a base station. The one or more messages may indicate: a first scheduling request (SR) resource and a second SR resource. The first SR resource may be of the base station and correspond to a first logical channel. The second SR resource may be the base station and correspond to a second logical channel. At 3120, an SR may be triggered in response to uplink resources not being available for transmission of a triggered buffer status report (BSR). The triggered BSR may be in response to uplink data becoming available for one of the first logical channel or the second logical channel. At 3130, the SR may be transmitted to the base station via an SR resource that corresponds to a logical channel that triggered the BSR. The SR resource may be one of: the first SR resource that corresponds to the first logical channel; or the second SR resource that corresponds to the second logical channel. At 3140, the base station may receive, in response to the transmitting the SR, an uplink grant for transmission of one or more transport blocks.

FIG. 32 is an example flow diagram as per an aspect of an embodiment of the present disclosure. At 3210, a wireless device may receive one or more messages. The one or more messages may indicate: first scheduling request (SR) configuration parameters, second SR configuration parameters, and logical channel configuration parameters. The first SR configuration parameters may indicate a first timer value for a first timer. The second SR configuration parameters may indicate a second timer value for a second timer. The logical channel configuration parameters may be for one or more logical channels corresponding to one or more transmission durations. At 3220 one or more downlink control information may be received. The one or more downlink control information may indicate one or more uplink grants associated with the one or more transmission durations. In response to: the one or more logical channels comprising one or more first logical channels with available data for transmission (at 3230); and a first size of the one or more uplink grants being larger than a second size of the one or more first logical channels with available data (3240): a first SR may be cancelled at 3250. The first SR may correspond to the first SR configuration and a second SR corresponding to the second SR configuration. The first timer and the second timer may be stopped at 3260.

Figure 33:
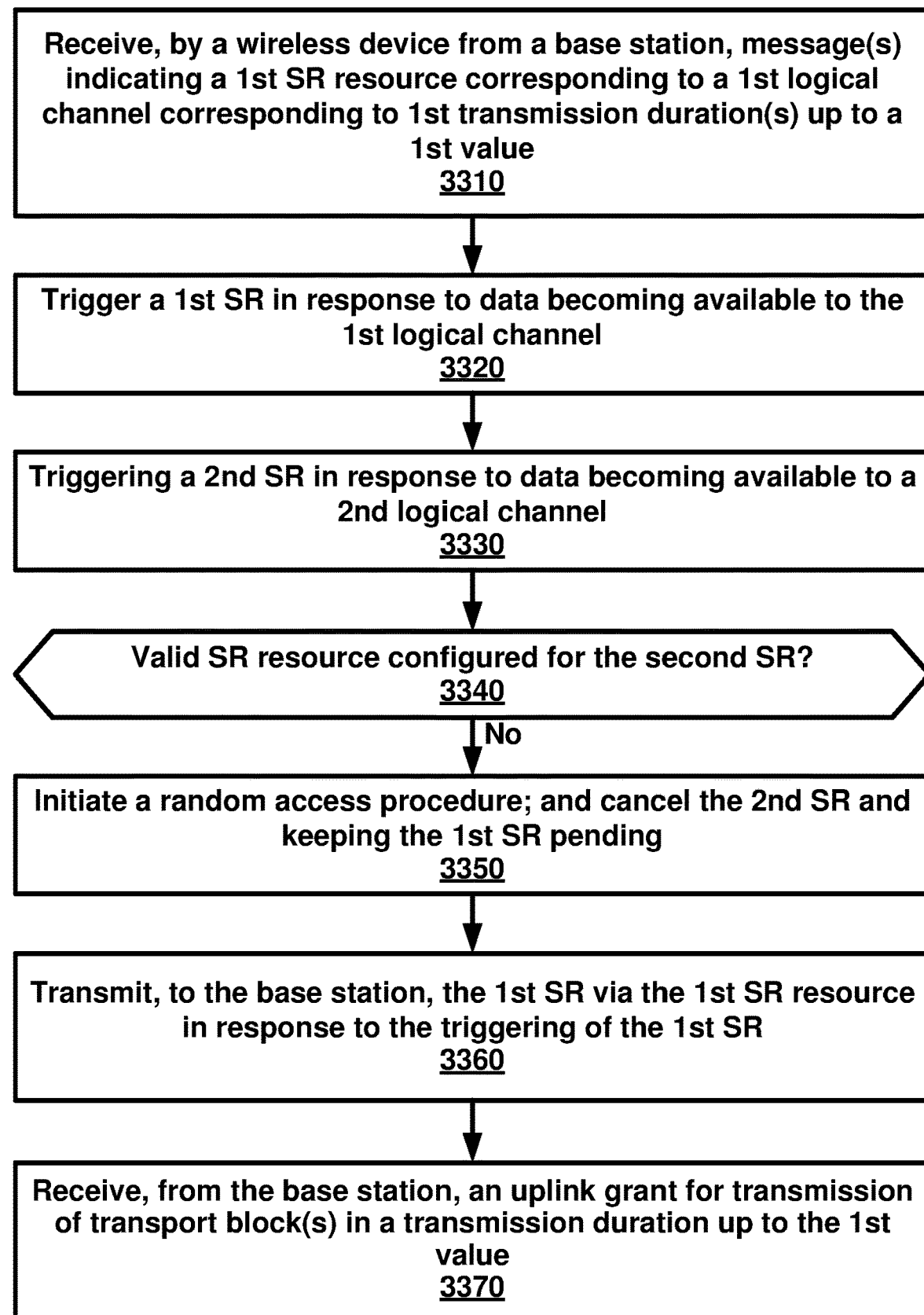
FIG. 33 is an example flow diagram as per an aspect of an embodiment of the present disclosure.

FIG. 33 is an example flow diagram as per an aspect of an embodiment of the present disclosure. At 3310, a wireless device may receive one or more messages from a base station. The one or more messages may indicate: a first scheduling request (SR) resource. The first SR resource may correspond to a first logical channel corresponding to one or more first transmission durations up to a first value. At 3320, a first SR may be triggered in response to data becoming available to the first logical channel. At 3330, a second SR may be triggered in response to data becoming available to a second logical channel. When no valid SR resource being configured for the second SR (3340): at 3350, a random access procedure may be initiated, the second SR may be canceled and the first SR may be kept pending. At 3360, the first SR may be transmitted to the base station via the first SR resource in response to the triggering of the first SR. At 3370, an uplink grant may be received from the base station. The uplink grant may be for transmission of one or more transport blocks in a transmission duration up to the first value.

According to an embodiment, the one or more transport blocks are transmitted via a physical uplink shared channel. According to an embodiment, the first logical channel and the second logical channel are for data transmission to a same base station. According to an embodiment, the first value may be a maximum transmission duration value. According to an embodiment, the one or more messages may indicate a first SR configuration index for a first SR configuration corresponding to the first SR resource. According to an embodiment, the one or more messages may indicate that the first logical channel corresponds to the first SR configuration. According to an embodiment, the first SR configuration may indicate one or more first timer values and one or more first counter values. According to an embodiment, a first transmission duration may comprise a first transmission time interval for transmission of a first transport block. According to an embodiment, the first logical channel may correspond to a first quality of service requirement and the second logical channel corresponds to a second quality of service requirement. According to an embodiment, the uplink grant may comprise transmission parameters for the transmission of the one or more transport blocks. According to an embodiment, the one or more transport blocks may comprise data from one or more logical channels comprising the first logical channel. According to an embodiment, the one or messages may indicate one or more random access parameters.

Figure 34:
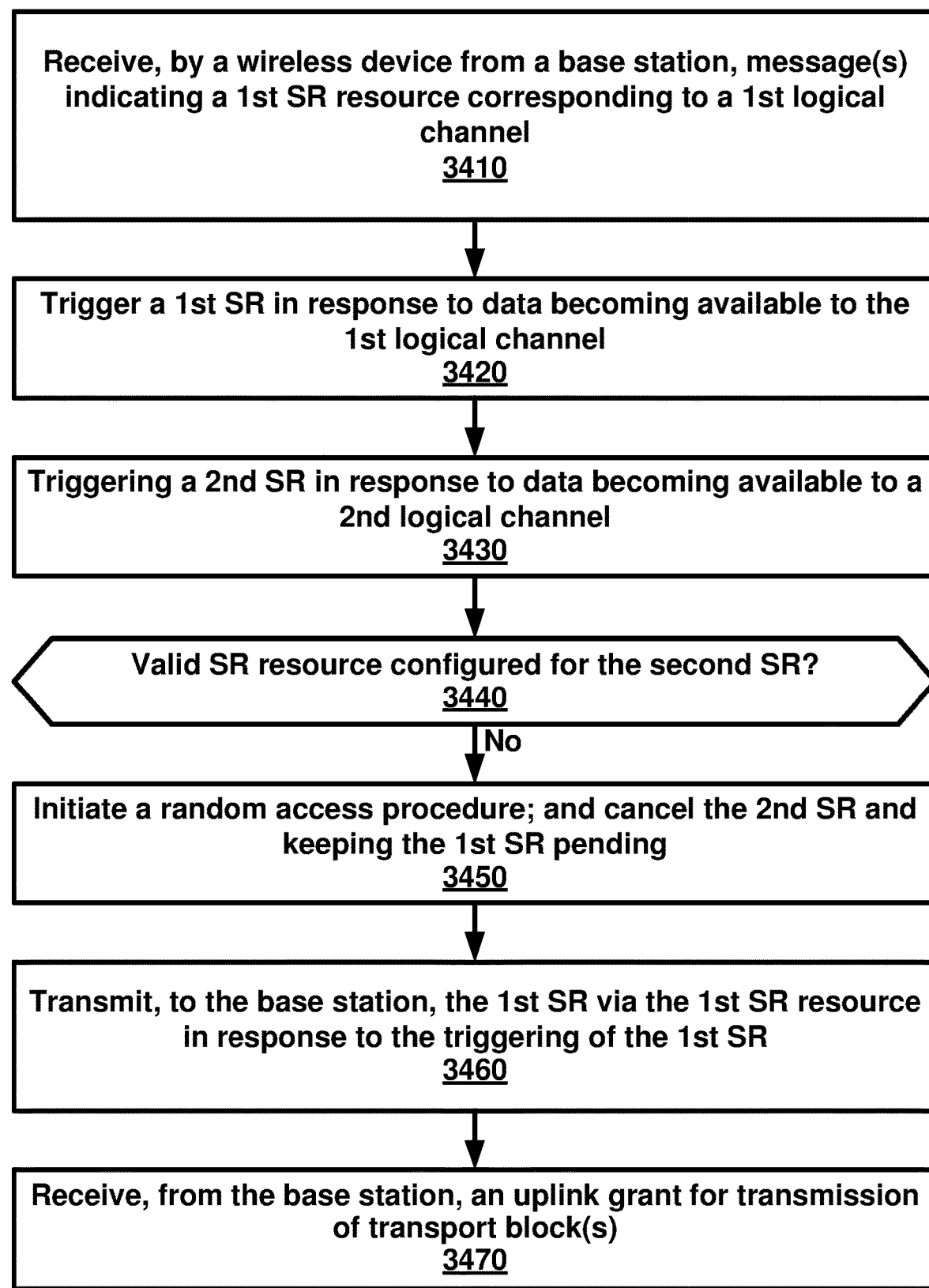
FIG. 34 is an example flow diagram as per an aspect of an embodiment of the present disclosure.

FIG. 34 is an example flow diagram as per an aspect of an embodiment of the present disclosure. At 3410, a wireless device may receive one or more messages from a base station. The one or more messages may indicate a first scheduling request (SR) resource corresponding to a first logical channel. At 3420, a first SR may be triggered in response to data becoming available to the first logical channel. At 3430, a second SR may be triggered in response to data becoming available to a second logical channel. When no valid SR resource being configured for the second SR (3440): at 3450, a random access procedure may be initiated, the second SR may be canceled, and the first SR kept pending. At 3460, a first SR may be transmitted to the base station via the first SR resource in response to the triggering of the first SR. At 3470, an uplink grant for transmission of one or more transport blocks may be received from the base station.

Figure 35:
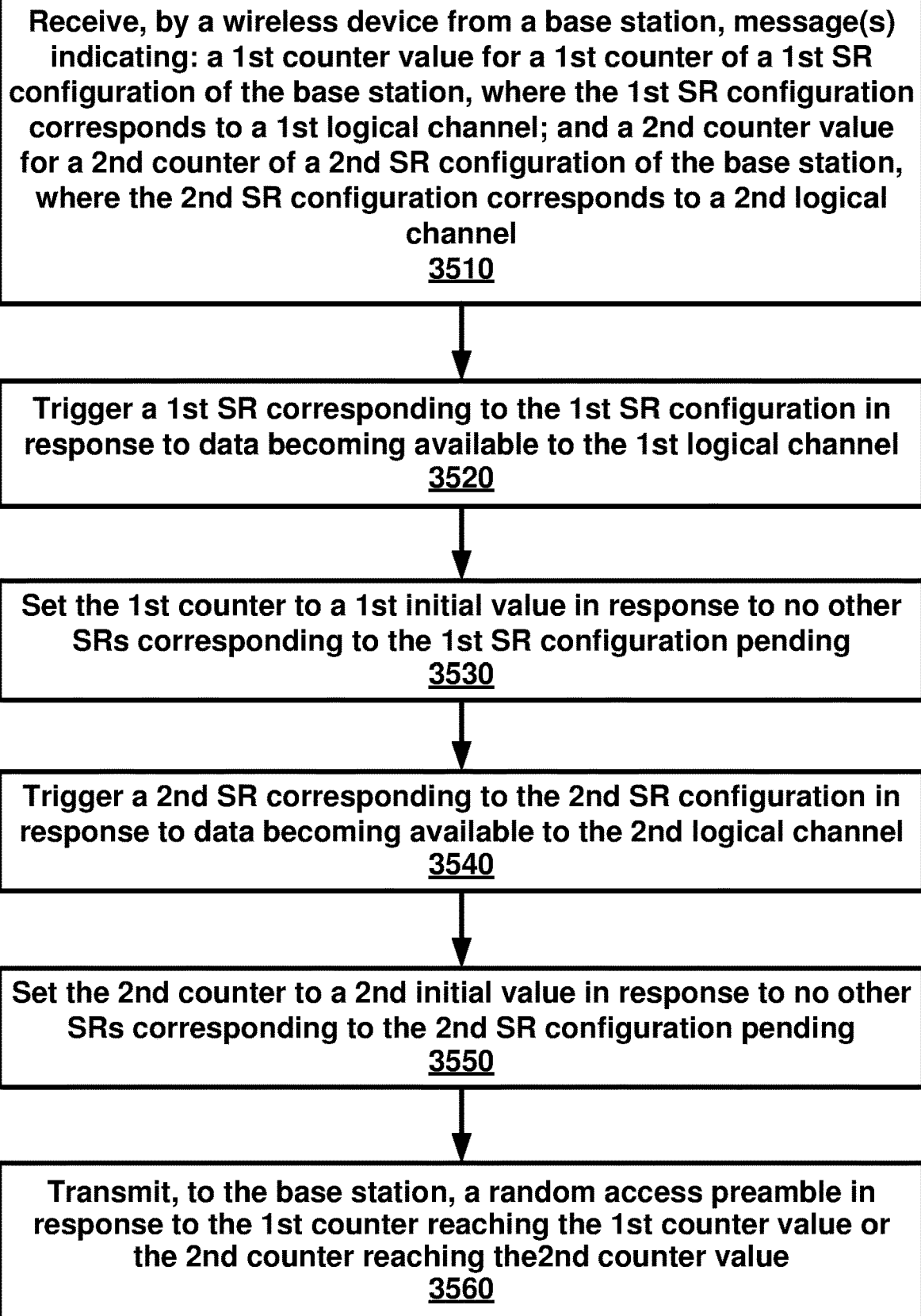
FIG. 35 is an example flow diagram as per an aspect of an embodiment of the present disclosure.

FIG. 35 is an example flow diagram as per an aspect of an embodiment of the present disclosure. At 3510, a wireless device may receive one or more messages from a base station. The one or more messages may indicate a first counter value and a second counter value. The first counter value may be for a first counter of a first scheduling request (SR) configuration of the base station. The first SR configuration may correspond to a first logical channel. The second counter value may be for a second counter of a second SR configuration of the base station. The second SR configuration may correspond to a second logical channel. At 3520, a first SR corresponding to the first SR configuration may be triggered in response to data becoming available to the first logical channel. At 3530, the first counter may be set to a first initial value in response to no other SRs corresponding to the first SR configuration pending. At 3540, a second SR corresponding to the second SR configuration may be triggered in response to data becoming available to the second logical channel. At 3550, the second counter may be set to a second initial value in response to no other SRs corresponding to the second SR configuration pending. At 3560, a random access preamble may be transmitted to the base station in response to the first counter reaching the first counter value or the second counter reaching the second counter value.

According to an embodiment, the first logical channel and the second logical channel are for data transmission to a same base station. According to an embodiment, the first initial value may be zero. According to an embodiment, the second initial value may be zero. According to an embodiment, the one or more messages may indicate a first SR configuration index for the first SR configuration and a second SR configuration index for the second SR. According to an embodiment, the one or more messages may indicate that: the first logical channel corresponds to the first SR configuration; and the second logical channel corresponds to the second SR configuration. According to an embodiment, the first SR configuration may indicate one or more first SR prohibit timer values; and the second SR configuration indicates one or more second SR prohibit timer values. According to an embodiment, the first logical channel may correspond to a first quality of service requirement and the second logical channel corresponds to a second quality of service requirement. According to an embodiment, 1, the first counter may be incremented in response to transmitting the first SR. According to an embodiment, the second counter may be incremented in response to transmitting the second SR. According to an embodiment, a random access response may be receiving from the base station.

FIG. 36 is an example flow diagram as per an aspect of an embodiment of the present disclosure. At 3610, a wireless device may configuration parameters. The configuration parameters may comprise: a first parameter for a logical channel in one or more first logical channels or one or more second logical channels; a first timer value for a first timer corresponding to the one or more first logical channels; and a second timer value for a second timer corresponding to the one or more second logical channel. At 3620, a buffer status report may be triggered in response to data becoming available to the logical channel. At 3630, one of the first timer or the second timer may be started based on whether the one or more first logical channels comprise the logical channel or the or more second logical channels comprise the logical channel. At 3640, a scheduling request may be transmitted in response to: uplink resources not being available for transmitting the buffer status report; and the one of the first timer or the second timer not running.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e., hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in a system comprising one or more TDD cells (e.g. frame structure 2 and/or frame structure 3-licensed assisted access). The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112.

What is claimed is:

1. A method comprising:
    receiving, by a wireless device, indications of:
        a first scheduling request (SR) resource corresponding to at least one first logical channel having a first logical channel prioritization (LCP) mapping to first radio resources; and
        a second SR resource corresponding to at least one second logical channel having a second LCP mapping to second radio resources;
    triggering a buffer status report (BSR) in response to data becoming available for the at least one second logical channel;
    receiving at least one first uplink grant indicating a first radio resource of the first radio resources;
    triggering an SR for transmission of the BSR, in response to the first radio resource not meeting the second LCP mapping configured for the at least one second logical channel for which the BSR was triggered;
    transmitting the SR via the second SR resource selected based on the at least one second logical for which the BSR was triggered; and
    transmitting the BSR via a second radio resource of the second radio resources.

2. The method of claim 1, further comprising, in response to the transmitting the SR, receiving a second uplink grant indicating the second radio resource of the second radio resources.

3. The method of claim 2, wherein the second uplink grant comprises transmission parameters for the transmission of the BSR.

4. The method of claim 2, further comprising receiving indications of a first cell being allowed serving cell for the at least one first logical channel, wherein the second uplink grant indicates transmission of the BSR via the first cell.

5. The method of claim 1, wherein:
    the at least one first logical channel corresponds to one or more first transmission durations up to a first value; and
    the at least one second logical channel corresponds to one or more second transmission durations up to a second value.

6. The method of claim 1, wherein the at least one first logical channel and the at least one second logical channel are for data transmission to a same base station.

7. The method of claim 1, further comprising receiving indications of:
    a first SR configuration index for a first SR configuration corresponding to the first SR resource; and
    a second SR configuration index for a second SR configuration corresponding to the second SR resource.

8. The method of claim 7, wherein:
    the first SR configuration indicates one or more first SR prohibit timer values and one or more first SR transmission counter values; and
    the second SR configuration indicates one or more second SR prohibit timer values and one or more second SR transmission counter values.

9. The method of claim 1, further comprising receiving indications of:
    the at least one first logical channel corresponding to a first SR configuration; and
    the at least one second logical channel corresponding to a second SR configuration.

10. The method of claim 1, wherein the at least one first logical channel corresponding to a first quality of service requirement and the at least one second logical channel corresponding to a second quality of service requirement.

11. A wireless device comprising:
    one or more processors; and
    memory storing instructions that, when executed by the one or more processors, cause the wireless device to:
        receive indications of:
            a first scheduling request (SR) resource corresponding to at least one first logical channel having a first logical channel prioritization (LCP) mapping to first radio resources; and
            a second SR resource corresponding to at least one second logical channel having a second LCP mapping to second radio resources;
        trigger a buffer status report (BSR) in response to data becoming available for the at least one second logical channel;
        receive at least one first uplink grant indicating a first radio resource of the first radio resources;
        trigger an SR for transmission of the BSR, in response to the first radio resource not meeting the second LCP mapping configured for the at least one second logical channel for which the BSR was triggered;

transmit the SR via the second SR resource selected based on the at least one second logical channel for which the BSR was triggered; and transmit the BSR via a second radio resource of the second radio resources.

12. The wireless device of claim 11, wherein the instructions, when executed, further cause the wireless device to, in response to the transmission of the SR, receive a second uplink grant indicating the second radio resource of the second radio resources.

13. The wireless device of claim 12, wherein the second uplink grant comprises transmission parameters for the transmission of the BSR.

14. The wireless device of claim 11, wherein:
the at least one first logical channel corresponds to one or more first transmission durations up to a first value; and
the at least one second logical channel corresponds to one or more second transmission durations up to a second value.

15. The wireless device of claim 11, wherein the at least one first logical channel and the at least one second logical channel are for data transmission to a same base station.

16. The wireless device of claim 11, wherein the instructions, when executed, further cause the wireless device to receive indications of:
a first SR configuration index for a first SR configuration corresponding to the first SR resource; and
a second SR configuration index for a second SR configuration corresponding to the second SR resource.

17. The wireless device of claim 16, wherein:
the first SR configuration indicates one or more first SR prohibit timer values and one or more first SR transmission counter values; and
the second SR configuration indicates one or more second SR prohibit timer values and one or more second SR transmission counter values.

18. The wireless device of claim 11, wherein the instructions, when executed, further cause the wireless device to receive indications of:
the at least one first logical channel corresponding to a first SR configuration; and
the at least one second logical channel corresponding to a second SR configuration.

19. The wireless device of claim 11, wherein the at least one first logical channel corresponds to a first quality of service requirement and the at least one second logical channel corresponds to a second quality of service requirement.

20. A system comprising:
a base station comprising:
one or more first processors; and
first memory storing first instructions that, when executed by the one or more first processors, cause the base station to:
transmit indications of:
a first scheduling request (SR) resource corresponding to at least one first logical channel having a first logical channel prioritization (LCP) mapping to first radio resources; and
a second SR resource corresponding to at least one second logical channel having a second LCP mapping to second radio resources; and
transmit at least one first uplink grant indicating a first radio resource of the first radio resources; and
a wireless device comprising:
one or more second processors; and
second memory storing second instructions that, when executed by the one or more second processors, cause the wireless device to:
receive the indications;
trigger a buffer status report (BSR) in response to data becoming available for the at least one second logical channel;
receive the at least one first uplink grant;
trigger an SR for transmission of the BSR, in response to the first radio resource not meeting the second LCP mapping configured for the at least one second logical channel for which the BSR was triggered;
transmit the SR via the second SR resource selected based on the at least one second logical channel for which the BSR was triggered; and
transmit the BSR via a second radio resource of the second radio resources.

* * * * *

UNITED STATES PATENT AND TRADEMARK OFFICE
CERTIFICATE OF CORRECTION

PATENT NO. : 11,856,446 B2
APPLICATION NO. : 17/074059
DATED : December 26, 2023
INVENTOR(S) : Alireza Babaei et al.

It is certified that error appears in the above-identified patent and that said Letters Patent is hereby corrected as shown below:

On the Title Page

On the page 2, in Column 2, under item (56) "Other Publications", Line 71, delete "Souce:" and insert -- Source: --.

In the Drawings

On sheet 30 of 36, in FIG. 30, reference numeral 3040, Line 1, delete "transmisssion" and insert -- transmission --.

On sheet 31 of 36, in FIG. 31, reference numeral 3140, Line 1, delete "transmisssion" and insert -- transmission --.

On sheet 36 of 36, in FIG. 36, reference numeral 3620, Line 1, delete "a a" and insert -- a --.

In the Specification

In Column 19, Line 46, delete "and or" and insert -- and/or --.

In Column 26, Line 26, delete "that that" and insert -- that --.

In Column 31, Line 5, delete "and or" and insert -- and/or --.

In Column 31, Line 15, delete "and or" and insert -- and/or --.

In Column 44, Line 47, delete "and or" and insert -- and/or --.

In Column 56, Line 7, delete "or the or more" and insert -- or the one or more --.

Signed and Sealed this
Twentieth Day of August, 2024

Katherine Kelly Vidal
*Director of the United States Patent and Trademark Office*

CERTIFICATE OF CORRECTION (continued)
U.S. Pat. No. 11,856,446 B2

In Column 60, Line 1, delete "or the or more" and insert -- or the one or more --.

In the Claims

In Column 61, Line 66, in Claim 1, delete "logical" and insert -- logical channel --.

In Column 62, Line 11, in Claim 4, delete "being" and insert -- being an --.

In Column 62, Line 44, in Claim 10, delete "corresponding" and insert -- corresponds --.

In Column 62, Line 46, in Claim 10, delete "corresponding" and insert -- corresponds --.